US010125591B2

(12) United States Patent
Okuno

(10) Patent No.: US 10,125,591 B2
(45) Date of Patent: Nov. 13, 2018

(54) COINJECTION OF DIMETHYL ETHER AND STEAM FOR BITUMEN AND HEAVY OIL RECOVERY

(71) Applicant: Board of Regents, The University of Texas System, Austin, TX (US)

(72) Inventor: Ryosuke Okuno, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 15/670,973

(22) Filed: Aug. 7, 2017

(65) Prior Publication Data
US 2018/0038211 A1 Feb. 8, 2018

Related U.S. Application Data

(60) Provisional application No. 62/372,189, filed on Aug. 8, 2016.

(51) Int. Cl.
*E21B 43/24* (2006.01)
*C09K 8/594* (2006.01)
*C09K 8/592* (2006.01)

(52) U.S. Cl.
CPC .......... *E21B 43/2408* (2013.01); *C09K 8/592* (2013.01); *C09K 8/594* (2013.01)

(58) Field of Classification Search
None
See application file for complete search history.

(56) References Cited

U.S. PATENT DOCUMENTS

| 4,513,819 | A | 4/1985 | Islip et al. | |
|---|---|---|---|---|
| 7,464,756 | B2 * | 12/2008 | Gates | C09K 8/592 166/263 |
| 7,938,183 | B2 | 5/2011 | Hart et al. | |
| 2003/0062159 | A1 * | 4/2003 | Nasr | C09K 8/592 166/272.1 |
| 2007/0199705 | A1 * | 8/2007 | Hocking | E21B 43/166 166/280.1 |
| 2011/0120710 | A1 | 5/2011 | Dong et al. | |
| 2011/0272151 | A1 * | 11/2011 | Matzakos | C09K 8/58 166/268 |
| 2012/0037363 | A1 * | 2/2012 | Curole | C09K 8/58 166/270 |
| 2013/0153228 | A1 * | 6/2013 | Blom | E21B 43/16 166/303 |
| 2015/0107834 | A1 | 4/2015 | Shen et al. | |
| 2016/0177691 | A1 | 6/2016 | Benson et al. | |

FOREIGN PATENT DOCUMENTS

| CA | 2652930 A1 | 7/2010 |
|---|---|---|
| CN | 104453816 A | 3/2015 |

OTHER PUBLICATIONS

Sheng, Kai, "Analysis of Phase Behavior for Steam-Solvent Coinjection for Bitumen Recovery" master's thesis. Aug. 2016 Chapter 4, all pages.

(Continued)

*Primary Examiner* — Andrew Sue-Ako
(74) *Attorney, Agent, or Firm* — Kilpatrick Townsend & Stockton LLP

(57) ABSTRACT

Provided are oil recovery techniques, which may include enhanced oil recovery techniques in which a heated combination of water vapor (steam) and dimethyl ether (DME) vapor are injected into an oil reservoir, such as containing heavy oil and/or bitumen, to facilitate extraction of the oil from the reservoir.

20 Claims, 33 Drawing Sheets

(56) References Cited

OTHER PUBLICATIONS

Ivory et al., "Thermal Solvent Reflux and Thermal Solvent Hybrid Experiments," "Society of Petroleum Engineers", Feb. 2010, vol. 49, No. 2_all pages.
Harding, et al., "In-Situ Reflux: An Improved In-Situ Recovery Method for Oil Sands," "Society of Petroleum Engineers", Jun. 2016, all pages.
Keshavarz et al., "Optimal Application Conditions for Steam/Solvent Coinjection," "Society of Petroleum Engineers", Feb. 2015, vol. 18, Issue 1_all pages.
Mukhametshina, et al., "Electromagnetic Heating of Heavy Oil and Bitumen: A Review of Experimental Studies and Field Applications" "Journal of Petroleum Engineering", vol. 2013 (2013), Article ID 476519, 7 pages.
International Search Report and Written Opinion of PCT/US2017/045724 dated Oct. 19, 2017, all pages.
Alkindi, A., Al-Azri, N., Said, D., AlShuaili, K., te Riele, P. 2016. Persistence in EOR-Design of a Field Trial in a Carbonate Reservoir Using Solvent-based Water-Flood Process. Presented at the SPE EOR Conference at Oil and Gas West Asia, Muscat, Oman, Mar. 21-23, 2016.
Amani, M.J., Gray, M.R. and Shaw, J.M., 2013. Phase behavior of Athabasca bitumen+water mixtures at high temperature and pressure. The Journal of Supercritical Fluids, 77, pp. 142-152.
Amani, M.J., Gray, M.R. and Shaw, J.M., 2013. Volume of mixing and solubility of water in Athabasca bitumen at high temperature and pressure. Fluid Phase Equilibria, 358, pp. 203-211.
Argillier, J., Henaut, I., Gateau, P., Heraud, J.P. and Glenat, P., 2005. Heavy oil dilution. SPE paper presented at the 2005 SPE International Thermal Operations and Heavy Oil Symposium, Calgary, Alberta, Canada, Nov. 1-3. SPE/PS-CIM/CHOA 97763.
Arrhenius, S. 1887. Uber die Dissociation der in Wasser Gelosten Stoffe (On the Dissociation of Substances Dissolved in Water). Z. Phys. Chem. 1, 631-648.
Blevins, T.R., Aseltine, R.J. and Kirk, R.S., 1969. Analysis of a steam drive project, Inglewood Field, California. Journal of Petroleum Technology, 21(09), pp. 1-141.
Blevins, T.R. and Billingsley, R.H., 1975. The Ten-Pattern Steamflood, Kern River Field, California. Journal of Petroleum Technology, 27(12), pp. 1-505.
Brunner, E., 1988. Fluid mixtures at high pressures VI. Phase separation and critical phenomena in 18 (n-alkane+ ammonia) and 4 (n-alkane+ methanol) mixtures. The Journal of Chemical Thermodynamics, 20(3), pp. 273-297.
Brunner, E., 1990. Fluid mixtures at high pressures IX. Phase separation and critical phenomena in 23 (n-alkane+ water) mixtures. The Journal of Chemical Thermodynamics, 22(4), pp. 335-353.
Brunner, E., Thies, M.C. and Schneider, G.M., 2006. Fluid mixtures at high pressures: Phase behavior and critical phenomena for binary mixtures of water with aromatic hydrocarbons. The Journal of supercritical fluids, 39(2), pp. 160-173.
Chahardowli, M., Farajzadeh, R., Bruining, H. 2016. Experimental Investigation of Dimethyl Ether/Polymer Hybrid as an Enhanced Oil Recovery Method. Presented at the SPE EOR Conference at Oil and Gas West Asia, Muscat, Oman, Mar. 21-23, 2016.
Chapman, W. G., Gubbins, K. E., Joslin, C. G., Gray, C. G. 1986. Theory and Simulation of Associating Liquid Mixtures. Fluid Phase Equilibria 29: 337-46.
Chernetsky, A., Masalmeh, S., Eikmans, D., Boerrigter, P.M., Fadili, A., Parsons, C.A., Parker, A., Boersma, D.M., Cui, J., Dindoruk, B. and to Riele, P.M., Nov. 2015. A Novel Enhanced Oil Recovery Technique: Experimental Results and Modelling Workflow of the DME Enhanced Waterflood Technology. In Abu Dhabi International Petroleum Exhibition and Conference. Society of Petroleum Engineers.
Connolly, J.F., 1966. Solubility of Hydrocarbons in Water Near the Critical Solution Temperatures. Journal of Chemical and Engineering data, 11(1), pp. 13-16.

Constantinou, L. and Gani, R., 1994. New group contribution method for estimating properties of pure compounds. AlChE Journal, 40(10), pp. 1697-1710.
Constantinou, L., Gani, R. and O'Connell, J.P., 1995. Estimation of the acentric factor and the liquid molar volume at 298 K using a new group contribution method. Fluid Phase Equilibria, 103(1), pp. 11-22.
Dehaghani, A.H.S. and Badizad, M.H., 2016. Experimental study of Iranian heavy crude oil viscosity reduction by diluting with heptane, methanol, toluene, gas condensate and naphtha. Petroleum 2( 4), pp. 415-424.
Dong, L., 2012. Effect of vapour-liquid phase behaviour of steam-light hydrocarbon systems on steam assisted gravity drainage process for bitumen recovery. Fuel, 95, pp. 159-168.
Folas, G. K., Kontogeorgis, G. M., Michelsen, M. L., Stenby, E. H. 2006. Application of the Cubic-Plus Association Equation of State to Mixtures with Polar Chemicals and High Pressures. Industrial & Engineering Chemistry Research 45: 1516-1526.
Folas, G. K., Kontogeorgis, G. M., Michelsen, M. L., Stenby, E. H. 2006. Application of the Cubic-Plus Association (CPA) Equation of State to Complex Mixtures with Aromatic Hydrocarbons. Industrial & Engineering Chemistry Research 45: 1527-1538.
Ganjdanesh, R., Rezaveisi, M., Pope, G.A. and Sepehrnoori, K., Sep. 2015. Treatment of Condensate and Water Blocks in Hydraulic Fractured Shale Gas-Condensate Reservoirs. In SPE Annual Technical Conference and Exhibition. Society of Petroleum Engineers.
Gao, J., Okuno, R and Li, H.A., Jun. 2016. An Experimental Study of Multiphase Behavior for n-Butane/Bitumen/Water Mixtures. In SPE Canada Heavy Oil Technical Conference. Society of Petroleum Engineers.
Gao, J., Okuno, Rand Li, H.A. 2017. An Experimental Study of Multiphase Behavior for n-Butane/Bitumen/Water Mixtures. SPE Journal. 22(3): 783-798. SPE-180736-PA.
Gao, J., Okuno, R. and Li, H.A. 2017. A Phase-Behavior Study for n-Hexane/Bitumen and n-Octane/Bitumen Mixtures. SPE Journal. Accepted for publication on Mar. 6, 2017. SPE-186097-PA.
Gates, I. D., 2007. Oil Phase Viscosity Behavior in Expanding-Solvent Steam-Assisted Gravity Drainage. Journal of Petroleum Science and Engineering 59 (1-2): 123-134.
Glandt, C. A. and Chapman, W. G. 1995. The Effect of Water Dissolution on Oil Viscosity. SPE Reservoir Engineering 10 (1): 59-64, SPE-24631-PA.
Govind, P.A., Das, S.K., Srinivasan, S. and Wheeler, T.J., Jan. 2008. Expanding solvent SAGD in heavy oil reservoirs. In International Thermal Operations and Heavy Oil Symposium. Society of Petroleum Engineers.
Groot, J. A. W. M., Eikmans, D., Fadili, A., Romate, J.E. 2016. Field-Scale Modeling and Sensitivity Analysis of DME Enhanced Waterflooding. Presented at SPE EOR Conference at Oil and Gas West Asia, Muscat, Oman, Mar. 21-23, 2016.
Groot, J. A. W. M., Chernetsky, A., te Riele, P. M., Dindoruk, B., Cui, J., Wilson, L. C., Ratnakar, R. 2016. Representation of Phase Behavior and PVT Workflow for DME Enhanced Water-Flooding. Presented at the SPE EOR Conference at Oil and Gas West Asia, Muscat, Oman, Mar. 21-23, 2016.
Gupta, S., Gittins, S., Picherack, P. 2005. Field Implementation of Solvent Aided Process. Journal of Canadian Petroleum Technology 44 (11): 8-13.
Gupta, S.C. and Gittins, S.D., 2006. Christina Lake Solvent Aided Process Pilot. Journal of Canadian Petroleum Technology, 45(9), 15-18.
Hansen, C.M., 1967. The three dimensional solubility parameter. Danish Technical: Copenhagen, p. 14.
Harding, T.G., et al., 2016. In-situ Reflux: An Improved In-situ Recovery Method for Oil Sands. SPE Canada Heavy Oil Technical Conference. Society of Petroleum Engineers, SPE-180752-MS.
Holldorff, H. and Knapp, H. 1988. Binary Vapor-Liquid-Liquid Equilibrium of Dimethyl Ether—Water and Mutual Solubilities of Methyl Chloride and Water. Fluid Phase Equilibria 44: 195-209.
Huron, M. J. and Vidal, J. 1979. New Mixing Rules in Simple Equations of State for Representing Vapour-Liquid Equilibria of Strongly Non-ideal Mixtures, Fluid Phase Equilibria 3: 255-271.

(56) References Cited

OTHER PUBLICATIONS

Ihmels, E.C. and Lemmon, E.W., 2007. Experimental densities, vapor pressures, and critical point, and a fundamental equation of state for dimethyl ether. Fluid Phase Equilibria, 260(1), pp. 36-48.
Ivory, J., T. Frauenfeld, and C. Jossy. "Thermal solvent reflux and thermal solvent hybrid experiments." Journal of Canadian Petroleum Technology, 49.02 (2010): 23-31. SPE-133202-PA.
Ivory, J.J., Zheng, R., Nasr, T.N., Deng, X., Beaulieu, G., Heck, G. 2008. Investigation of Low Pressure ES-SAGD. Presented at 2008 SPE International Thermal Operations and Heavy Oil Symposium, Calgary, Alberta, Canada, Oct. 20-23, 2008.
Jha, R.K., Kumar, M., Benson, I. and Hanzlik, E., 2013. New insights into steam/solvent-coinjection-process mechanism. SPE Journal, 18(05), pp. 867-877.
Kariznovi, M., Nourozieh. H., Guan. J. and Abedi J. 2013. Measurement and modeling of density and viscosity for mixtures of Athabasca bitumen and heavy n-alkane. Fuel 112: 83-95.
Keshavarz, M. and Chen, Z., Oct. 2014. Modeling Displacement Efficiency Improvement During Solvent Aided-SAGD. In SPE Annual Technical Conference and Exhibition. Society of Petroleum Engineers.
Keshavarz, M., Okuno, R. and Babadagli, T., 2014. Efficient oil displacement near the chamber edge in ES-SAGD. Journal of Petroleum Science and Engineering, 118, pp. 99-113.
Keshavarz, M., Okuno, R. and Babadagli, T., 2015 (a). A semi-analytical solution to optimize single-component solvent coinjection with steam during SAGD. Fuel, 144, pp. 400-414.
Keshavarz, M., Okuno, R. and Babadagli, T., 2015 (b). Optimal Application Conditions for Steam/Solvent Coinjection. SPE Reservoir Evaluation & Engineering, 18(1), pp. 20-38.
Kontogeorgis, G. M., Voutsas, E. C., Yakoumis, I. V., Tassios, D. P. 1996. An Equation of State for Associating Fluids. Industrial & Engineering Chemistry Research 35: 4310-4318.
Kumar, A., 2016. Characterization of Reservoir Fluids based on Perturbation from n-Alkanes. ERA thesis of University of Alberta.
Kumar, A. and Okuno, R., Sep. 2015. A New Algorithm for Multiphase Fluid Characterization for Solvent Injection. In SPE Annual Technical Conference and Exhibition. Society of Petroleum Engineers.
Kumar, A. and Okuno, R., 2016. Reliable characterization of bitumen based on perturbation from n-alkanes for steam-solvent coinjection simulation. Fuel, 182, pp. 141-153.
Leaute, R.P., Jan. 2002. Liquid addition to steam for enhancing recovery (LASER) of bitumen with CSS: Evolution of technology from research concept to a field pilot at Cold Lake. In SPE International Thermal Operations and Heavy Oil Symposium and International Horizontal Well Technology Conference. Society of Petroleum Engineers.
Leaute, R.P. and Carey, B.S., 2007. Liquid addition to steam for enhancing recovery (LASER) of bitumen with CSS: Results from the first pilot cycle. Journal of Canadian Petroleum Technology, 46(09).
Leaute, R.P., 2002. Liquid Addition to Steam for Enhancing Recovery of Bitumen with CSS: Evolution of Technology from Research Concept to a Field Pilot at Cold Lake. Presented at the SPE/ Petroleum Society of CIM/CHOA Paper No. 79011, Calgary, Alberta, Canada, Nov. 4-7, 2002.
Li, W., Mamora, D.D. and Li, Y., 2011. Solvent-type and-ratio impacts on solvent-aided SAGD process. SPE Reservoir Evaluation & Engineering, 14(3), pp. 320-331.
Li, W., Mamora, D. and Li, Y., 2011. Light-and heavy-solvent impacts on solvent-aided-SAGD process: a low-pressure experimental study. Journal of Canadian Petroleum Technology, 50(04), pp. 19-30.
Malkin, A. Ya., Rodionova, G., Simon, S., Ilyin, S. 0., Arinina, M. P., Kulichikhin, V. G. and Sjoblom, J. 2016. Some Compositional Viscosity Correlations for Crude Oils from Russia and Norway. Energy Fuels 30: 9322-9328.
Mehrotra, A. K. and Svrcek. W. Y. 1986. Viscosity of compressed Athabasca bitumen. The Canadian Journal of Chemical Engineering 64 (5): 844-847.
Michailidou, E. K., Assael, M. J., Huber. M. L. and Perkins. R. A. 2013. Reference Correlation of the Viscosity of n-Hexane from the Triple Point to 600 Kand up to 100 MPa, Journal of Physical and Chemical Reference Data vol. 42. No. 3.
Michelsen, M. L. A Modified Huron-Vidal Mixing Rule for Cubic Equations of State. Fluid Phase Equilibria 60: 213-219.
Mohebati, M. H., Maini, B. B., and Harding, T. G. 2012. Numerical-Simulation Investigation of the Effect of Heavy-oil Viscosity on the Performance of Hydrocarbon Additives in SAGD. SPE Reservoir Evaluation & Engineering 15 (02): 165-181.
Mukhametshina A., et al., "Electromagnetic Heating of Heavy Oil and Bitumen: A Review of Experimental Studies and Field Applications," Journal of Petroleum Engineering, vol. 2013, Article ID 476519, 7 pages, 2013. doi:I0.1155/2013/476519.
Nasr, T.N. and Ayodele, O.R., Jan. 2006. New hybrid steam-solvent processes for the recovery of heavy oil and bitumen. In Abu Dhabi International Petroleum Exhibition and Conference. Society of Petroleum Engineers.
Nasr, T.N., Beaulieu, G., Golbeck, H. and Heck, G. 2003. Novel expanding solvent-SAGD process "ES-SAGD". Journal of Canadian Petroleum Technology 42 (1): 13-16.
Nghiem, L.X. and Li, Y.K., 1984. Computation of multiphase equilibrium phenomena with an equation of state. Fluid Phase Equilibria, 17(1), pp. 77-95.
Nourozieh, H., Kariznovi, M., Guan, J. and Abedi, J. 2013. Measurement of thermophysical properties and modeling for pseudo-binary mixtures of n-decane and Athabasca bitumen. Fluid Phase Equ;/ibria 347: 62-75.
Nourozieh, H., Kariznovi, M. and Abedi, J. 2015. Density and Viscosity of Athabasca Bitumen Samples at Temperatures Up to 200C and Pressures Up to 10 MPa. SPE Journal, 18: 375-386. SPE-176026-PA.
Nourozieh, H., Kariznovi, M. and Abedi, J. 2015. Viscosity measurement and modeling for mixtures of Athabasca bitumen/hexane. Journal of Petroleum Science and Engineering 129: 159-167.
Nourozieh, H., Kariznovi, M. and Abedi, J. 2015. Viscosity Measurement and Modeling for Mixtures of Athabasca Bitumen/n-Pentane at Temperatures up to 200° C. SPE Journal, 129: 159-167. SPE-170252-PA.
Nourozieh, H., Kariznovi, M. and Abedi, J. 2015. Experimental and modeling studies of phase behavior for propane/Athabasca bitumen mixtures. Fluid Phase Equilibria 397: 37-43.
Nourozieh, H., Kariznovi, M. and Abedi, J. 2017. Solubility of n-butane in Athabasca Bitumen and Saturated Densities and Viscosities at Temperatures Up to 200° C. SPE Journal 22: 94-102. SPE-180927-PA.
Ohno, Y., Inoue, N., Okuyama, K. and Yajima, T., Jan. 2005. New clean fuel DME. In International Petroleum Technology Conference. International Petroleum Technology 20 Conference.
Okuno, R., Johns, R.T., and Sepehrnoori, K., 2010. A New Algorithm for Rachford-Rice for Multiphase Compositional Simulation, SPE Journal, 15(02), pp. 313-325.
Oliveira, M. B., Coutinho, J. A. P., Queimada, A. J. 2007. Mutual Solubilities of Hydrocarbons and Water with the CPA EoS, Fluid Phase Equilibria 258: 58-66.
Orr, B., Jan. 2009. ES-SAGD; Past, Present and Future. In SPE Annual Technical Conference and Exhibition. Society of Petroleum Engineers.
Park, S.J., Han, K.J. and Gmehling, J., 2007. Isothermal phase equilibria and excess molar enthalpies for binaiy systems with dimethyl ether at 323 .15 K. Journal of Chemical & Engineering Data, 52(5), pp. 1814-1818.
Park, K.J., Seo, T. and Jung, D., 2007. Performance of alternative refrigerants for residential air-conditioning applications. Applied energy, 84(10), pp. 985-991.
Parsons, C. Chernetsky, A. Eikmans, D., te Riele, P. Boersma, D., Sersic, I., Broos, R. 2016. Introducing a Novel Enhanced Oil Recovery Technology. Presented at the SPE Improved Oil Recovery Conference, Tulsa, Oklahoma, USA, Apr. 11-13.

(56) References Cited

OTHER PUBLICATIONS

Pozo, M.E. and Streett, W.B., 1984. Fluid phase equilibria for the system dimethyl ether/water from 50 to 220. degree. C and pressures to 50.9 MPa. Journal of Chemical and Engineering Data, 29(3), pp. 324-329.

Qian, J.W., Privat, R. and Jaubert, J.N., 2013. Predicting the Phase Equilibria, Critical Phenomena, and Mixing Enthalpies of Binaiy Aqueous Systems Containing Alkanes, Cycloalkanes, Aromatics, Alkenes, and Gases (N2, C02, H2S, H2) with the PPR 78 Equation of State. Industrial & Engineering Chemistry Research, 52(46), pp. 16457-16490.

Rackett, H.G. 1970. Equation of State for Saturated Liquids. Journal of Chemical and Engineering Data 15(4):514-517.

Ramos-Pallares, F., Schoeggl, F.F., Taylor, S.D., Satyro, M.A. and Yarranton, H.W. 2015. Predicting the Viscosity of Hydrocarbon Mixtures and Diluted Heavy Oils Using the Expanded Fluid Model. Energy & Fuels 30: 3575-3595.

Ratnakar, R.R., Dindoruk, B., Wilson, L. 2016. Experimental Investigation of DME-Water-Crude Oil Phase Behavior and PVT Modeling for the Application of DME-Enhanced Waterflooding. Fuel 182 (2016): 188-197.

Ratnakar, R.R., Dindoruk, B., Wilson, L. 2016. Phase Behavior Experiments and PVT Modeling ofDME-Brine-Crude Oil Mixtures Based on Huron-Vidal Mixing Rules for EOR Applications. Fluid Phase Equilibria.

Reamer, H.H., Sage, B.H. and Lacey, W.N., 1952. Phase Equilibria in Hydrocarbon Systems. n-Butane-Water System in the Two-Phase Region. Industrial & Engineering Chemistry 44(3): 609-615.

Rebert, C.J. and Kay, W.B., 1959. The phase behavior and solubility relations of the benzene-water system. AlChE Journal, 5(3), pp. 285-289.

Riazi, M.R. and Daubed, T.E., 1987. Characterization parameters for petroleum fractions. Industrial & engineering chemistry research, 26(4), pp. 755-759.

Robinson, D. B., Peng, D. Y. 1978. Gas Processors Association. Research Report RR-28.

Scharlin, P., Battino, R., Silla, E., Tunon, I. and Pascual-Ahuir, J.L. 1998. Solubility of Gases in Water: Correlation Between Solubility and the Number of Water Molecules in the First Solvation Shell. Pure and applied chemistry, 70: 1895-1904.

Schneider, G.M., 2002. Aqueous solutions at pressures up to 2 GPa: gas-gas equilibria, closed loops, high-pressure immiscibility, salt effects and related phenomena. Physical Chemistry Chemical Physics, 4(6), pp. 845-852.

Shen, C. 2013. Enhanced Oil Recovery Field Case studies. 1st Edition. Chapter 13, pp. 413-455, Elsevier.

Sheng, K., Okuno, R. and Wang, M. 2017. Water-Soluble Solvent as an Additive to Steam for Improved SAGD. Presented at the SPE Canada Heavy Oil Technical Conference, Feb. 15-16, 2017, Calgary, Alberta, Canada. SPE-184983-MS.

Shi, X. 2016. Analytical Solution for SAGD with Consideration of Temperature Variation along the Edge of a Steam Chamber, MSc thesis, University of Alberta, Canada, Dec. 2016.

Soave G. 1972. Equilibrium Constants from a Modified Redlich-Kwong Equation of State. Chemical Engineering Science 27: 1197-1203.

Spencer, C.F. and Danner, R.P. 1972. Improved Equation for Prediction of Saturated Liquid Density. Journal of Chemical and Engineering Data 17(2):236-241.

Scott, R.L. and van Konynenburg, P.H., 1970. Static properties of solutions. Van der Waals and related models for hydrocarbon mixtures. Discussions of the Faraday society, 49, pp. 5 87-5 97.

Tallon, S. and Fenton, K., 2010. The solubility of water in mixtures of dimethyl ether and carbon dioxide. Fluid Phase Equilibria, 298(1), pp. 60-66.

Te Riele, P., Parsons, C., Boerrigter, P., Plantenberg, J., Suijkerbuij~, B., Burggraaf, J., Chemetsky, A., Boersma, D., Broos. R. 2016. Implementing a Water Soluble Solvent Based 10 Enhanced Oil Recovery Technology—Aspects of Field Development Planning. Presented at the SPE EOR Conference at Oil and Gas West Asia, Muscat, Oman, Mar. 21-23, 2016.

Van Konynenburg, P.H. and Scott, R.L. 1980. Critical lines and phase equilibria in binary van der Waals mixtures. Philosophical Transactions of the Royal Society of London A: Mathematical, Physical and Engineering Sciences 298(1442): 495-540.

Venkatramani, A.V. and Okuno, R., Jun. 2014. Modeling of Multiphase Behavior for Water/n-Alkane Mixtures by Use of the Peng-Robinson EOS. In SPE Heavy Oil Conference Canada. Society of Petroleum Engineers.

Venkatramani, A.V. and Okuno, R., 2015. Characterization of water-containing reservoir oil using an EOS for steam injection processes. Journal of Natural Gas Science and Engineering, 26, pp. 1091-1106.

Venkatramani, A.V. and Okuno, R., Jun. 2016. Compositional Mechanisms in SAGD and ES-SA GD With Consideration of Water Solubility in Oil. In SPE Canada Heavy Oil Technical Conference. Society of Petroleum Engineers. SPE-180737-PA.

Venkatramani, A. and Okuno, R. 2017. Steam-Solvent Coinjection under Reservoir 25 Heterogeneity: Should ES-SAGD be Implemented for Highly Heterogeneous Reservoirs? Presented at the SPE Canada Heavy Oil Conference, Calgary, Alberta, Canada. Feb. 15-16, 2017. SPE-185001-MS.

Volek, C.W. and Pryor, J.A., 1972. Steam distillation drive-Brea field, California. Journal of Petroleum Technology, 24(08), pp. 899-906.

Willman, B.T., Valleroy, V.V., Runberg, G.W., Cornelius, A.J. and Powers, L.W., 1961. Laboratory studies of oil recovery by steam injection. Journal of Petroleum Technology, 13(07), pp. 681-690.

Wong, D.S.H. and Sandler, S.I., 1992. A theoretically correct mixing rule for cubic equations of state. AlChE Journal, 38(5), pp. 671-680.

Wu, J., Liu, Z., Bi, S. and Meng, X., 2003. Viscosity of saturated liquid dimethyl ether from (227 to 343) K. Journal of Chemical & Engineering Data, 48(2), pp. 426-429.

Wu. J., Liu, Z., Wang, B., Pan, J. 2004. Measurement of the Critical Parameters and the Saturation Densities of Dimethyl Ether. Journal a/Chemical & Engineering Data 49: 704-708.

Wu, J. and Yin, J. 2008. Vapor Pressure Measurements of Dimethyl Ether From (213 to 393) K. Journal of Chemical & Engineering Data 53: 2247-2249.

Zhu, D. and Okuno, R. 2016. Multiphase Isenthalpic Flash Integrated with Stability Analysis. Fluid Phase Equilibria 423: 203-219.

\* cited by examiner

Water/propane/bitumen

Water/butane/bitumen

Water/pentane/bitumen

Water/hexane/bitumen

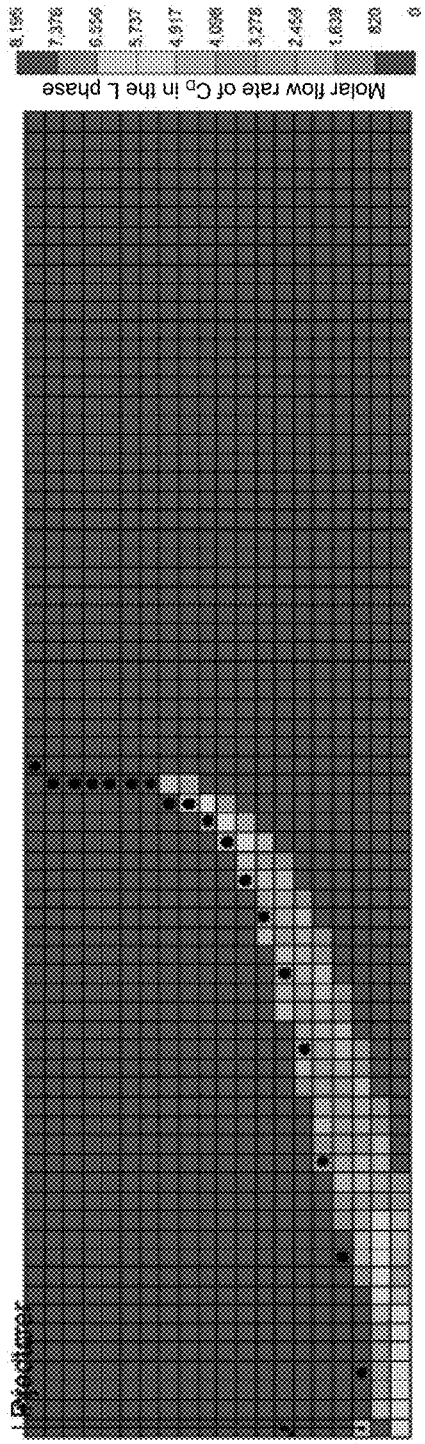
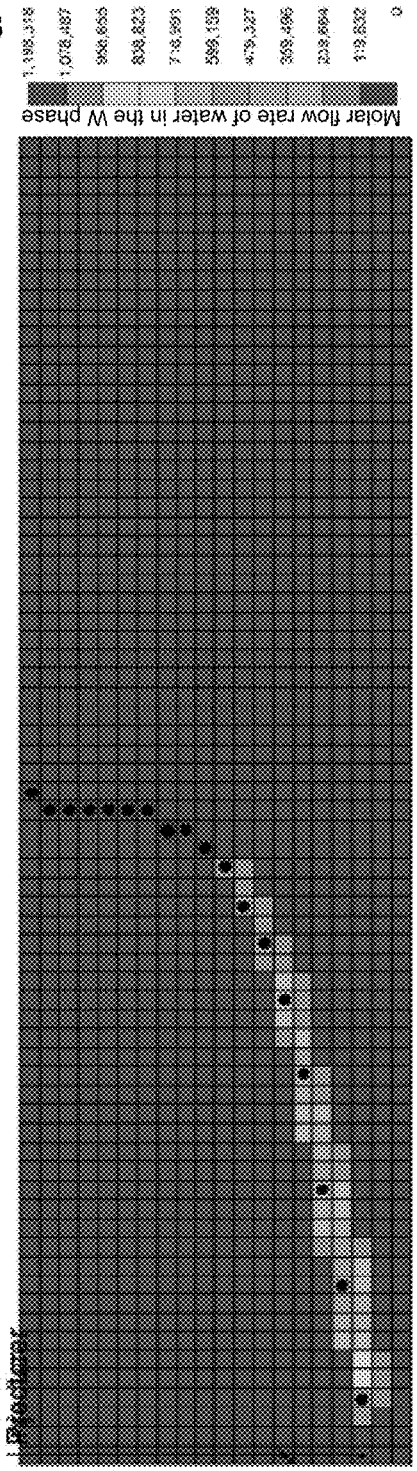
FIG. 16A
FIG. 16B

1. Pressurization pump
2. Bitumen accumulator
3. Solvent accumulator
4. Vacuum pump
5. Temperature gauge
6. Pressure gauge
7. PVT cell
8. Oven 1. Pressurization pump
2. Mixing accumulator
3. Vacuum pump
4. In-line viscometer
5. Pressure gauge
6. In-line densiometer
7. Back pressure regulator
8. Effluent collector
9. Oven

COINJECTION OF DIMETHYL ETHER AND STEAM FOR BITUMEN AND HEAVY OIL RECOVERY

CROSS REFERENCE TO RELATED APPLICATION

This application claims the benefit of and priority to U.S. Provisional Application No. 62/372,189, filed on Aug. 8, 2016, which is hereby incorporated by reference in its entirety.

BACKGROUND

This invention is in the field of oil production and relates specifically to techniques for extracting heavy oil and/or bitumen from a natural deposit of petroleum.

SUMMARY

The present disclosure provides details of methods for extracting oil by injecting a combination of water and dimethyl ether (DME) into a reservoir containing heavy oil and/or bitumen. The injection of a combination of DME and water provides advantages over injection of pure DME or pure water, as well as over combinations of water and other hydrocarbon solvents, such as $C_3$-$C_6$ hydrocarbons. Advantageously, the disclosed methods allow for reduction in the energy used for extracting heavy oil and/or bitumen, as well as for a reduction in the amount of water used. The disclosed techniques provide an overall more efficient way to extract heavy oil and/or bitumen than prior techniques, advantaged by thermodynamic, chemical, and physical properties of the DME, water, and mixtures thereof.

For example, a method for recovering heavy oil and/or bitumen from a reservoir comprises generating a vapor mixture including vapor phase water and vapor phase dimethyl ether (DME); injecting the vapor mixture into a reservoir containing heavy oil or bitumen, such as where injecting the vapor mixture into the reservoir forms a chamber in the reservoir and a heated region surrounding the chamber, and extracting heavy oil and/or bitumen from the reservoir. For example, the chamber may contain a vapor phase including water and DME, a first liquid oil phase, and a first liquid aqueous phase. In addition, the heated region may contain a second liquid oil phase and a second liquid aqueous phase. Condensation of the vapor mixture may release heat to the heavy oil or bitumen in the reservoir to increase a temperature of the heavy oil or bitumen and reduce a viscosity of the heavy oil or bitumen. It will be appreciated that, in embodiments, the viscosity of the heavy oil or bitumen is further reduced due to dilution of the heavy oil or bitumen by DME. In some embodiments, the injecting and the extracting correspond to a steam assisted gravity drainage oil recovery technique. In some embodiments, the injecting and the extracting correspond to a cyclic steam stimulation oil recovery technique. Optionally, injecting the vapor mixture includes using one or more of a variable injection pressure as a function of time, a variable injection temperature as a function of time, or a variable vapor mixture composition as a function of time.

In some embodiments, extracting includes extracting a liquid oil phase mixture of DME and heavy oil or bitumen from the reservoir. Optionally, methods may further comprise separating the DME from the extracted liquid oil phase mixture of DME and heavy oil or bitumen from the reservoir. Optionally, methods may further comprise separating the heavy oil and/or bitumen from the extracted liquid oil phase mixture of DME and heavy oil or bitumen from the reservoir. In some embodiments, separation of the DME from the heavy oil and/or bitumen may be facilitated by following the co-injection of water/DME with a second injection phase of steam-only injection.

Various temperature and phase characteristics may be present in different regions of the reservoir upon injection of a vapor mixture in accordance with the present disclosure. It will be appreciated that a chamber-edge, corresponding to an interface between the chamber and the heated region, may have a temperature equal to a condensation temperature of the vapor mixture. For example, the chamber-edge temperature may be less than a comparable chamber-edge temperature for the reservoir when vapor phase water, but not vapor phase DME, is injected into the reservoir. As another example, the chamber-edge temperature may be greater than a comparable chamber-edge temperature for the reservoir when vapor phase DME, but not vapor phase water, is injected into the reservoir. In embodiments, a temperature within the chamber is greater than a condensation temperature of the vapor mixture. In some embodiments, the heated region has a temperature less than a condensation temperature of the vapor mixture and greater than an ambient temperature of the reservoir surrounding the heated region.

Optionally, the first liquid aqueous phase comprises a first mixture of DME and water. Optionally, the second liquid aqueous phase comprises a second mixture of DME and water, which may have a different composition from the first liquid aqueous phase. Optionally, the first liquid oil phase comprises a first mixture of DME and heavy oil or bitumen. Optionally, the second liquid oil phase comprises second mixture of DME and heavy oil or bitumen, which may have a different composition from the first liquid oil phase.

Various energy characteristics may govern the methods described herein. For example, in some embodiments, the extracting corresponds to extracting a quantity of heavy oil or bitumen from the reservoir at a particular rate, and, an amount of energy used for generating the vapor mixture needed for extracting the quantity of heavy oil or bitumen from the reservoir at the particular rate may be less than a reference amount of energy required for generating vapor phase water, but not vapor phase DME, needed for extracting the quantity of heavy oil or bitumen from the reservoir at the particular rate. As another example, in some embodiments, the amount of energy used for generating the vapor mixture needed for extracting the quantity of heavy oil or bitumen from the reservoir at the particular rate may be less than a reference amount of energy required for generating only vapor phase DME, but not vapor phase water, needed for extracting the quantity of heavy oil or bitumen from the reservoir at the particular rate. It will be appreciated that, in embodiments, injection of heated DME with no steam will result in a lower production/extraction rate of heavy oil and/or bitumen as compared to pure steam injection or steam and DME injection. In order to extract the quantity of heavy oil or bitumen from the reservoir at the particular rate in the case of pure DME injection, the DME required will be super-heated at an extreme temperature, which will result in additional energy usage compared to extraction using a mixture of steam and DME.

Various water consumption characteristics may govern the methods described herein. For example, in some embodiments, the extracting corresponds to extracting a quantity of heavy oil or bitumen from the reservoir at a particular rate, and an amount of water used for generating the vapor mixture needed for extracting the quantity of heavy oil or bitumen from the reservoir at the particular rate may be less than a reference amount of water required for generating vapor phase water needed for extracting the quantity of heavy oil or bitumen from the reservoir at the particular rate by injecting vapor phase water, but not vapor phase DME, into the reservoir.

In embodiments, various compositions of the vapor mixture are useful with the disclosed techniques. For example, the vapor mixture may have a composition of 0.1-99.9 mol % water and 0.1-99.9 mol % DME. Optionally, the composition of the vapor mixture may change as a function of time and may be continuously varied between 0-100 mol % water and 0-100 mol % DME. Optionally, the vapor mixture comprises alternating feeds of 100 mol % water and 100 mol % DME in sequence, which may also be varied as a function of time. Optionally, the vapor mixture may have a composition of 90-99.9 mol % water and 0.1-10 mol % DME, or a composition of 90-95 mol % water and 5-10 mol % DME.

Optionally, various vapor mixture temperature and pressure characteristics are useful with the disclosed techniques. For example, in embodiments, injecting the vapor mixture includes injecting the vapor mixture at a temperature selected from the range of 320-550 K. It will be appreciated that the temperature of the vapor mixture may change as a function of time and may be continuously varied. Optionally, injecting the vapor mixture includes injecting the vapor mixture at a pressure selected from the range of 10-100 bar. It will be appreciated that the pressure of the vapor mixture may change as a function of time and may be continuously varied.

Optionally, injecting the vapor mixture include using a variable vapor mixture composition as a function of time. For example, the process of generating the vapor mixture may be a time-dependent process, such as where a source feed of water and DME is boiled to generate the vapor mixture, or where separate sources of water and DME are each boiled independently and then mixed to generate the vapor mixture. By adjusting the fractional percentages of water and DME in the final vapor mixture, whether by adjusting the composition of a single source or by adjusting relative amounts of water and DME vapors that are mixed, the composition of the injected vapor mixture can be varied. Variable vapor mixtures compositions as a function of time may represent continuously varying vapor mixture compositions or discretely variably vapor mixtures over time. For example, a variable vapor mixture composition as a function of time may correspond to a monotonically decreasing fraction of DME in the vapor mixture. A variable vapor mixture composition as a function of time may alternatively correspond to discrete step-wise changes to the fraction of DME in the vapor mixture. For example, optionally, the variable vapor mixture composition as a function of time corresponds to the vapor mixture having a first non-zero percentage of DME for a first time duration and the vapor mixture having a second non-zero percentage of DME for a second time duration after the first time duration, such as where the second non-zero percentage of DME is less than the first non-zero percentage.

Optionally, the variable vapor mixture composition as a function of time corresponds to the vapor mixture having a percentage of DME that decreases in a step-wise fashion over time. For example, a percentage or fraction of DME in the vapor mixture can be held constant or approximately constant at a first value (e.g., within 10%) for a first time period, such as one month, several months, one year, etc. During a second time period, the percentage or fraction of DME in the vapor mixture can be held constant or approximately constant at a second, lower value. During a third time period, the percentage or fraction of DME in the vapor mixture can be held constant or approximately constant at a third, even lower value. It will be appreciated that each time period can be the same amount of time or can be different amounts of time. This process can be repeated until only a small fraction of the injected vapor mixture is DME. At some time point, the fraction of DME can be reduced to zero, representing injection of only steam. Such a time point may correspond to a time at which the total amount of injected DME reaches a target amount. Optionally, methods for recovering heavy oil and/or bitumen from a reservoir comprise identifying a target DME amount to inject into the reservoir. Optionally, generating and injecting the vapor mixture may correspond to a process in which increasingly small fractions of DME in the vapor mixture are injected in to the reservoir until the target DME amount is reached, at which point the fraction of DME in the vapor mixture is reduced to zero.

Optionally, one or more non-condensable gases may be injected into the reservoir. For example, methods may further comprise injecting one or more non-condensable gases into the reservoir containing heavy oil or bitumen. Example non-condensable gases include, but are not limited to, methane, ethane, propane, nitrogen, and carbon dioxide. Optionally, all or portions of injected non-condensable gases may accumulate above the chamber. Such accumulation of non-condensable gases may provide, at least in part, a buffer between the chamber and the surroundings, which may be useful, for example, for limiting, minimizing, or otherwise reducing heat loss from the chamber to the surroundings above the chamber, such as compared to the heat losses that occur when a smaller amount or no non-condensable gas accumulates above the chamber. It will be appreciated, for example, that the non-condensable gases can reduce the amount of heat transfer from the chamber to the surroundings since the non-condensable gas is less dense than the condensed liquid at the chamber-edge and will therefore accumulate above the chamber, resulting in reduced condensed liquid-surrounding solid contact. Additionally, the non-condensable gas is much less efficient in transferring heat to the surrounding solid as compared to a liquid due to the difference in thermal conduction properties between gases and liquids.

Optionally, one or more hydrocarbon solvents may be injected into the reservoir, such as a hydrocarbon solvent different from DME. For example, the vapor mixture further includes one or more hydrocarbon solvents. Optionally, hydrocarbon solvents may be injected into the reservoir independently from DME or hydrocarbon solvents may be injected into the reservoir together with DME. For example, methods may include alternating injecting a vapor feed including a hydrocarbon solvent but not DME and a vapor feed including DME but not a hydrocarbon solvent. Example hydrocarbon solvents include, but are not limited to, $C_3$-$C_{10}$ hydrocarbons, such as propane, butane, pentane, hexane, heptane, octane, nonane, and decane, and isomers thereof. It will be appreciated that by injecting hydrocarbon solvents into the reservoir in addition to DME and steam, the partitioning of solvent, oil/bitumen, and DME into oleic and aqueous phases will be more complex than the case of injecting only steam, steam and a hydrocarbon solvent only, or steam and DME only. For example, portions of the injected hydrocarbon solvent may partition into both the oleic phase and the aqueous phase, resulting in improved recovery of heavy oil and/or bitumen as compared to use of the hydrocarbon solvent and steam only.

As an alternative to or in addition to injection of heated vapor, other techniques for adding heat to a reservoir may optionally be employed. For example, an in-situ electrical resistance heater or electromagnetic heater may be constructed in a well, such as a horizontal well, and used to add heat to and/or vaporize injected or condensed liquid, such as DME, water, and optionally a hydrocarbon solvent. Another example heat source may be a closed loop heat transfer fluid system, such as where heated steam, glycol, or other fluid is passed through the closed loop system to deliver heat to deep in the reservoir. When an alternative or additional heat source is used, injection of vapor phase water, DME, and optionally a hydrocarbon solvent is optional in the methods described above. For example, a liquid phase mixture of water, DME, and optionally a hydrocarbon solvent may be injected. As another example, independent streams of liquid phase water, DME, and optionally a hydrocarbon solvent may be injected. Elimination of injecting vapor into a reservoir and instead injecting only liquid may advantageously reduce complexity of the system and also the energy needed, as the liquid may be transitioned to the vapor phase upon heating within the well instead of having to generate vapor above ground. By introducing or generating heat within the reservoir, the liquid present within the reservoir may be vaporized to generate a chamber within the reservoir, similar to the direct injection of vapor.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

BRIEF DESCRIPTION OF THE DRAWINGS

FIG. 16A and FIG. 16B provide 2-D maps for (FIG. 16A) molar flow rate of the bitumen component ($C_D$) in the L phase (moles/day), and (FIG. 16B) molar flow rate of water in the W phase (moles/day) in DME-SAGD at 1.8 years.

at 1.8 years.

Figure 21A:
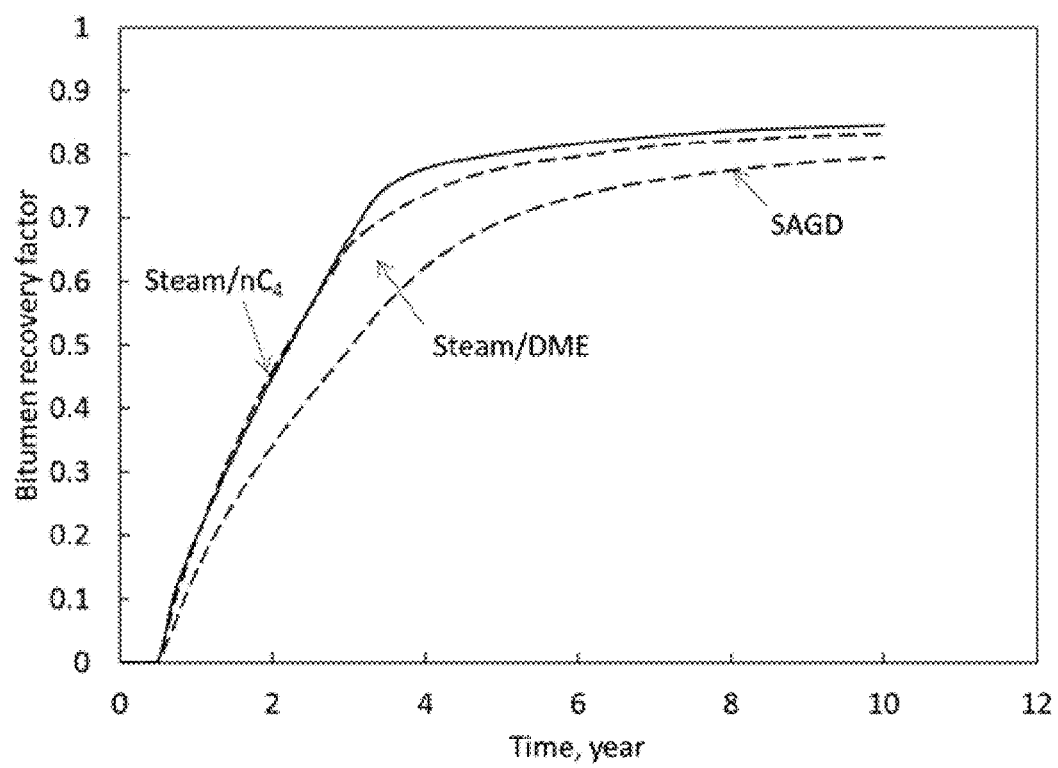
Figure 21B:
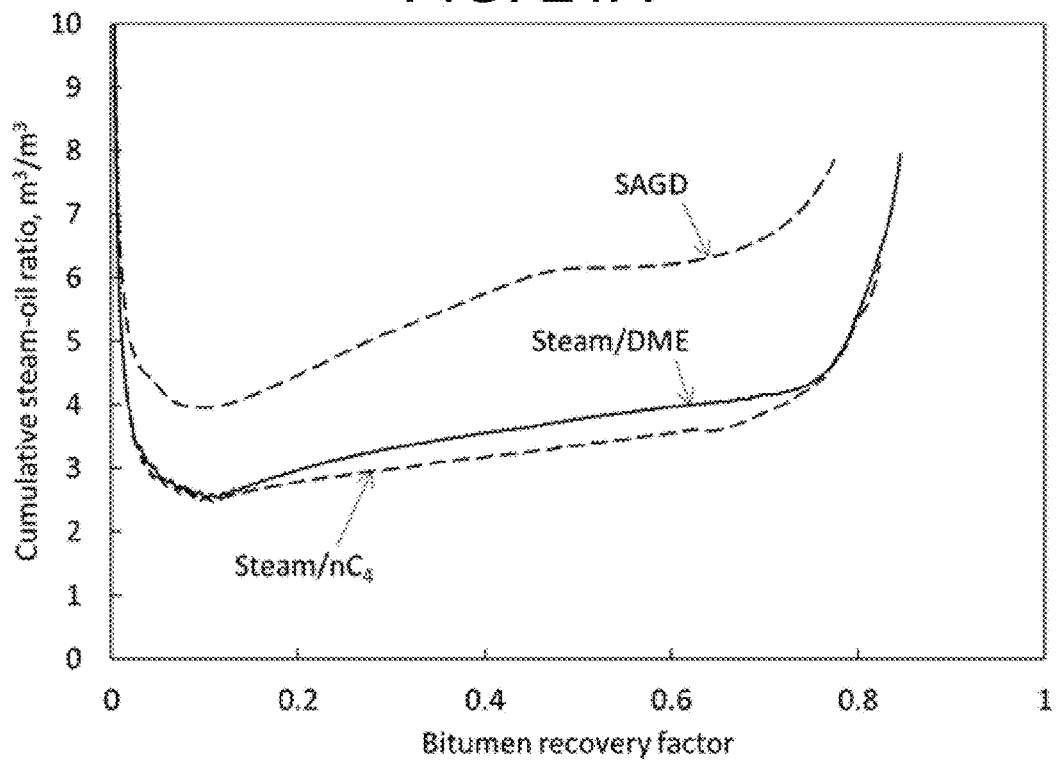
Figure 21C:
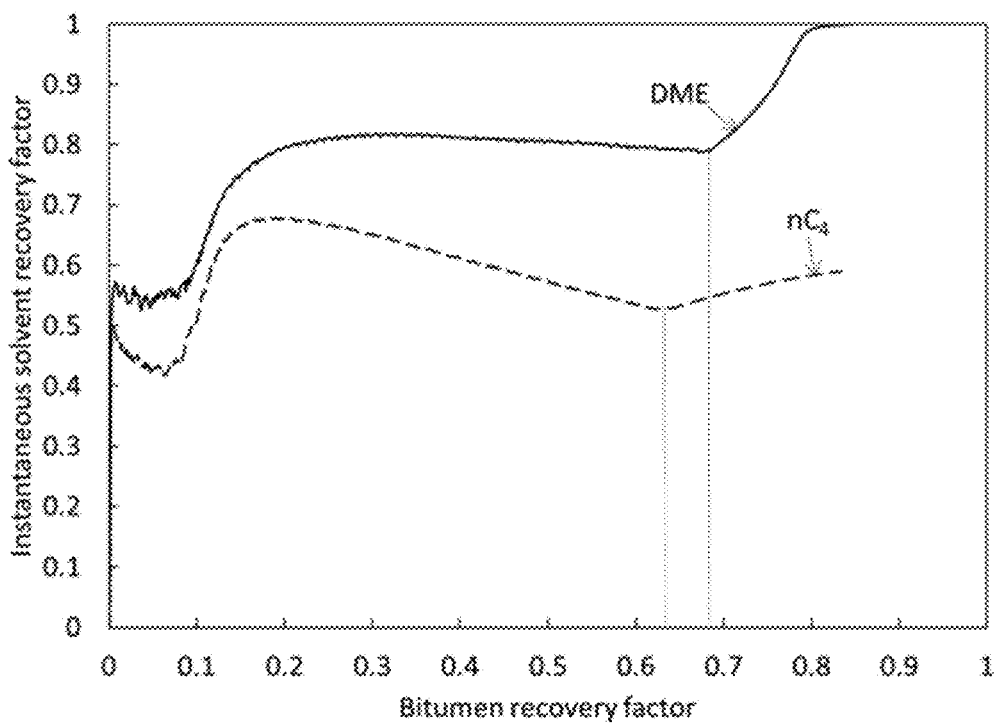

FIG. 21A, FIG. 21B, and FIG. 21C provide data showing comparisons of bitumen recovery, SOR and solvent recovery among $C_4$-SAGD, SAGD and DME-SAGD.

Figure 22A:
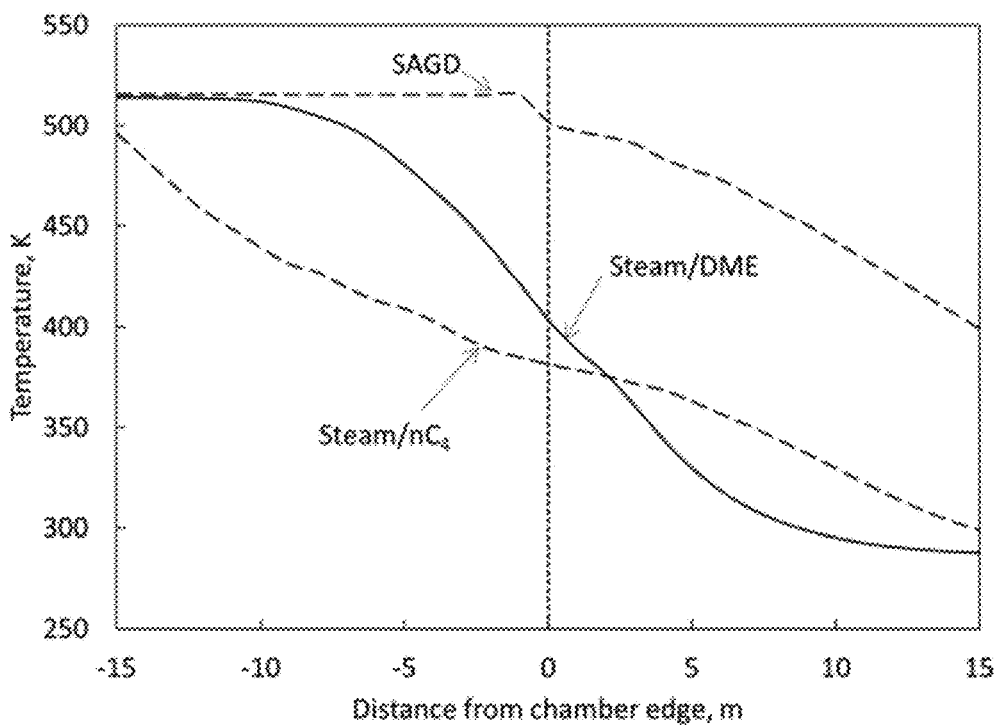
Figure 22B:
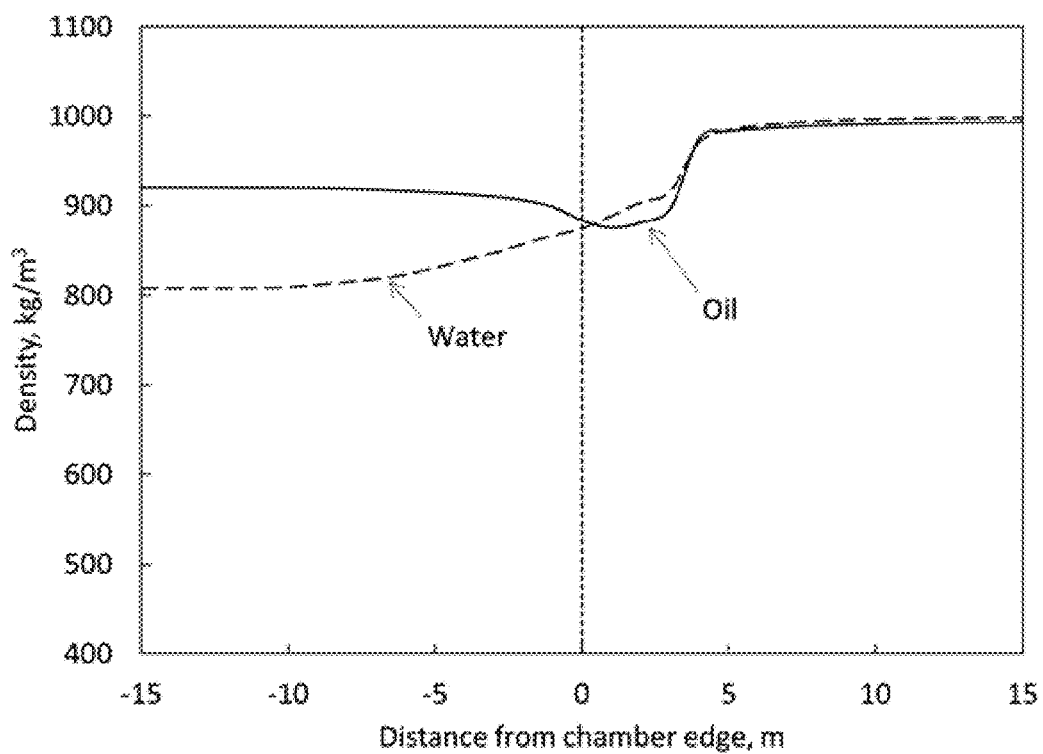

FIG. 22A and FIG. 22B provide data showing profiles of temperature and phase densities for $C_4$-SAGD, DME-SAGD and SAGD at the $12^{th}$ row from the reservoir top at 1.8 years.

Figure 23:
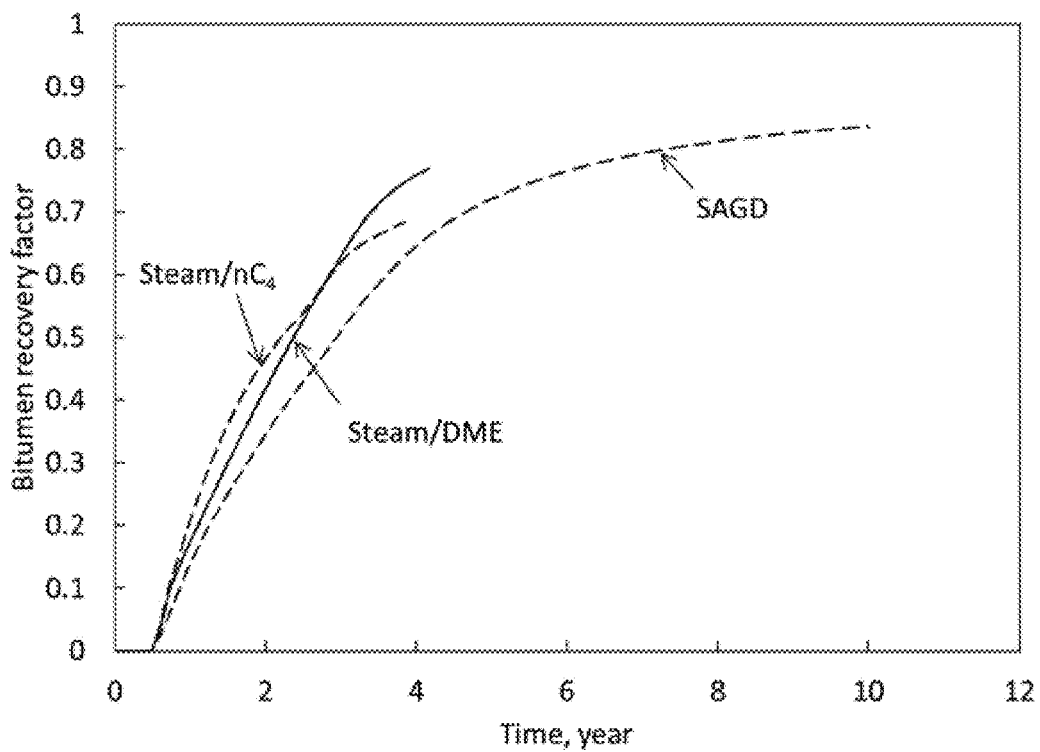

FIG. 23 provides bitumen recovery curves for SAGD, $C_4$-SAGD, and DME-SAGD.

Figure 24:
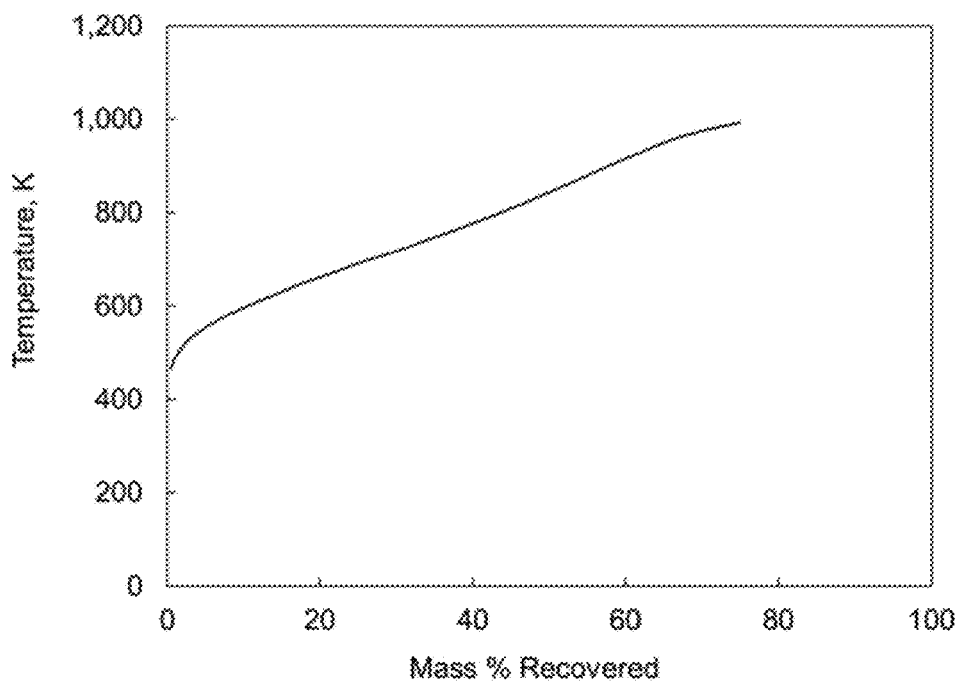

FIG. 24 provides a plot showing simulated distillation results for an Athabasca bitumen sample.

Figure 25:
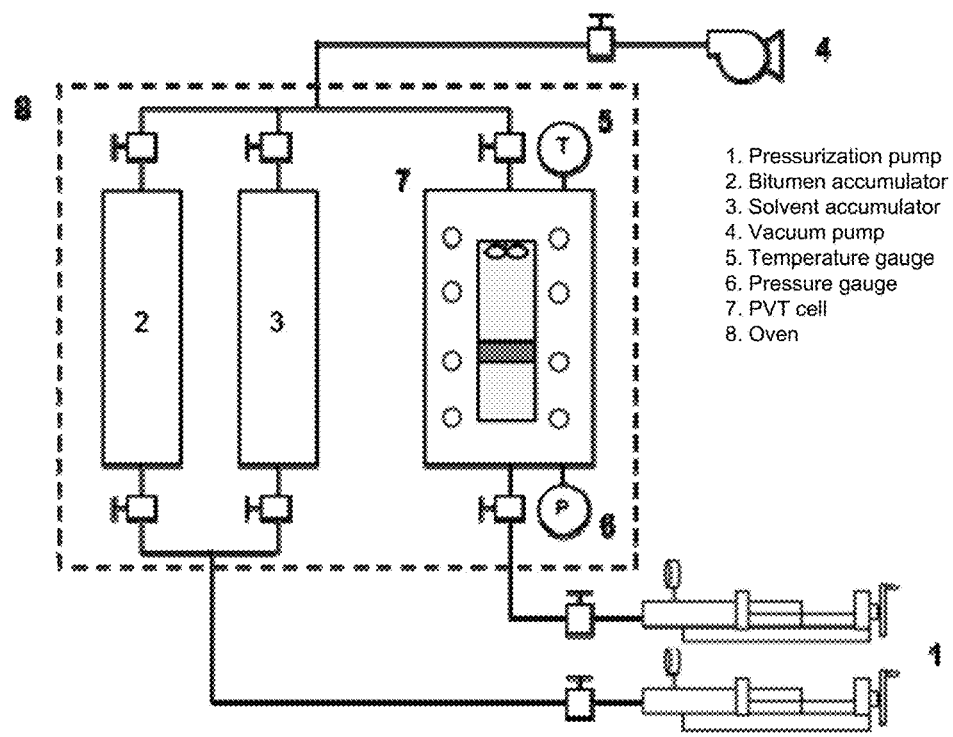

FIG. 25 provides a schematic illustration of an experimental set up for bubble point measurements.

Figure 26:
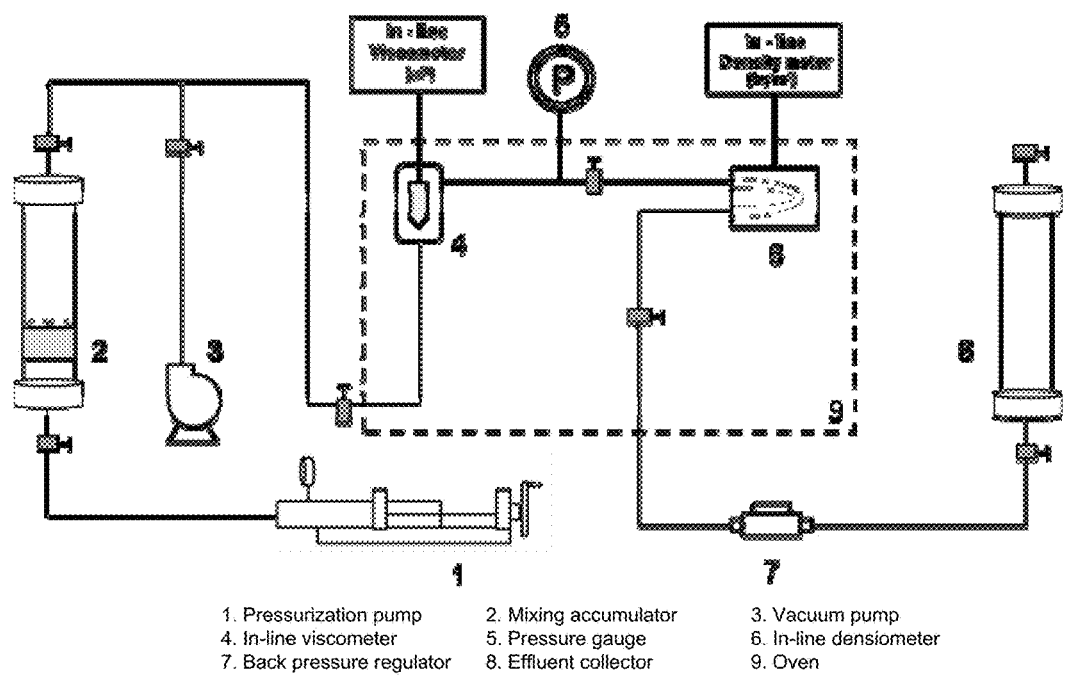

FIG. 26 provides a schematic illustration of an experimental set up for density and viscosity measurements.

Figure 27:
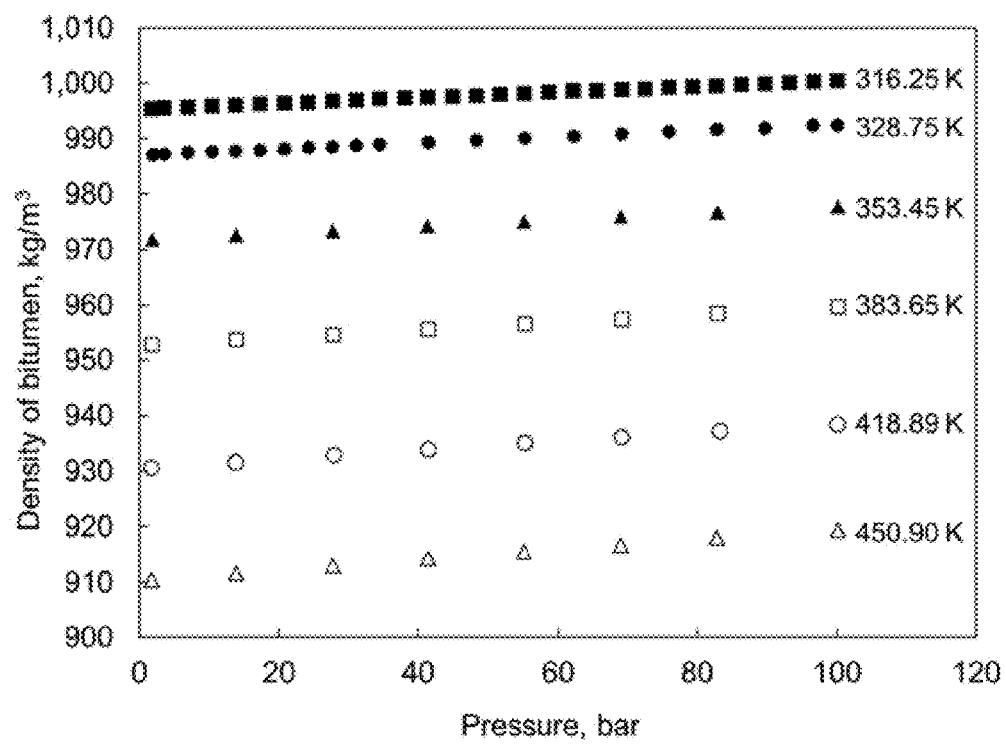

FIG. 27 provides experimental results for bitumen density.

Figure 28:
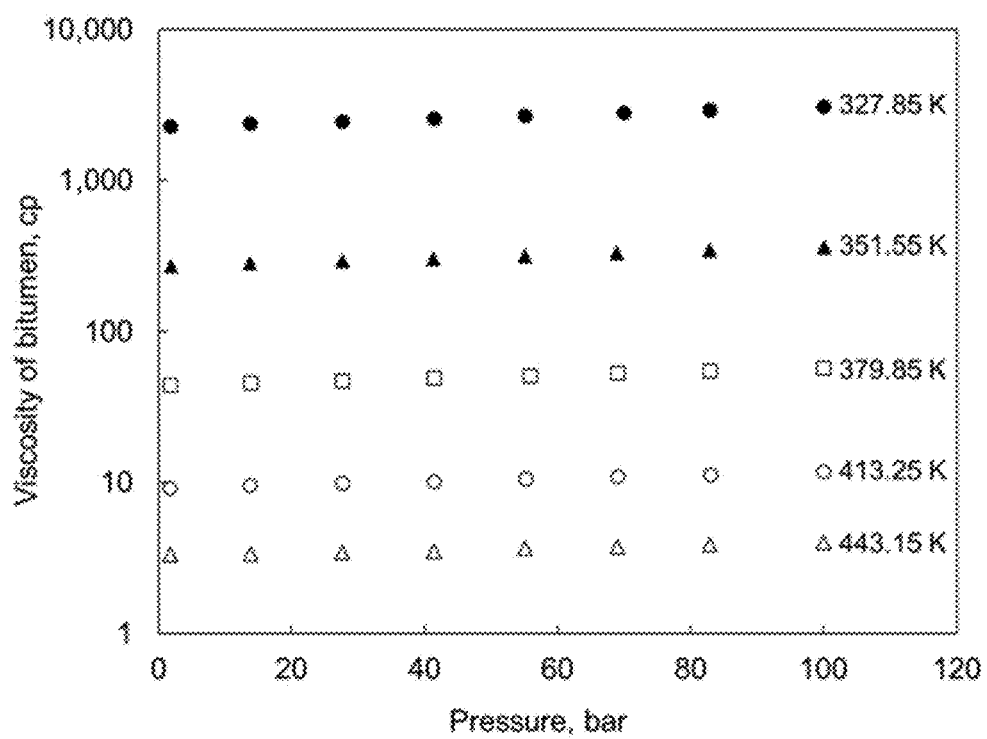

FIG. 28 provides experimental results for bitumen viscosity.

Figure 29:
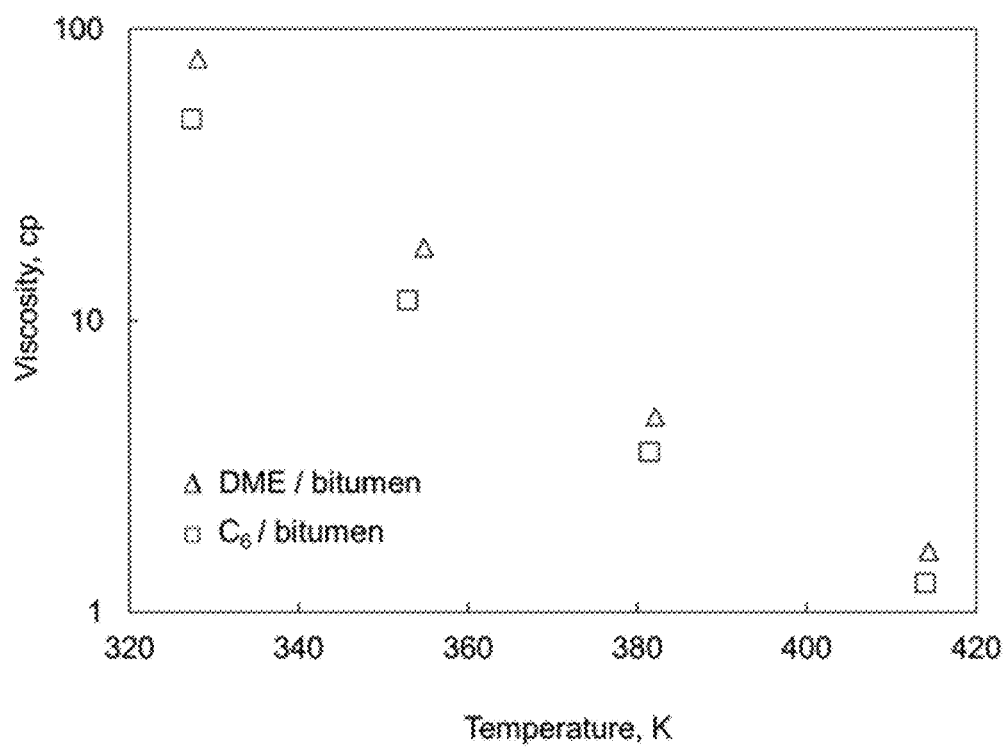

FIG. 29 provides experimental results for equimolar mixture of solvent and bitumen, DB-5 and HB-3, at 60 bars.

Figure 30A:
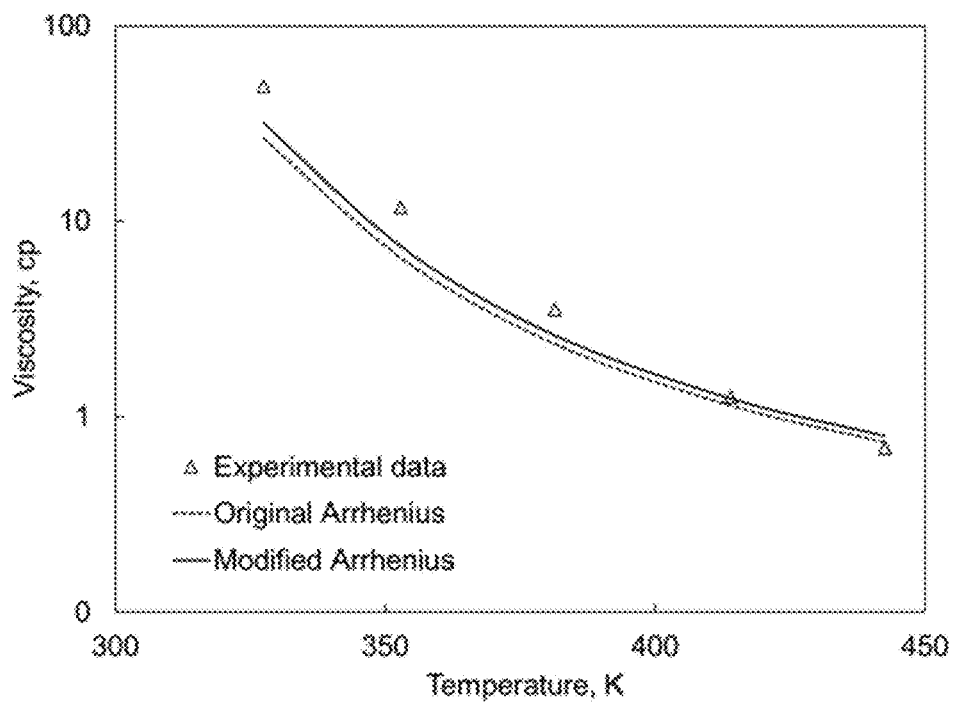
Figure 30B:
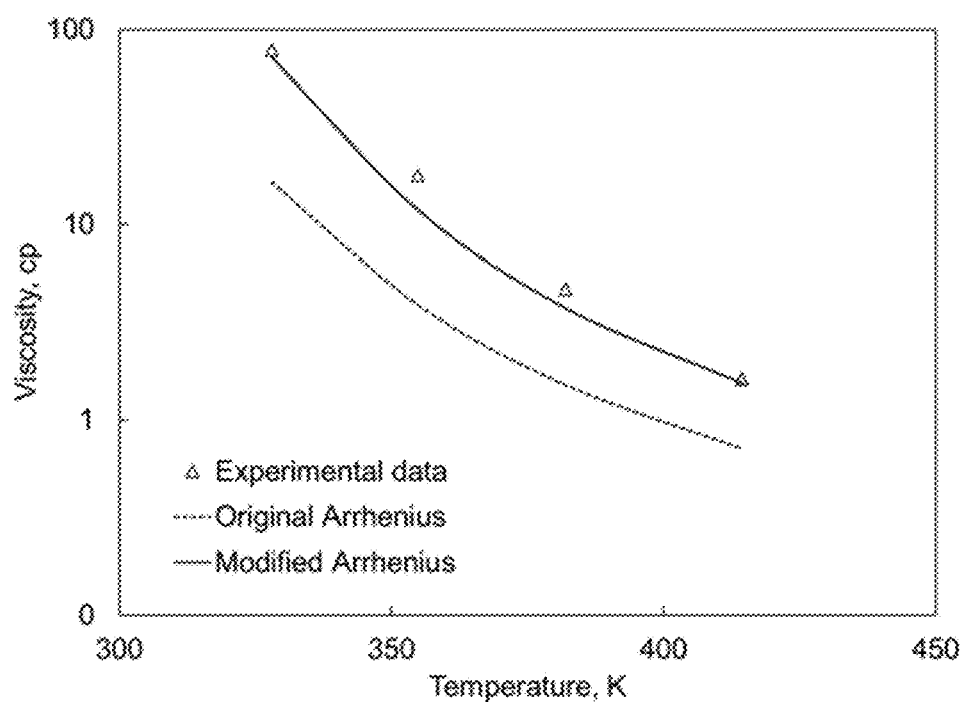

FIG. 30A and FIG. 30B provide plots showing correlations by use of the original and modified Arrhenius equations are compared with the experimental data (50 mol % solvent/50 mol % bitumen) at 60 bars.

Figure 31:
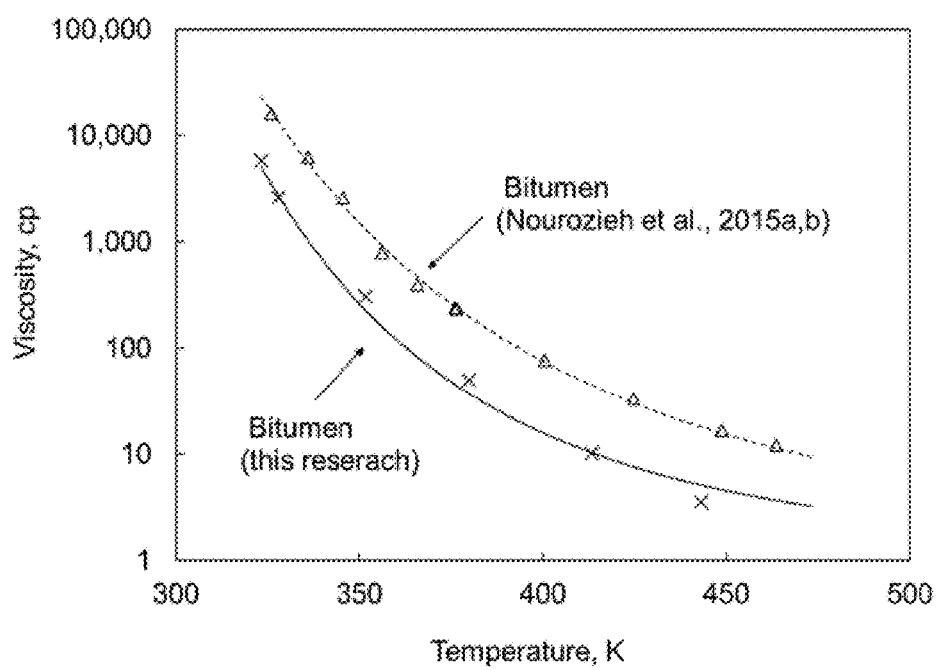

FIG. 31 provides data showing viscosity for bitumen.

Figure 32A:
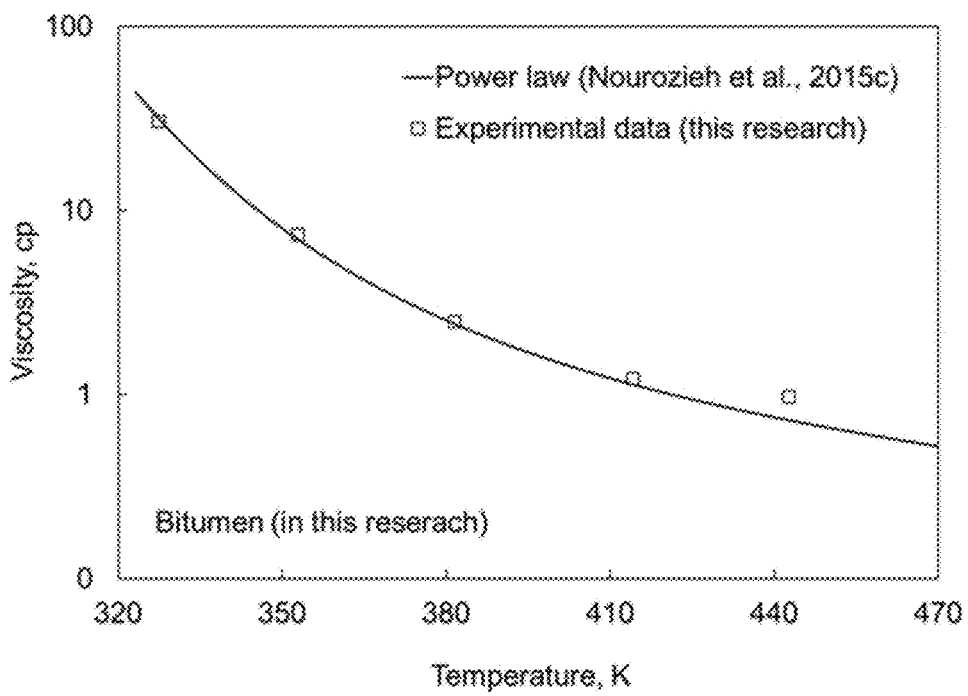
Figure 32B:
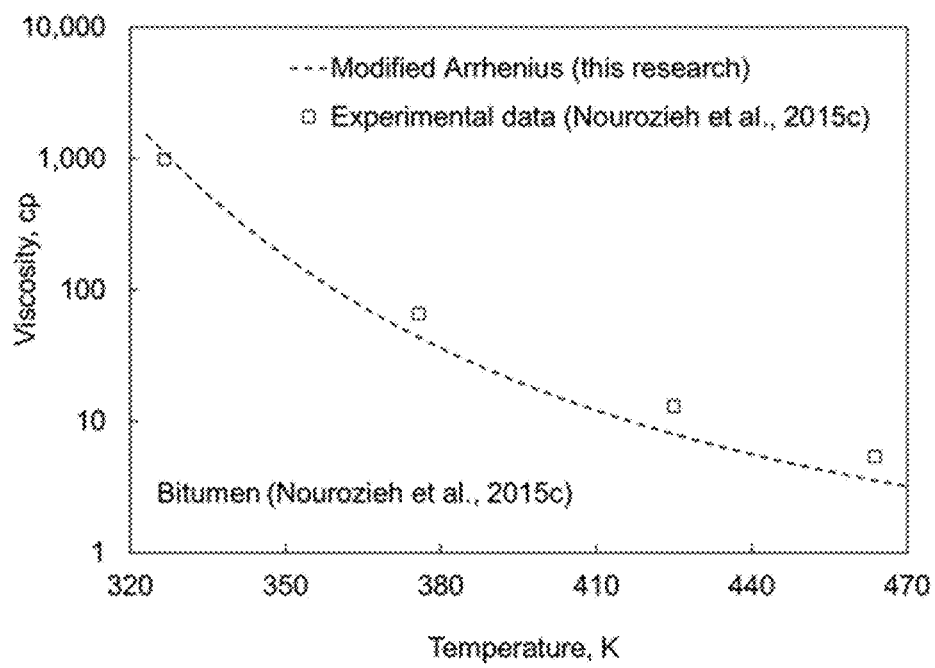

FIG. 32A and FIG. 32B provide plots showing a cross-check of power law model and modified Arrhenius model to correlate experimental data.

Figure 33:
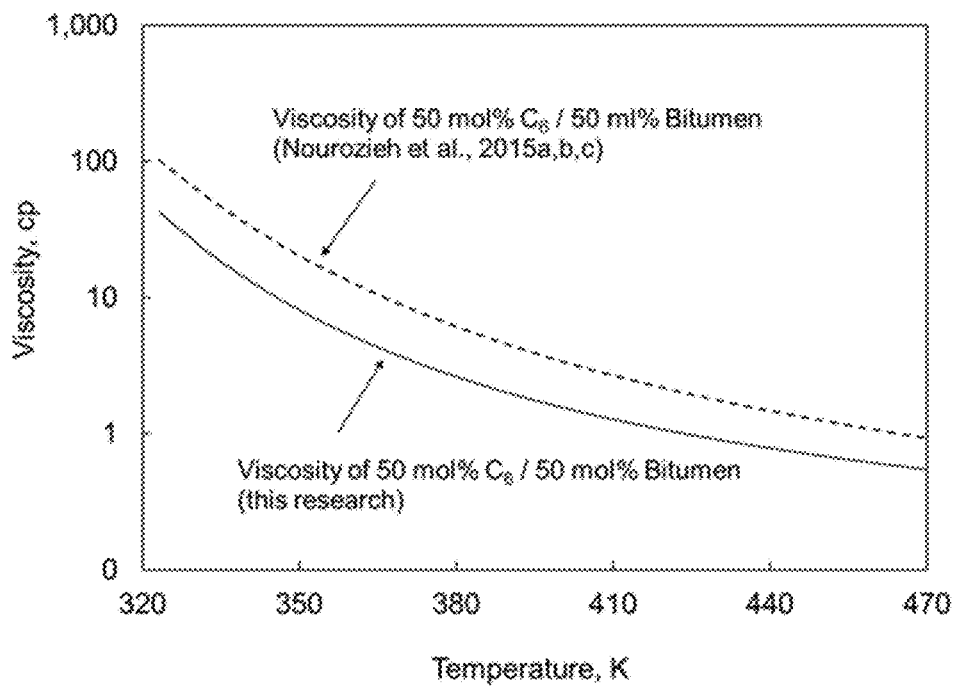

FIG. 33 provides a plot showing viscosity of 50 mol % n-hexane ($C_6$)/50 mol % bitumen at 35 bars.

Figure 34:
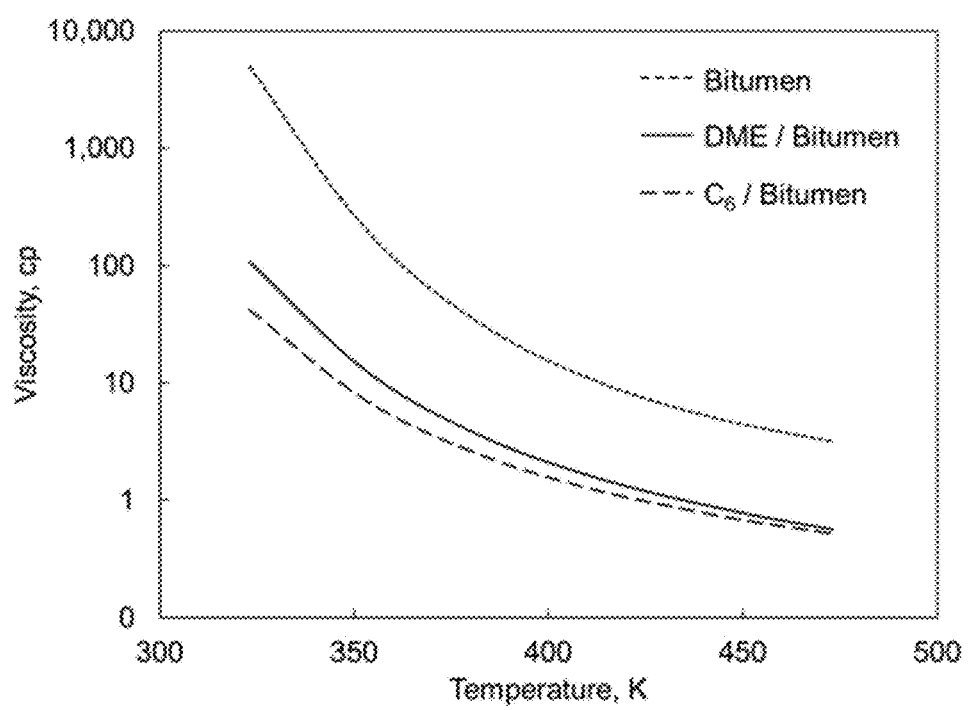

FIG. 34 provides a plot showing a viscosity comparison for bitumen, the equimolar mixtures of bitumen with DME and bitumen with n-hexane ($C_6$) at 35 bars.

Figure 35A:
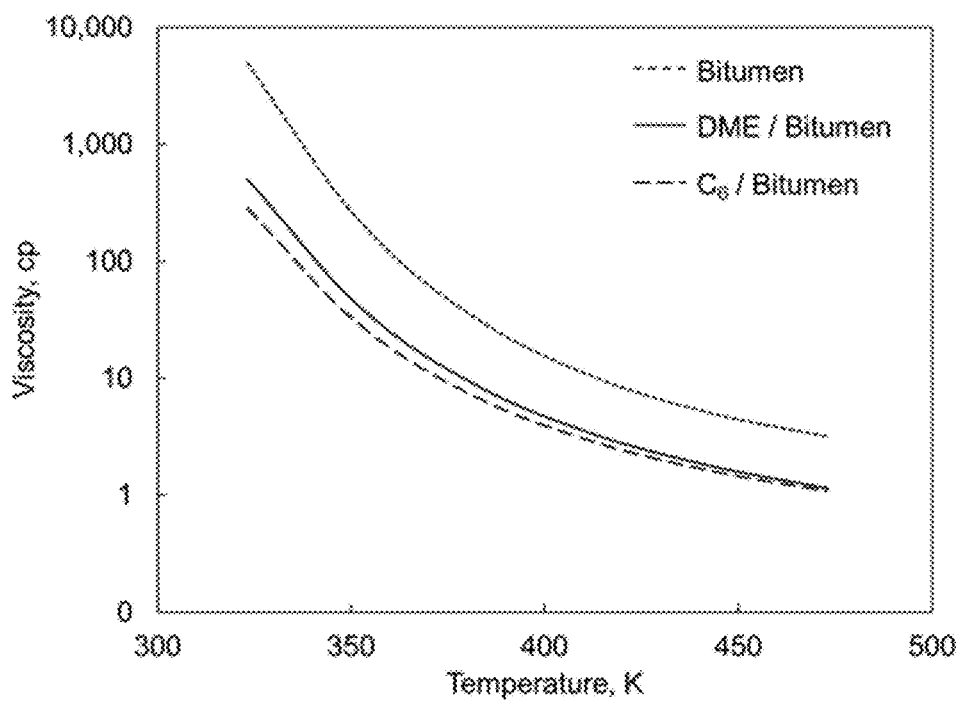
Figure 35B:
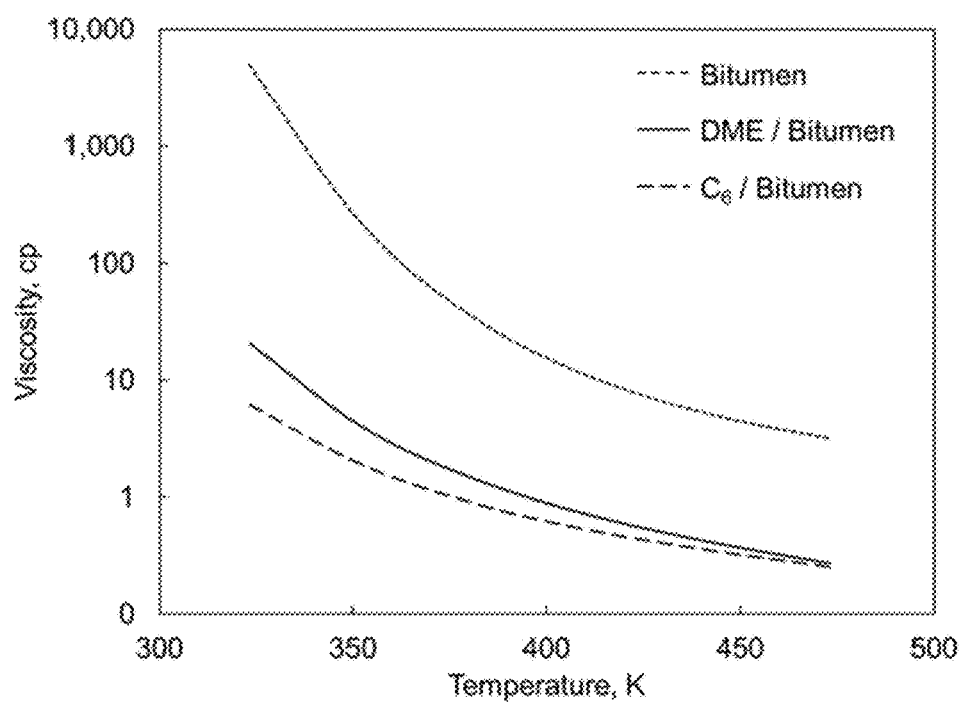

FIG. 35A and FIG. 35B provide plots showing a viscosity comparison for DME/bitumen, n-hexane ($C_6$)/bitumen and bitumen at 35 bars with different concentrations of solvent: 30 mol % and 70 mol %.

Figure 36A:
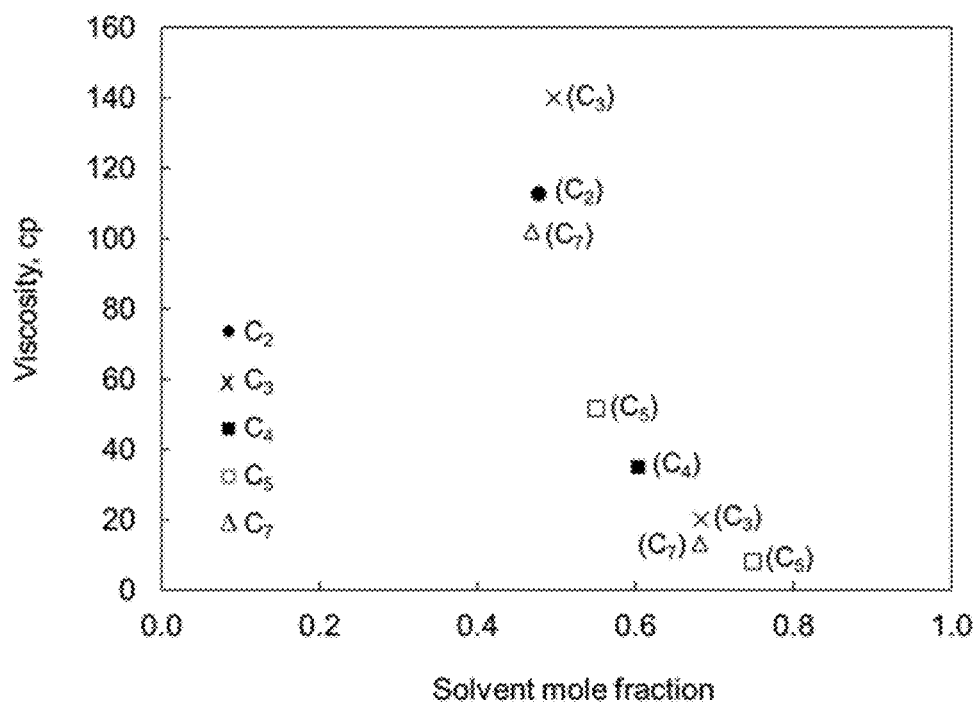
Figure 36B:
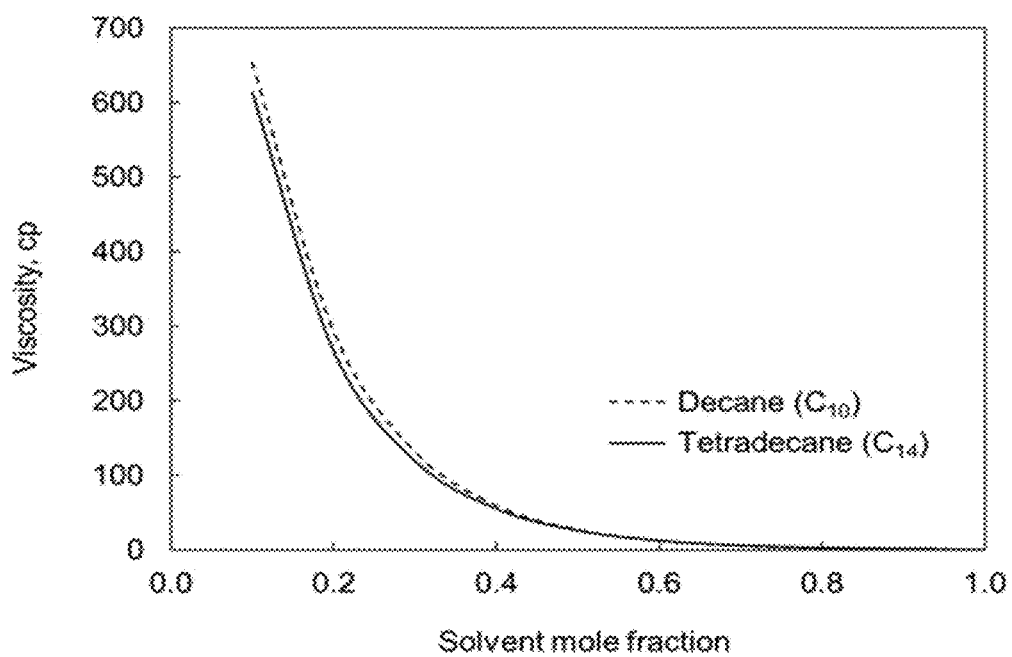

FIG. 36A and FIG. 36B provide plots of experimental data.

Figure 37:
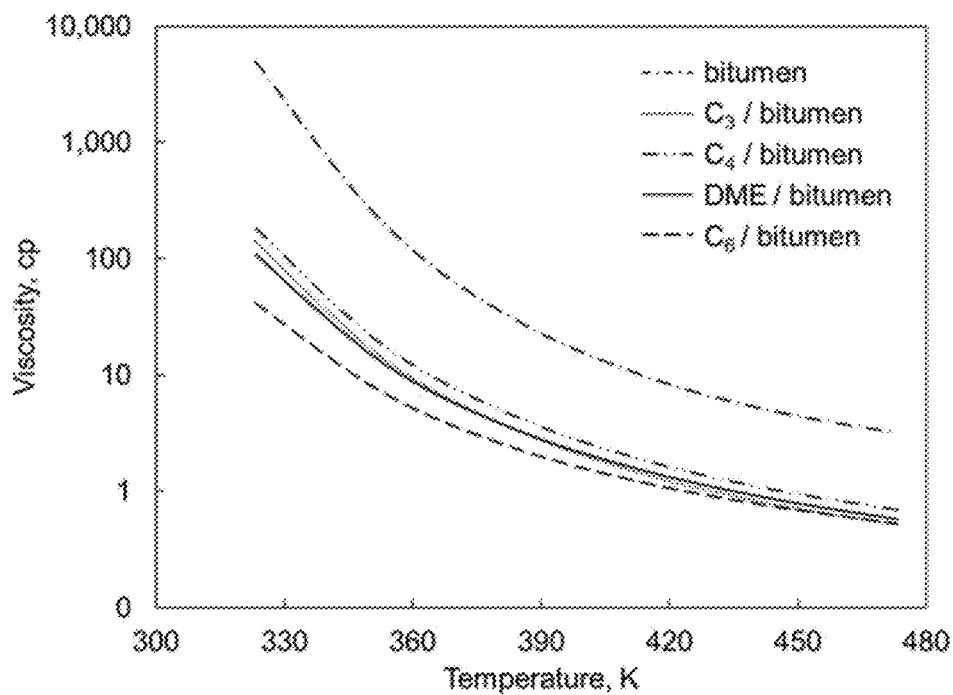

FIG. 37 provides a plot showing comparison between n-alkanes and DME in terms of bitumen dilution at 50 mol % solvent concentration at 35 bars.

Figure 38:
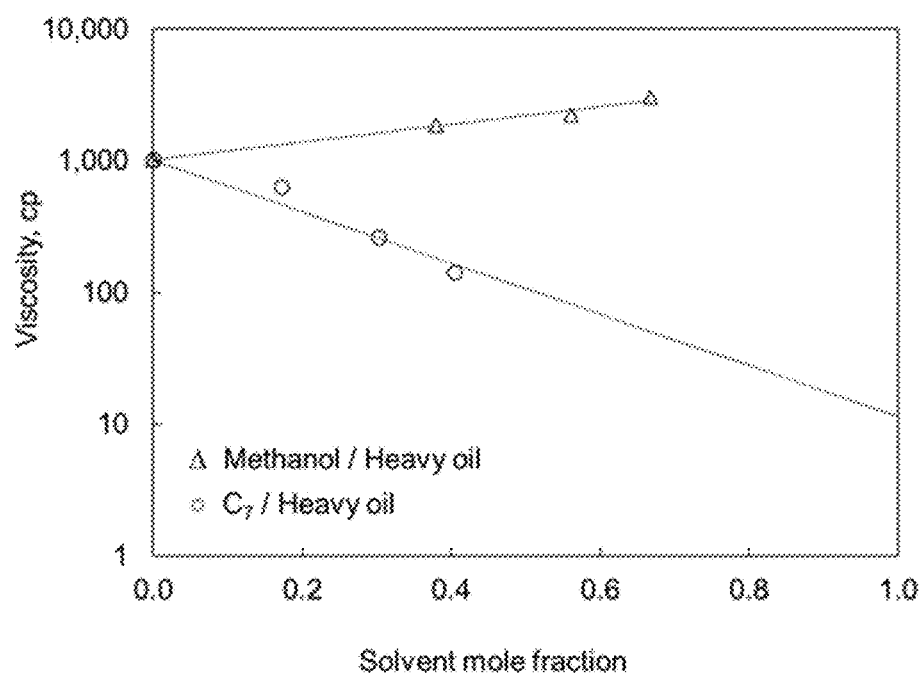

FIG. 38 provides data showing a comparison of viscosities measured for n-heptane ($C_7$)/heavy oil and methanol/heavy oil mixtures at 293.15 K and atmospheric conditions.

DETAILED DESCRIPTION

I. General

The present invention relates generally to oil recovery techniques, which may include enhanced oil recovery techniques. The disclosed techniques may provide a combination of heat injection and chemical injection techniques, in which a heated combination of water vapor (steam) and dimethyl ether (DME) vapor are injected into an oil reservoir, such as containing heavy oil and/or bitumen. In the reservoir, the heated vapor heats and thins the heavy oil and/or bitumen and the heavy oil and/or bitumen is diluted by DME.

The inventor has found that the use of DME in combination with water in the injected vapor provides surprisingly advantageous results, particularly when compared with steam injection alone, DME injection alone, or steam injection in combination with other hydrocarbon solvents. The inventor has determined that the thermodynamic, fluid, and chemical properties of the DME/water/heavy oil and/or bitumen in the reservoir allow the combined injection of DME and steam to achieve lower chamber-edge temperatures than steam injection alone, lower chamber-edge temperatures than steam injection in combination with other less-volatile hydrocarbon solvents, such as $C_6$-$C_{10}$, higher chamber-edge temperatures than DME injection alone, or higher chamber-edge temperatures than steam injection in combination with other hydrocarbon solvents of which vapor pressures are similar to that of DME. In embodiments, the temperature benefits may be attributable to the solubility of DME in water. This lower chamber-edge temperature in the DME/steam case results in a smaller amount of heat lost to the surroundings of the reservoir in comparison with steam injection alone and steam injection in combination with other less-volatile hydrocarbon solvents, such as $C_6$-$C_{10}$. It will be appreciated that while a higher chamber edge-temperature results in a higher achievable temperature for the heavy oil and/or bitumen in the reservoir proximal to the injection site, more heat may be lost to the surrounding as the temperature becomes higher. Although the higher temperature allows the viscosity of the heavy oil and/or bitumen to be reduced, due to thermal effects, to a level that allows the heavy oil and/or bitumen to more easily flow and be extracted from the reservoir, the heat loss may be more substantial as the temperature increases. It will be appreciated, however, that the temperature reduction may not be large when a small percentage of DME is present in the chamber, such as about 5 mol % DME and 95 mol % water.

In the case of steam/DME injection, the reduction in temperature may be offset, at least in part, by dilution effects of DME mixing with the heavy oil and/or bitumen. This dilution alone would result in a decreased viscosity to a liquid oil phase containing heavy oil and/or bitumen and DME as compared to a liquid oil phase containing only heavy oil and/or bitumen. The combined effects of dilution and temperature allow for a reduction in the amount of water and/or energy necessary for extracting heavy oil and/or bitumen from a reservoir at a particular flow rate as compared to extraction of heavy oil and/or bitumen at the same flow rate using only steam injection alone or only DME injection alone.

In many embodiments, only a small amount of DME in the injection mixture is needed to achieve the benefits described herein, such as a mixture of 1-10 mol % DME and 90-99 mol % steam. Without wishing to be bound by any theory, the steam acts as a carrier gas to bring DME to the chamber-edge, where the DME can accumulate and obtain the dilution benefits described above. The steam also provides a source of thermal energy and the latent heat of vaporization of water is a large contributor to the amount of thermal energy provided by the steam. Inside the chamber, the conditions may be similar to that of the steam only case, where the larger amount of steam as compared to DME may generally dictate the conditions. At the chamber-edge, where condensation occurs, the steam may be preferentially condensed, bringing more water out of the vapor phase than DME. Due to the higher vapor pressure of DME as compared to water, the DME may remain at a higher concentration in the vapor phase at the chamber edge, resulting in an accumulation of DME at the chamber-edge. As the DME condenses due to loss of heat to the heavy oil and/or bitumen at the chamber-edge, the DME may dilute and/or more readily dilute the heavy oil and/or bitumen, allowing the heavy oil and/or bitumen to more easily flow.

It will be appreciated that while some hydrocarbon solvents, such as $C_6$-$C_{10}$ solvents, may be useful for co-injection with steam, similar to the steam/DME injection processes described herein, the energy loss in the cases of $C_6$-$C_{10}$ hydrocarbon/steam co-injection processes will be greater than the energy losses in the case of steam/DME co-injection due to a lower chamber-edge temperature in the steam/DME co-injection case as compared to the $C_6$-$C_{10}$ hydrocarbon/steam co-injection cases. Additionally, a larger amount of heavy oil and/or bitumen may be mixed with DME because DME can partition into not only the oleic and vapor phases, but also the aqueous phase, which increases the contact between DME and heavy oil or bitumen. In addition, the economics of heavy oil and/or bitumen recovery by steam/DME co-injection may be better than $C_6$-$C_{10}$ hydrocarbon/steam co-injection, in part due to the extra heat loss when $C_6$-$C_{10}$ hydrocarbon/steam are co-injected because of higher chamber-edge temperatures, in part due to the larger amount of heavy oil and/or bitumen that may be mixed with DME because of the additional partitioning of DME into the aqueous phase (which is not achievable by $C_6$-$C_{10}$ hydrocarbon solvents), and in part due to the higher cost of $C_6$-$C_{10}$ hydrocarbon solvents as compared to DME.

II. Definitions

In general the terms and phrases used herein have their art-recognized meaning, which can be found by reference to standard texts, journal references and contexts known to those skilled in the art. The following definitions are provided to clarify their specific use in the context of the invention.

"Heavy oil" refers to a viscous petroleum product that cannot flow easily under atmospheric pressure and room temperature conditions. The restriction on flow of heavy oil may be due to its large viscosity, such as a viscosity of about 1000-5000 cP, 5000-10000 cP or about 1000-10000 cP. Heavy oil may also be characterized by an American Petroleum Institute (API) gravity of less than about 20°, such as an API gravity of between about 10° and about 20°. In some embodiments, heavy oil may be induced to flow by heating or diluting with lighter hydrocarbons to reduce the viscosity to a level that the heavy oil can flow more easily.

"Bitumen" refers to a viscous or semi-solid petroleum product that cannot flow easily under atmospheric pressure and room temperature conditions. The restriction on flow of bitumen may be due to its large viscosity, such as a viscosity of greater than or about 10000 cP. Bitumen may also be characterized by an American Petroleum Institute (API) gravity of less than about 10°, such as an API gravity of between about 4° and 10°. Bitumen may be present underground in an oil sands deposit, for example. In some embodiments, bitumen may be induced to flow by heating or diluting with lighter hydrocarbons to reduce the viscosity to a level that the bitumen can flow more easily.

"Reservoir" refers to an underground deposit of petroleum, which may include heavy oil and/or bitumen. Reservoirs may include rocks or minerals that exhibit a high porosity and so can contain large concentrations of petroleum products. Reservoirs may also include pools of pure or substantially pure petroleum that fill voids between subsurface layers.

"Injecting" refers to a process of introducing a heated fluid stream into a reservoir, such as a vapor stream containing water and dimethyl ether (DME). Injecting may include feeding high-pressure vapor into the inside the reservoir such that the vapor may flow into the reservoir and heat the petroleum within the reservoir surrounding the region where the injection occurs.

"Chamber" refers to a region within a reservoir surrounding a location where heated vapor is injected into the reservoir and where the injected vapor remains in the vapor phase. In embodiments, a chamber corresponds to a region of the reservoir where the temperature and pressure conditions are sufficient for the components of the vapor to remain in the gas phase (i.e., above the boiling point of the vapor constituents or mixture). In some embodiments, liquid phases of materials may be present in the chamber, such as a liquid oil phase and a liquid aqueous phase. In embodiments, as additional vapor is injected into a reservoir, the chamber may change in size, volume, shape, and position.

"Chamber-edge" refers to the interfacial region surrounding a chamber in a reservoir at which condensation of injected vapor occurs. In embodiments, condensation of the injected vapor releases latent heat to the material surrounding the chamber at the chamber-edge. In embodiments, as additional vapor is injected into a reservoir, the chamber-edge may change in size, volume, shape, and position.

"Heated region" refers to a region surrounding a chamber in a reservoir which is heated by conduction of heat introduced into the reservoir by injection of a heated vapor stream to a level beyond the ambient temperature. In embodiments, the ambient temperature may refer to the natural temperature of the reservoir, the temperature of the reservoir prior to the injection of the heated vapor stream, and/or the temperature of the reservoir in regions surrounding the heated region and chamber in which heat introduced from the injection of the heated vapor stream does not reach or does not substantially change the temperature (e.g., more than 1 K from a natural or baseline temperature).

"Liquid oil phase" refers to a liquid phase of material that is generally immiscible with water and that includes one or more hydrocarbon materials, such as petroleum, like heavy oil or bitumen. In embodiments, a liquid oil phase may include heavy oil, bitumen, and/or oil soluble species or hydrocarbon solvents, such as dimethyl ether. In some embodiments, a liquid oil phase may contain a small amount of water, and the possible amount of water may be indicated by a phase diagram.

"Liquid aqueous phase" refers to a liquid phase of material that is generally immiscible with oil and that includes water, dissolved salts or compounds, and other dissolved or soluble materials. In embodiments, a liquid aqueous phase may include water and water soluble substances, such as dimethyl ether. In some embodiments, a liquid aqueous phase may contain a small amount of oil, such as heavy oil and/or bitumen, and the possible amounts may be indicated by a phase diagram.

III. Vapor Generation

Figure 1A:
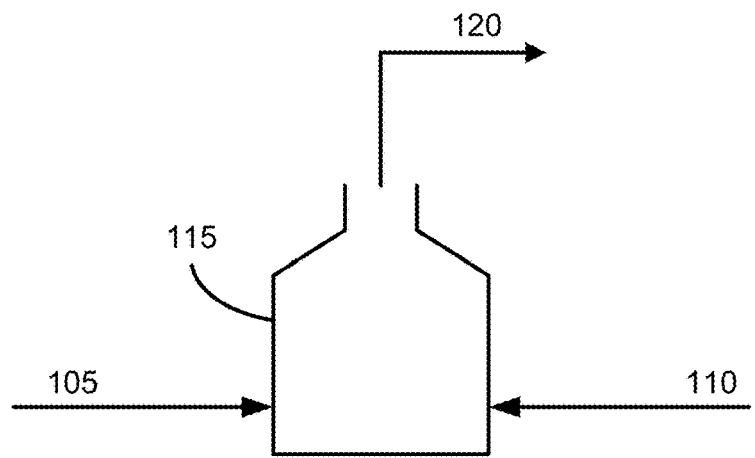
FIG. 1A and FIG. 1B provide schematic illustrations of vapor generation systems.
Figure 1B:
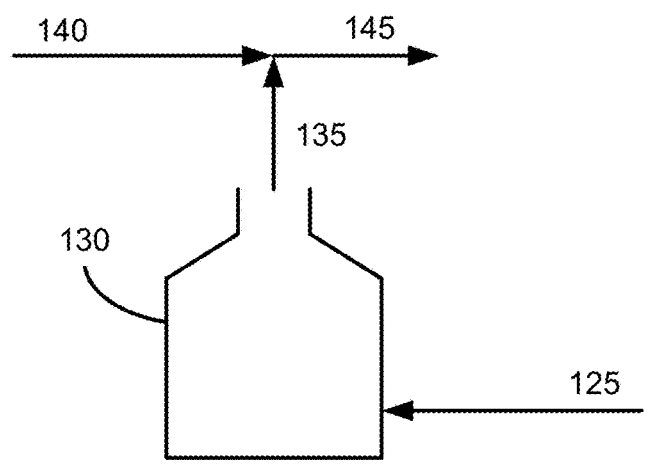

FIG. 1A and FIG. 1B provide schematic overviews of different techniques to generate a vapor mixture. In FIG. 1A, water 105 and DME 110 are fed into a heating unit 115, such as a boiler, and mixed, and the temperature of the mixture is increased until the mixture is heated to its boiling temperature to generate a flow 120 of vapor phase water and vapor phase DME. It will be appreciated that the pressure and/or temperature within and/or downstream of the heating unit 115 may be controlled to generate a flow 120 of the vapor mixture at a desired temperature and pressure. In embodiments, the composition of the vapor mixture may be controlled by controlling amounts or flow rates of water 105 and DME 110 fed to heating unit 115.

In FIG. 1B, water 125 is fed into a heating unit 130 and the temperature is increased to generate a flow 135 of steam. Downstream of the heating unit 130, DME 140 is added to flow 135 to generate a flow 145 of vapor phase water and vapor phase DME. It will be appreciated that the pressure and/or temperature within and/or downstream of the heating unit 130 may be controlled to generate a flow 145 of the vapor mixture at a desired temperature and pressure. In embodiments, the composition of the vapor mixture may be controlled by controlling amounts or flow rates of DME 140 fed downstream of heating unit 130. Alternative, the roles of water 125 and DME 140 may be reversed such that DME 140 is fed to heating unit 130, while water 125 is added to flow 135 to generate flow 145.

It will be appreciated that various fluid flow systems and devices may also be utilized for the generation and injection of the vapor mixture into a reservoir, which are not explicitly depicted in FIGS. 1A and 1B.

Depending on the specific composition of bitumen or heavy oil in a reservoir or the particular injection temperature and pressure conditions, different vapor mixture compositions may be useful with the disclosed methods. For example, in some embodiments the vapor mixture has one or more of a variable injection pressure as a function of time, a variable injection temperature as a function of time, or a variable composition as a function of time. In this way, different stages of injection can be provided with different conditions. For example, in one embodiment, an initial stage of injection may use a higher pressure and/or a higher injection temperature, while a later stage of injection may use a lower pressure and/or a lower injection temperature. For example, reducing a temperature of a later injection stage may be useful for limiting heat losses.

In general the vapor mixture has a composition of 0-100 mol % water and 0-100 mol % DME. In some embodiments, the vapor mixture has a composition of 0.1-99.9 mol % water and 0.1-99.9 mol % DME. It will be appreciated that, in some embodiments, vapors of 100 mol % water and 100 mol % DME can be used in separate portions of an injection, such as where the vapor comprises alternating feeds of about 100 mol % water and about 100 mol % DME in sequence, such as in a cyclic or alternating sequence. Different vapor mixture compositions may be useful for adjusting the temperature of the chamber-edge, the size of the chamber, the size of the heated region, the rate at which heavy oil and/or bitumen can be extracted, etc. It will be appreciated that other conditions may also impact some of these aspects.

For example, a temperature and/or pressure of the injected vapor mixture may also impact the size of the chamber, the size of the heated region, the rate at which heavy oil and/or bitumen can be extracted, etc. In some embodiments, injecting the vapor mixture includes injecting the vapor mixture at a temperature selected from the range of 320-550 K. In some embodiments, the injected vapor mixture has a temperature selected from the range of 350-500 K. In some embodiments, the injected vapor mixture has a temperature selected from the range of 320-435 K. In some embodiments, the injected vapor mixture has a temperature selected from the range of 435-550 K. In some embodiments, injecting the vapor mixture includes injecting the vapor mixture at a pressure selected from the range of 10-100 bar. In some embodiments, the vapor mixture has a pressure selected from the range of 25-75 bar. In some embodiments, the vapor mixture has a pressure selected from the range of 10-50 bar. In some embodiments, the vapor mixture has a pressure selected from the range of 50-100 bar.

IV. Vapor Injection

Figure 2A:
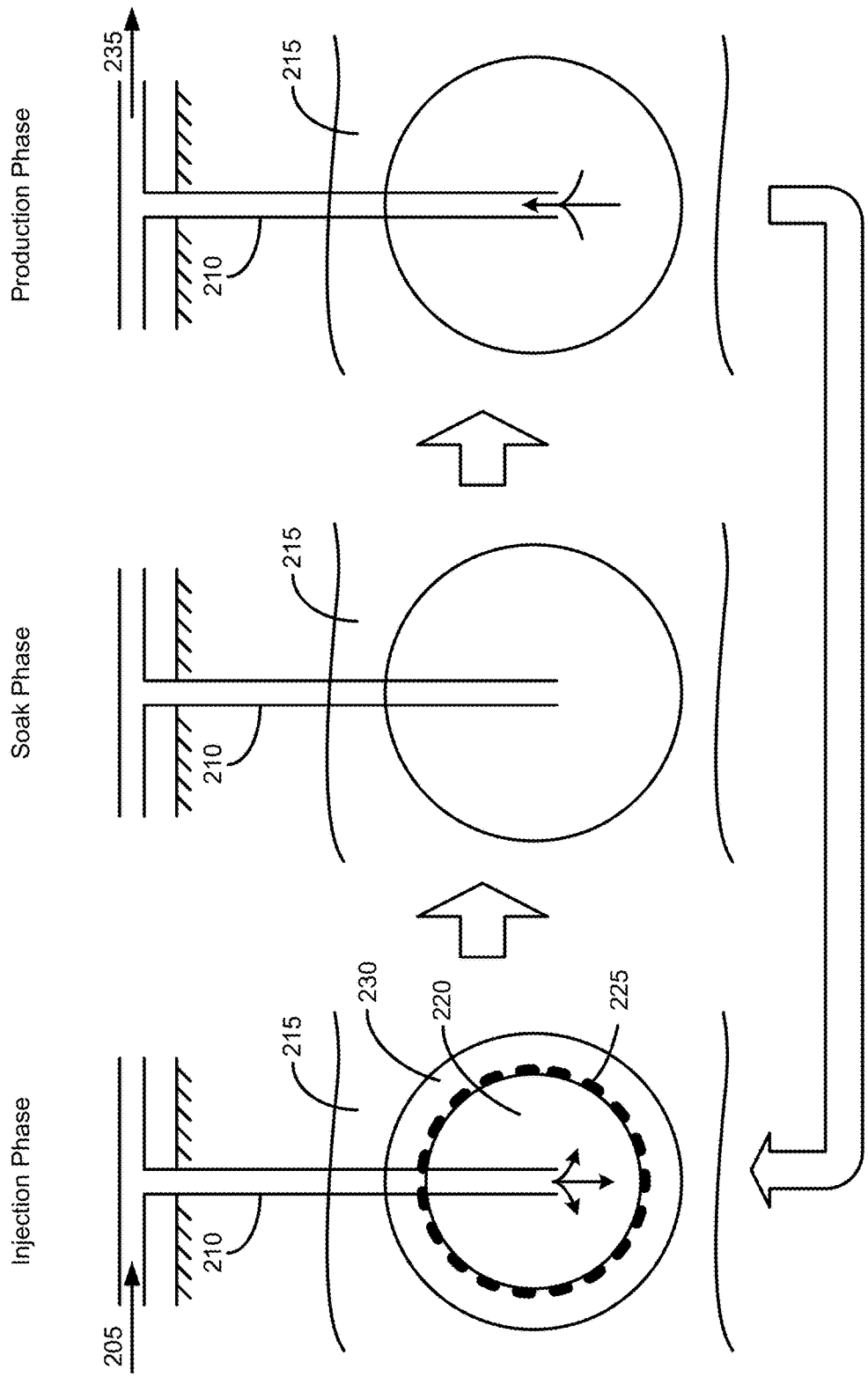
FIG. 2A and FIG. 2B provide schematic illustrations of different vapor injection techniques.

FIG. 2A provides a schematic illustration of a vapor injection process in which a vapor mixture is injected into a reservoir. For example, this embodiment may correspond to a cyclic steam stimulation oil recovery technique. Initially, the vapor mixture 205 is injected into a well bore 210 within a reservoir 215 during an injection phase. The injection phase may continue for a certain amount of time, such as a number of days or weeks, for example. During the injection phase, the pressurized and heated vapor mixture 205 from the well bore 210 may expand to form a chamber 220 within the reservoir 215 and the vapor may condense at the chamber edge 225. The condensed vapor may still be hot, such as at a condensation temperature of the vapor, and a heated region 230 may surround the chamber 220. The vapor injection process may be stopped after a certain amount of time, as described above, and the heat provided by the injected pressurized and heated vapor may be allowed to dissipate and/or equilibrate throughout the heated region and/or chamber region during a soak phase, to allow the heavy oil and/or bitumen present in the reservoir to heat such that its viscosity reduces. The soak phase may continue for a certain amount of time, such as a number of days, for example. After the soak phase, the production phase may begin, where heavy oil or bitumen 235 is extracted from reservoir 215 through the well bore 210. The production phase may continue for a certain amount of time. It will be appreciated that the extraction rate during the production phase may decrease over time and at some point it may be beneficial to restart or cycle through the phases again to increase production.

Figure 2B:
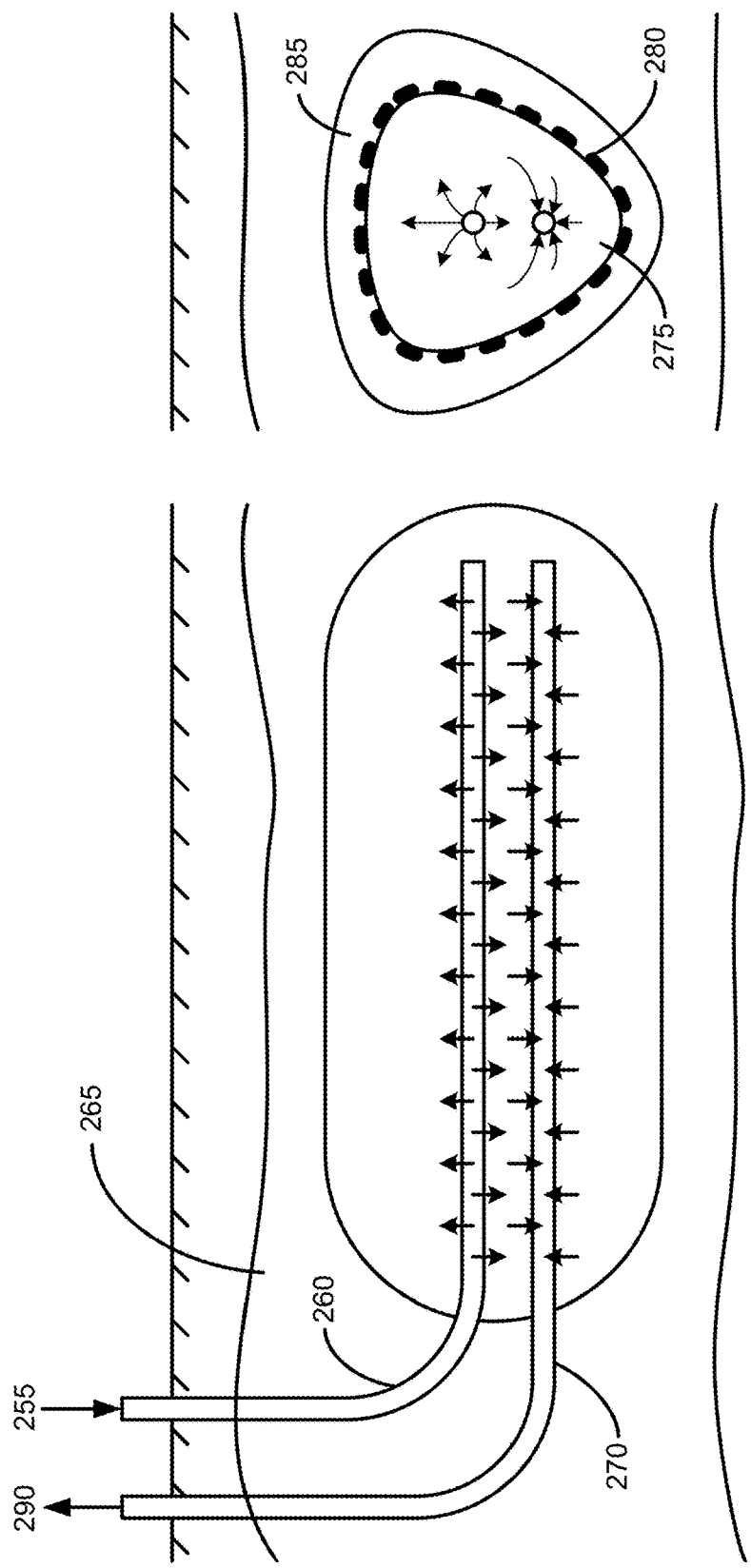

FIG. 2B provides side and front view schematic illustrations of another vapor injection process in which a vapor mixture is injected into a reservoir. For example, this embodiment may correspond to a steam assisted gravity drainage (SAGD) oil recovery technique, except that the steam present in the SAGD process is substituted by a vapor mixture of steam and DME, as described above. Initially, the vapor mixture 255 is injected into an upper well bore 260 within a reservoir 265. The injection process may be continuous. As the vapor mixture 255 enters reservoir 265, it interacts with heavy oil and/or bitumen in reservoir 255, heating the heavy oil and/or bitumen. Portion of the heated vapor mixture 255 may condense, releasing latent heat of vaporization to the heavy oil and/or bitumen, heating it further. As the heavy oil and/or bitumen heats, its viscosity reduces and it may more easily flow to lower depths within reservoir 265. A lower well bore 270 is used to extract the heavy oil and/or bitumen.

While the vapor mixture 255 is injected into the reservoir 265, regions of reservoir 265, identified as chamber 275, have a temperature greater than the condensation/boiling temperature of the vapor mixture 255, such that a vapor phase is present in the chamber 275, along with a liquid aqueous phase and a liquid oil phase. The region of reservoir 265 where the vapor mixture 255 condenses is identified as chamber-edge 280. Chamber-edge 280 may have a temperature equal to a condensation temperature of vapor mixture 255. Here, the latent heat of vaporization is released and the vapor mixture condenses to form liquid water and liquid DME, which may partition into a liquid aqueous phase and a liquid oil phase. It will be appreciated that the liquid aqueous phase present at the chamber edge may have a different composition than the liquid aqueous phase present within the chamber. It will also be appreciated that the liquid oil phase present at the chamber edge may have a different composition than the liquid oil phase present within the chamber.

The condensed liquid water and liquid DME may transfer heat to the heavy oil and/or bitumen in reservoir 265, creating a heated region 285 surrounding chamber 275, where a liquid oil phase and a liquid aqueous phase may be present. Heated region 285 will possess a temperature less than the condensation/boiling temperature of the vapor mixture and greater than an ambient temperature of the reservoir before injection and/or greater than an ambient temperature of the reservoir surrounding the heated region. It will again be appreciated that the liquid aqueous phase present in the heated region may have a different composition than the liquid aqueous phase present within the chamber or at the chamber-edge. It will also be appreciated that the liquid oil phase present in the heated region may have a different composition than the liquid oil phase present within the chamber or at the chamber-edge. It will further be appreciated that the composition of the liquid oil phase and liquid aqueous phase may change as a function of time and position within reservoir 265.

As the liquid water is generally immiscible with the heavy oil and/or bitumen, it does not significantly dilute the heavy oil and/or bitumen. The condensed DME, however, may be soluble with the heavy oil and/or bitumen, and so the DME may dilute the heavy oil and/or bitumen in the liquid oil phase, contributing to an additional decrease in the viscosity of the heavy oil and/or bitumen. The heated and diluted heavy oil and/or bitumen within chamber 275, at chamber edge 280, and in heated region 285 may more easily flow by gravity as the viscosity is reduced. As heavy oil and/or bitumen 290 is extracted from reservoir 265 through lower well bore 270, additional mixing between the heavy oil and/or bitumen and the liquid phase DME may occur.

Advantageously, this process requires less water to maintain a comparable extraction rate of heavy oil and/or bitumen as compared to a SAGD process using only steam. Several factors contribute to this, which are contributed by the presence of DME in the vapor mixture 255. Since DME is present, some amount less water may be used. However, the chamber-edge temperature when the vapor mixture 255 includes both DME and water will be lower than a comparable chamber-edge temperature in a SAGD process where the injected vapor mixture only contains water. This lower chamber-edge temperature will contribute to a reduced energy loss as compared to a higher chamber-edge temperature in the case of water only injection. In addition, because the DME is soluble in the liquid oil phase containing heavy oil and/or bitumen, the DME can contribute to a reduction in the viscosity of the liquid oil phase, allowing less heat needed to be added to achieve the same reduction in liquid oil phase viscosity as compared to the water only injection case. As such, less injected water is necessary.

V. Oil Extraction

Extraction of heavy oil and/or bitumen from a reservoir may be achieved through any conventional means. For example, pumping equipment (not illustrated in FIG. 2A or FIG. 2B) may be used to withdraw heavy oil and/or bitumen via a well bore in a reservoir. In general, due to the dilution of the heavy oil and/or bitumen by DME, the extraction may include extracting a liquid oil phase mixture of DME and heavy oil and/or bitumen from the reservoir. In some embodiments, a liquid aqueous phase may also be extracted from the reservoir.

In some embodiments, after extraction the liquid oil phase may undergo a separation process, such as to separate the heavy oil and/or bitumen from the extracted liquid oil phase mixture of DME and heavy oil or bitumen from the reservoir. In this way, injected DME can be recovered for reuse in additional injection processes. For example, in a SAGD-type process, the recovered DME could be returned to the injection well, along with steam, in a continuous recycling process.

EXAMPLES

Aspects of the invention may be understood by reference to the following non-limiting examples.

Example 1

Dimethyl Ether as an Additive to Steam for Improved SAGD

Coinjection of solvent with steam results in lower chamber-edge temperatures than those in steam-assisted gravity drainage (SAGD), which enable to decrease heat losses to the overlying formation rocks. However, use of highly volatile solvents, such as propane, can yield significantly slow bitumen production due to low chamber-edge temperatures. The suitability of alkane solvents for SAGD in terms of phase behavior has been reported to increase with increasing carbon number and tend to level off at a certain carbon number; e.g., approximately $C_6$ for Athabasca bitumen reservoirs. An objective of this example is to describe the use of dimethyl ether (DME), a water-soluble solvent, as an additive to steam for reducing steam-oil ratio (SOR) while keeping SAGD-like rates of bitumen production.

The chamber-edge temperature for a given overall composition and operating pressure is defined as the temperature at which the vapor phase completely condenses with decreasing temperature. Thermodynamic predictions show that the chamber-edge temperature so defined will increase substantially if the solvent can partition into the aqueous phase at chamber-edge conditions. This is confirmed in numerical reservoir simulation for coinjection of steam with DME, as a water-soluble solvent, for Athabasca bitumen. In simulation case studies, coinjection of steam with DME (DME-SAGD) is compared with SAGD and coinjection of steam with $C_4$ ($C_4$-SAGD), in terms of SOR, bitumen production, local displacement efficiency, and solvent recovery. The steam-injection pressure is 35 bars for all cases, and 2 mol % of solvent is coinjected in solvent-SAGD simulations until the steam chamber reaches the side boundary of a 2-D homogeneous reservoir model. Since DME's volatility is between $C_3$ and $C_4$, $C_4$ is selected as the alkane counterpart in this simulation study to see the effect of the solvent's solubility in water on oil recovery in solvent-SAGD.

DME is more volatile and less soluble in bitumen than $C_4$ at their corresponding chamber-edge conditions. However, results show that DME-SAGD results in 35% lower SOR than SAGD while being able to increase bitumen-production rates of SAGD. Analysis of simulation results indicates that the solubility of DME in water not only makes the chamber-edge temperature higher than that of $C_4$-SAGD, but also yields 15% higher solvent-recovery factor than $C_4$-SAGD. The main reason for the latter observation is that a much smaller fraction of the injected solvent is present in the vapor phase in DME-SAGD than in $C_4$-SAGD. Also, DME dissolves in both water and bitumen, which results in the aqueous and oleic phases of nearly-equal density within the gravity-drainage zone near the edge of a steam chamber. This is the neutral regime of oil-water two-phase flow along the chamber edge between the two extreme cases: SAGD and $C_4$-SAGD. Unlike in $C_4$-SAGD, the reduced gravity segregation in DME-SAGD is expected to facilitate the mixing of condensed solvent with bitumen near the edge of a steam chamber.

Introduction. In-situ recovery of heavy oil and bitumen is challenging because they are highly viscous, and usually are immobile at reservoir conditions. Steam-assisted gravity drainage (SAGD) is the most widely-used method of bitumen recovery. In SAGD, steam is injected into the bitumen reservoir through an (upper) horizontal well and forms a steam-saturated zone, which is called a "steam chamber." At the edge of a steam chamber, the vapor (V) phase completely condenses, and releases its latent heat. The heated oil and steam condensate drain by gravity to the (lower) horizontal well that is located 4-8 m below and parallel to the injection well. Although only a part of the heat can be added to the oleic (L) phase in the reservoir, it effectively increases the L-phase mobility since viscosity of bitumen is highly sensitive to temperature. The main drawback of SAGD is the significant usage of energy and water to generate steam, which also results in a large amount of green-house-gas emission.

A widely-used parameter to quantify the energy efficiency of steam injection processes is the cumulative steam-to-oil ratio (CSOR), defined as the ratio of the cumulative volume of steam injected (cold water equivalent) to the cumulative volume of bitumen produced. CSOR is particularly sensitive to heat losses to the overlying formation rocks. In SAGD, elevated temperatures (e.g., 450-520 K) occur within the steam chamber and in regions beyond the chamber edge located in its vicinity. For SAGD to be economically feasible, the energy efficiency measured by CSOR is generally in the range of 2-4 $m^3/m^3$. It is desirable to operate at low chamber temperatures while maintaining economically sustainable rates of oil production so that the CSOR can be reduced. SAGD is expected to be even less energy-efficient for highly heterogeneous reservoirs. Thus, there is a need to reduce SAGD's CSOR from both environmental and economic standpoints, which has motivated the search for alternative processes.

Coinjection of steam and solvent for SAGD (solvent-steam-assisted gravity drainage, or solvent-SAGD) has been studied and pilot-tested as a potential method to improve the drawbacks of SAGD. Solvent-SAGD processes proposed in the literature, such as expanding-solvent-SAGD (ES-SAGD), solvent-aided-process (SAP) and liquid-addition-to-steam-for-enhanced-recovery (LASER), use a small amount of solvents (e.g., a few to 20 percent by liquid volume equivalent). They attempt to enhance the L-phase mobility by the dilution of oil by solvent, in addition to the thermal energy released from the injected steam, to reduce the steam requirement. Solvent-SAGD, if properly designed, can increase bitumen-drainage rate and displacement efficiency, while reducing CSOR (e.g., EnCana's SAP pilot and Imperial Oil's LASER).

Prior investigations into solvent-SAGD are mainly concerned with hydrocarbon solvents, such as propane, butane, and diluents, which usually consist of pentane and heavier hydrocarbons at different concentrations. The hydrocarbon solvents that are reported to be suitable have vapor pressures that are close to that of water at an operating pressure: e.g., n-hexane and n-heptane as single-component solvents for various bitumen reservoirs. However, such hydrocarbon solvents are relatively expensive, and in-situ retention of the coinjected solvent, which inevitably happens under heterogeneity, can substantially affect the project's economics.

In general, more volatile solvents are less expensive. Therefore, they are of lower risk for injection into bitumen/heavy-oil reservoirs. Also, it is expected that mixing of bitumen with more volatile solvent results in lower viscosity of the resulting oil mixture at a given mixing ratio, temperature, and pressure. As will be explained in the next section, however, coinjection of steam with highly volatile solvents (e.g., propane and butane) substantially lowers the temperature at the edge of a steam chamber (in comparison with steam-only injection), which lowers the L-phase mobility. For example, prior investigations have shown that coinjection of propane with steam is unlikely advantageous over SAGD at the operating conditions in most target reservoirs, especially for Athabasca bitumen reservoirs. Previous results show that lowering the temperature at the edge of a steam chamber by coinjection of volatile solvents with steam reduces heat losses to the overlying formation rocks, but the operating chamber-edge temperature should not be too low to maintain a SAGD-like oil production rate. A practical way to improve the efficiency of SAGD is to develop effective strategies for solvent-SAGD that result in less consumption of energy and water while keeping a SAGD-like rate of bitumen production.

This Example is motivated, in part, by the question as to how the water component and/or the aqueous (W) phase can be used to improve the efficiency of steam-based oil recovery, such as SAGD and cyclic steam stimulation. This is because water is by far the most dominant component in steam-based oil recovery for heavy-oil and bitumen recovery. The volume of produced water is a few times greater than the volume of produced oil in SAGD and cyclic steam stimulation. Without wishing to be bound by any theory, the inventors believe that the combined mechanisms for enhancement of bitumen mobility by heat and dilution are more effective with water-soluble solvents than the conventional alkane-based solvents.

As will be presented in this Example, thermodynamic calculations and flow simulations on the basis of experimental data indicate that the solubility of solvent in water is expected to effectively utilize the thermal and compositional mechanisms for enhancing bitumen mobility in the reservoir. In this Example, dimethyl ether (DME) is considered as a water-soluble solvent, although it is not the purpose of this Example to single out DME as a promising additive to steam to improve SAGD.

DME is the lightest organic in the ether family with the chemical formula of $CH_3$—O—$CH_3$. DME can be synthesized in a variety of ways at low costs, for example, from methanol, organic waste, and biomass. The second lightest ether is diethyl ether, but it is highly reactive. Therefore, DME is the only ether considered in detail this Example.

DME is a colorless gas with mild sweet odor at standard conditions. It liquefies under moderate pressure or cooling. DME is between propane ($C_3$) and n-butane ($C_4$) in terms of volatility, and soluble in oil. Other properties of DME, such as density, viscosity and critical parameters, are reported. Due to its slight polarity, DME is also soluble in water. However, there are a limited amount of experimental data for DME/water and DME/oil mixtures. Experimental studies of DME/water binary phase behavior have been performed. An experimental study for phase behavior of DME/decane and DME/dodecane mixtures has been conducted. Densities and viscosities of DME/oil mixtures have been measured. Phase-behavior data of DME/oil/brine have been obtained. Phase behavior of DME/bitumen/brine mixtures, however, has not been presented prior to the present invention.

Applications of DME in petroleum reservoir engineering have been reported. Coreflooding studies and field studies indicated that DME can be an effective solvent for enhanced water-flooding processes. The DME injected can be efficiently recovered through the produced water due to the solubility in water, and the produced water that contains DME can be re-used. Furthermore, DME can be used to treat condensate and water blocks in hydraulic-fractured shale-gas condensate reservoirs through numerical investigation by taking advantage of DME distribution in the W and L phases and its high volatility.

Thermodynamic modeling for the application of DME to petroleum engineering processes has been studied. Cubic equations of state (EOSs), such as Robinson and Peng (PR) (1978), with the van der Waals (vdW) mixing rules are not entirely satisfactory for modeling DME/water mixtures. Accurate modeling of hydrogen-bonding and polar interactions usually requires more advanced EOSs and/or mixing rules, such as cubic-plus-association (CPA) EOS and the Huron-Vidal (HV) mixing rule. The CPA EOS based on Soave-Redlich-Kwong (Soave 1972) has been used to calculate partitioning of DME in the W and L phases for DME/oil/brine mixtures. The PR EOS with the HV mixing rule to has been used model phase behavior of DME/brine/oil mixtures.

An objective of this example is to present potential benefits of using DME, a water-soluble solvent, as steam additives to improve the efficiency of SAGD, along with the mechanisms involved. To study the effect of solvent's solubility in water on oil recovery in solvent-SAGD, another objective is to compare DME-steam coinjection (DME-SAGD) with coinjection of steam with volatile alkanes, such as $C_4$, of which the volatility is close to DME. Thermodynamic calculations and flow simulations are employed and experimental data, where available for relevant fluids, are used to calibrate numerical models. A mechanistic explanation of how DME's solubility in water is expected to make differences in temperature and component distributions during SAGD and its variants is described. Optimal conditions for DME-SAGD are beyond the scope of this Example because DME has been taken merely as an example of water-soluble solvent.

The next section presents thermodynamic calculations for chamber-edge conditions for SAGD and solvent-SAGD with different solvents, such as DME and alkanes. This may explain the impact of solvent's solubility in water on chamber-edge conditions. Then, a simulation case study compares SAGD and solvent-SAGD with DME and $C_4$ in terms of bitumen-production rate, CSOR, ultimate bitumen recovery, and solvent recovery.

Vapor-condensation conditions for water/solvent/bitumen. Oil drainage by gravity occurs mainly along the edge of a steam chamber in SAGD and its variants. Therefore, the temperature-composition conditions near the steam-chamber edge substantially affect the efficiency of solvent-SAGD in terms of oil production and energy/water consumption at a given operating pressure. In general, there are three phases inside a steam chamber: the vapor (V), aqueous (W), and oleic (L) phases. At the edge of a steam chamber, the V phase completely condenses, making hot water (water condensate) from the vapor water and liquid solvent from the vapor solvent. This liquid solvent is then mixed with heated, mobile bitumen through mechanical dispersion along and outside the edge of a steam chamber. In solvent-SAGD, therefore, the L-phase mobility becomes higher not only by the thermal mechanism, but also by the compositional mechanism.

Figure 3A:
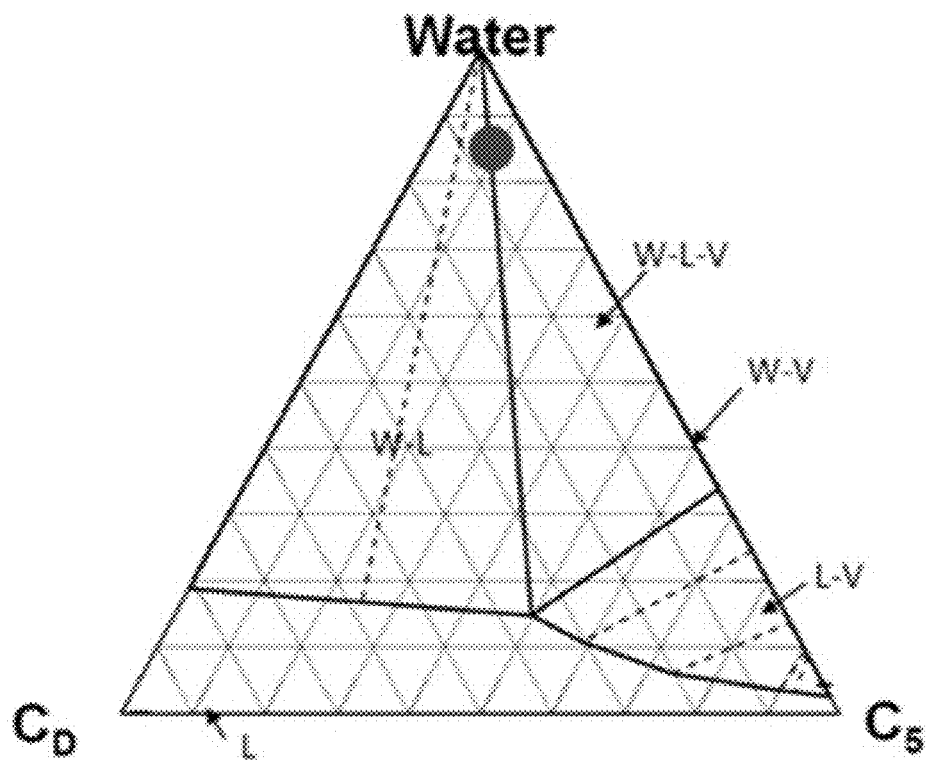
FIG. 3A and FIG. 3B provide thermodynamic conditions at the edge of a steam chamber corresponding to vapor-condensation conditions, including a ternary diagram and a chamber schematic.
Figure 3B:
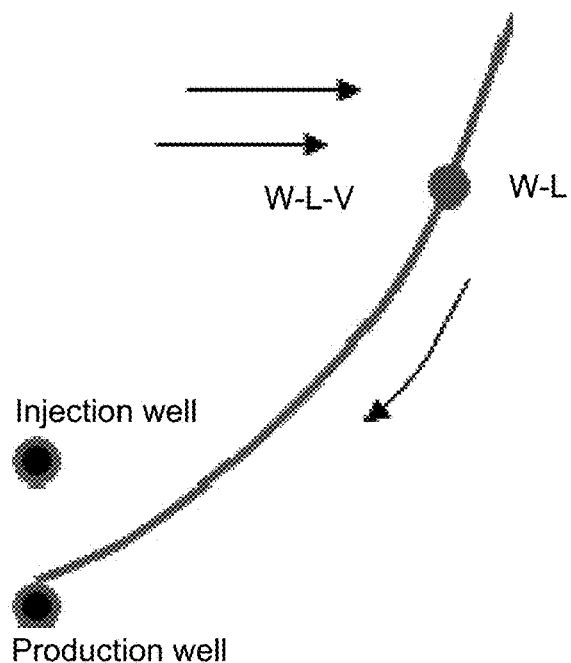

The thermodynamic conditions at the edge of a steam chamber in solvent-SAGD may depend substantially on the phase behavior of water/solvent/bitumen mixtures. More specifically, such conditions are determined by vapor condensation, in which a phase transition occurs between two phases (WL) and three phases (WLV), in the water/solvent/bitumen system at a given operating pressure and overall composition. FIG. 3A and FIG. 3B schematically illustrate the chamber-edge (or vapor-condensation) conditions in a ternary diagram for water/pentane/bitumen at a chamber-edge temperature at the operating pressure of 35 bars. The red dot in the ternary diagram (FIG. 3A) indicates an overall composition on the boundary between WL and WLV, which corresponds to a point on the edge of a steam chamber (FIG. 3B) at the specified pressure.

This section provides an analysis of chamber-edge (i.e., vapor-condensation) conditions for SAGD and solvent-SAGD at a given pressure, 35 bars as an example. The solvents used for solvent-SAGD are DME and alkanes, ranging from $C_3$ to n-hexane ($C_6$). Ternary mixtures consisting of water, bitumen, and solvent are used in this section. First, the phase-behavior models used are described below. Then, the impact of water-soluble solvent (taking DME as an example) on vapor-condensation conditions are analyzed subsequently.

EOS model for water/n-alkane/bitumen. The PR EOS with the vdW mixing rules is used for phase-equilibrium calculation of water/n-alkane/bitumen mixtures. Tables 1 and 2 summarize parameters for the PR-EOS models with the vdW mixing rules, such as critical properties and binary interaction parameters (BIPs). Critical properties of water and n-alkanes are based on the American Petroleum Institute (API) technical data book (1983) and group contribution methods as summarized in Venkatramani and Okuno (2015). The dead-bitumen component ("$C_D$" in Tables 1 and 2) is the Athabasca bitumen characterized by Kumar and Okuno (2016) ("Bitumen A" in that paper).

TABLE 1

Critical properties and molecular weight (MW) for components.

| Components | $T_C$, K | $P_C$, bar | ω | MW, g/mol | $V_C$, cc/mol |
|---|---|---|---|---|---|
| $C_1$ | 190.56 | 45.99 | 0.0157 | 16.04 | — |
| $C_3$ | 369.83 | 42.48 | 0.1543 | 44.10 | 203 |
| n-$C_4$ | 425.12 | 37.96 | 0.2014 | 58.12 | 255 |
| n-$C_5$ | 469.70 | 33.70 | 0.2511 | 72.15 | 304 |
| n-$C_6$ | 507.60 | 30.25 | 0.3010 | 86.18 | 370 |
| $C_D$ | 847.17 | 10.64 | 1.0406 | 530.00 | 1330 |
| Water | 647.10 | 220.64 | 0.3433 | 18.01 | — |
| DME | 400.05 | 52.92 | 0.2000 | 46.07 | — |

TABLE 2

Binary interaction parameters (BIPs) for the PR EOS with the vdW mixing rules. All other BIPs are zero. CD stands for the dead-bitumen component.

| BIP | $C_1$ | $C_3$ | n-$C_4$ | n-$C_5$ | n-$C_6$ | $C_D$ |
|---|---|---|---|---|---|---|
| $C_D$ | 0.000 | 0.067 | 0.075 | 0.081 | 0.088 | 0.000 |
| Water | 0.732 | 0.666 | 0.636 | 0.607 | 0.579 | 0.169 |
| DME | 0.000 | 0.000 | 0.000 | 0.000 | 0.000 | 0.015 |

BIP correlation for water with alkanes was developed for reliable estimation of water solubility in alkanes on the basis of the PR EOS, as follows:

$$BIP_{w/Hc} = c_1[1 + \exp(c_2 - c_3 MW)]^{-1/c_4}, \quad (1)$$

where $c_1 = 0.24200$, $c_2 = 65.90912$, $c_3 = 0.18959$, and $c_4 = -56.81257$. MW is the molecular weight of n-alkane. This correlation is based on experimental data for water/alkane three-phase behavior. For the BIP of water with $C_D$, the value from Equation 1 is multiplied by 0.7 to account for the effect of aromaticity of the bitumen ($C_D$) on the solubility of water in bitumen. The scaling factor of 0.7 was obtained by matching experimental data for Athabasca bitumen.

The solubility of alkanes in water has been measured to be very low; e.g., up to 0.1 mol %. For example, the solubility of $C_4$ in water at 511 K and 68.9 bars has been shown to be 0.0792 mol %. The PR EOS with the BIP correlation given in Equation 1 usually underestimates the solubility of alkanes in water; that is, alkanes are essentially insoluble in water, and partition only into the vapor and oleic phases in the relevant conditions described in this Example.

The small solubility of $C_4$ in water has marginal effects on phase behavior in this research. For example, the PR-EOS models for water/$C_4$ using the HV mixing rule and the vdW mixing rules respectively yield 0.084 mol % and 0.000 mol % for the $C_4$ solubility in water at 511 K and 68.9 bars. The resulting W-phase densities in the STARS simulator are 807.0 kg/m³ and 806.9 kg/m³ with the HV and vdW models, respectively.

BIPs between bitumen and n-alkanes are calculated by the following correlation:

$$BIP_{bit/sol} = 0.0349 \ln\left(\frac{V_{C-sol}}{V_{C-bit}}\right) + 0.1329, \quad (2)$$

where $V_C$ is critical volume. $V_{C-sol}$ is the standard value for the alkane solvent of interest. $V_{C-bit}$ can be calculated directly from Riazi and Daubert's correlation (1987).

EOS model for water/DME/bitumen. The vdW mixing rules are inaccurate for modeling water/DME mixtures, especially for three-phase conditions and solubility of DME in water. For example, if the PR EOS with the vdW mixing rules is calibrated with three-phase conditions for water/DME mixtures, the average absolute relative deviation (AARD) for the DME solubility in water is more than 45%. Therefore, the PR EOS with the Huron-Vidal (HV) mixing rule (Huron and Vidal 1979) is used for modeling water/DME/bitumen mixtures, in which the HV mixing rule is used for calibrating a DME/brine/oil system with experimental data and predicting the partitioning of DME into the L and W phases.

Properties of water and $C_D$ are the same as in the water/n-alkane/bitumen models. Vapor-pressure data for DME, such as critical temperature ($T_C$), critical pressure ($P_C$), and acentric factor ($\omega$), were used as shown in Table 1. However, experimental data for mixtures of DME with other components are scarce. As explained below, therefore, interaction parameters for DME/$C_D$ (Table 2) and water/DME were calibrated with experimental data.

For DME/hydrocarbon mixtures, data that are relevant to this Example include the DME solubility in n-decane ($C_{10}$) and n-dodecane ($C_{12}$). A BIP of 0.015 has been found to give an AARD of 1.5% for these data. Although the BIP of DME with bitumen is expected to be different, 0.015 is also used for the DME/$C_D$ pair in the absence of any other relevant data (Table 2).

The HV parameters for the water/DME pair were obtained by matching the data for three-phase conditions and DME solubility in water up to 493 K and 509 bars. The randomness parameters for components j and k are 0.131 for the two ways (jk and kj), where j is water and k is DME. The energy parameters for j (water) and k (DME) are $g_{jk}/R = g_{jk}'/R + T g_{jk}''/R$, where $g_{jk}'/R$ is −1000 K and $g_{jk}''/R$ is −0.570, and $g_{kj}/R = g_{kj}'/R + T g_{kj}''/R$, where $g_{kj}'/R$ is 1370 K and $gk_{kj}''/R$ is 1.290. R is the universal gas constant.

Figure 4:
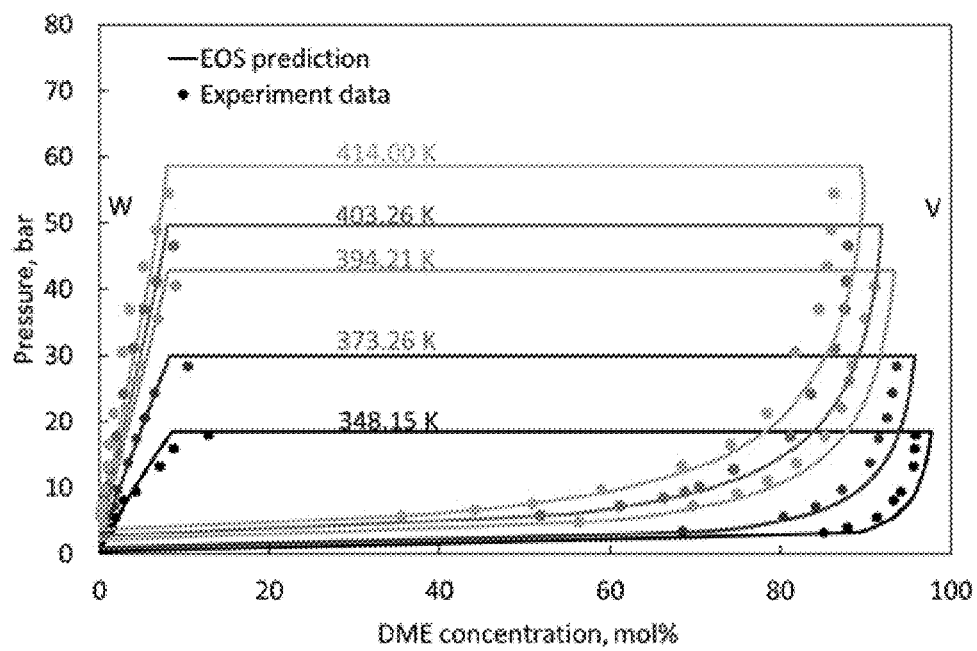
FIG. 4 provides pressure-composition (P-x) diagrams for water/DME mixtures at 5 different temperatures.

Unlike the vdW mixing rules, the HV mixing rule exhibits improved accuracy for DME solubility in water and three-phase conditions. AARDs for three-phase temperature and DME solubility in water with the HV mixing rule are 0.9% and 17.3%, respectively. The corresponding average absolute deviation (AAD) is 3.8 K for three-phase temperature and 2.1 mol % for DME solubility in water on the three-phase curve. FIG. 4 also compares EOS predictions with experimental data of. In FIG. 4, the horizontal line for each temperature represents the three-phase pressure for the W, V, and L phases. Above the three-phase pressure, two different two-phase regions (W-L and L-W) are present (not shown in FIG. 4). Below it, the W-V region is present.

Analysis of vapor-condensation temperature at 35 bars. This section presents the difference between alkanes and DME in terms of phase behavior when they are mixed with water and bitumen at a given pressure, 35 bars, on the basis of the EOS models (see above). Differences come from the solubility in water that is much greater for DME than for alkanes (FIG. 4). The main objective in this section is to explain the potential impact of this difference on vapor-condensation (or chamber-edge) temperature for water/solvent/bitumen mixtures in solvent-SAGD.

Figure 5:
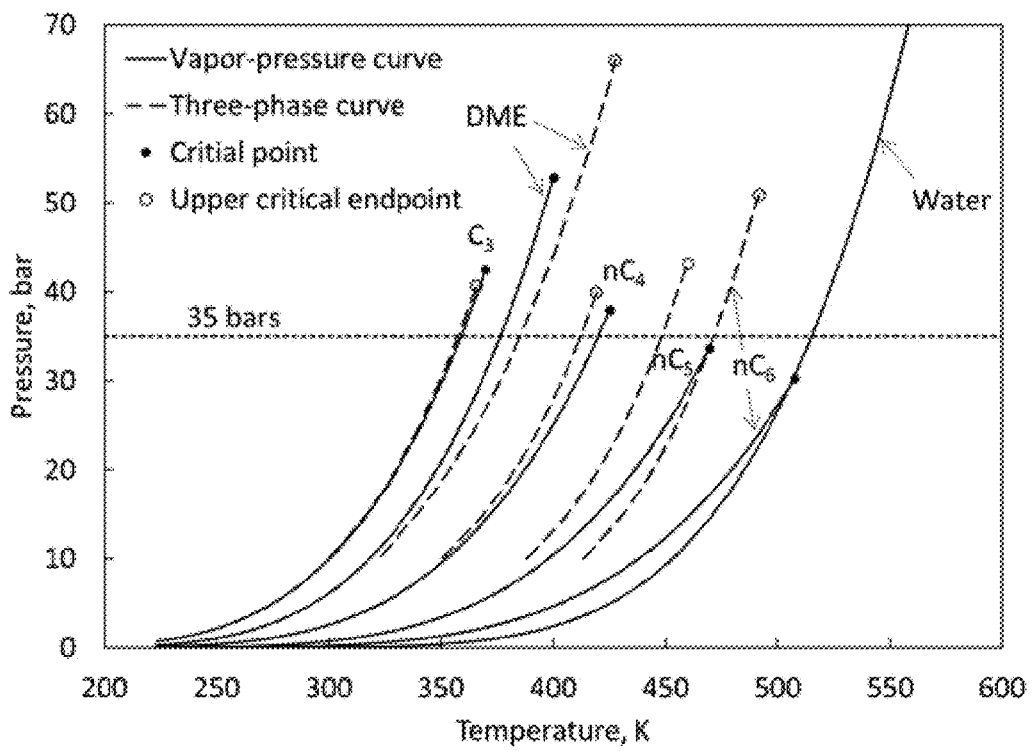
FIG. 5 provides vapor pressure curves of pure components and three-phase curves for water/solvent binaries.

FIG. 5 shows vapor-pressure curves of solvent components and three-phase curves for water/solvent binaries based on the EOS models described above. Vapor-pressure curves in this figure show that DME is between $C_3$ and $C_4$ in terms of volatility. However, the interaction of DME with water is apparently different from that of n-alkanes with water. For example, the three-phase curve for the water/DME binary is on the higher-temperature side of DME's vapor-pressure curve. However, the three-phase curve for a water/n-alkane binary is observed to be the lower-temperature side of vapor pressure curve for that n-alkane.

Figure 6:
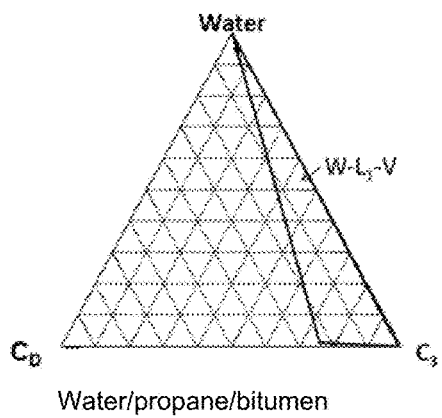
FIG. 6 provides vapor-condensation temperatures at 35 bars for water/solvent/bitumen mixtures for a fixed overall composition 95 mol % water, 4 mol % solvent, and 1 mol % bitumen ($C_D$). Four different alkane solvents are compared, propane, butane, pentane, and hexane.
Figure 6:
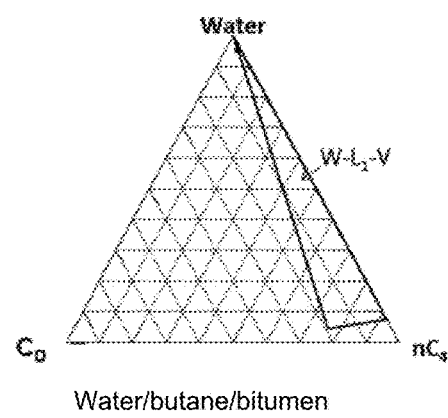
Figure 6:
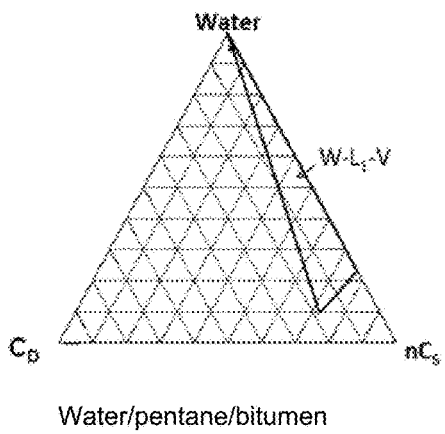
Figure 6:
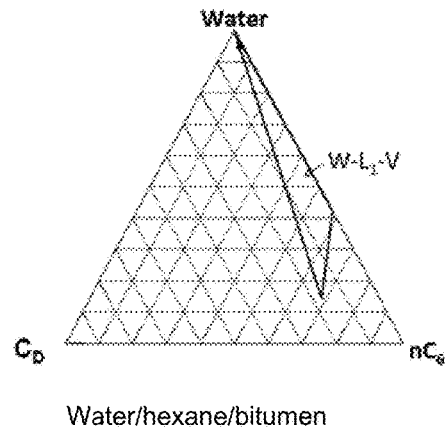

FIG. 6 compares different alkane solvents in terms of vapor-condensation temperature for a typical overall composition (95 mol % water, 4 mol % solvent, and 1 mol % bitumen) for a solvent-SAGD chamber edge at 35 bars. In this figure, two-phase regions associated with the tie triangle are omitted for clarity. The vapor-condensation temperature is calculated to be 358 K for propane, 415 K for butane, 453 K for pentane, and 476 K for hexane. That is, it monotonically increases with decreasing volatility of the alkane solvent used. The vapor-condensation temperature for the propane case is remarkably lower than that for the hexane case ($\Delta T=118$ K), which substantially reduces the mobility of the resulting L phase. This largely explains the result of previous studies that n-hexane is more suitable than propane as an additive to steam for solvent-SAGD for Athabasca bitumen.

Figure 7:
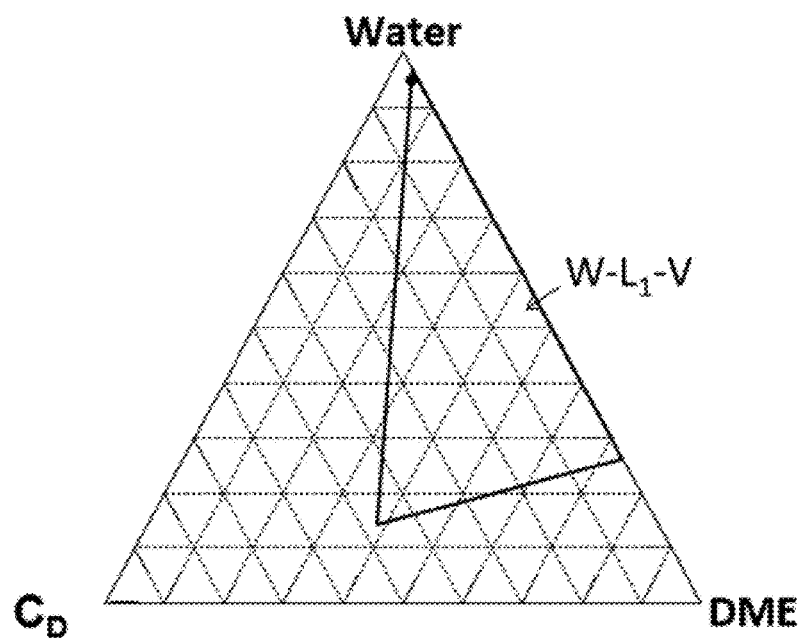
FIG. 7 provides vapor-condensation temperature at 35 bars for the overall composition 95 mol % water, 4 mol % DME, and 1 mol % bitumen ($C_D$).

As mentioned before, the volatility of DME is between those of propane and butane. Therefore, one may expect the vapor-condensation temperature can be as low as the propane and butane cases, as shown in FIG. 6. FIG. 7 shows the ternary diagram calculated for the water/DME/bitumen system at the same conditions used for FIG. 6. The vapor-condensation temperature for the DME case is calculated to be 442 K (FIG. 7), which is higher than the propane and butane cases and even close to the pentane case (FIG. 6). Since the overall composition near the edge of a steam chamber is always in the vicinity of 100% water in SAGD and its variants, the phase-transition temperature from WLV to WL is sensitive to the solubility of solvent in water (or the composition of the W phase that is equilibrium with L and V) at a given operating pressure. The hypothesis obtained from these calculations is that vapor-condensation temperature at a given pressure and composition will increase substantially if the solvent can partition into the W phase at operating conditions. This will be confirmed in numerical reservoir simulations for coinjection of steam with different solvents, such as DME and $C_4$, for Athabasca bitumen at 35 bars in the next section.

Figure 8B:
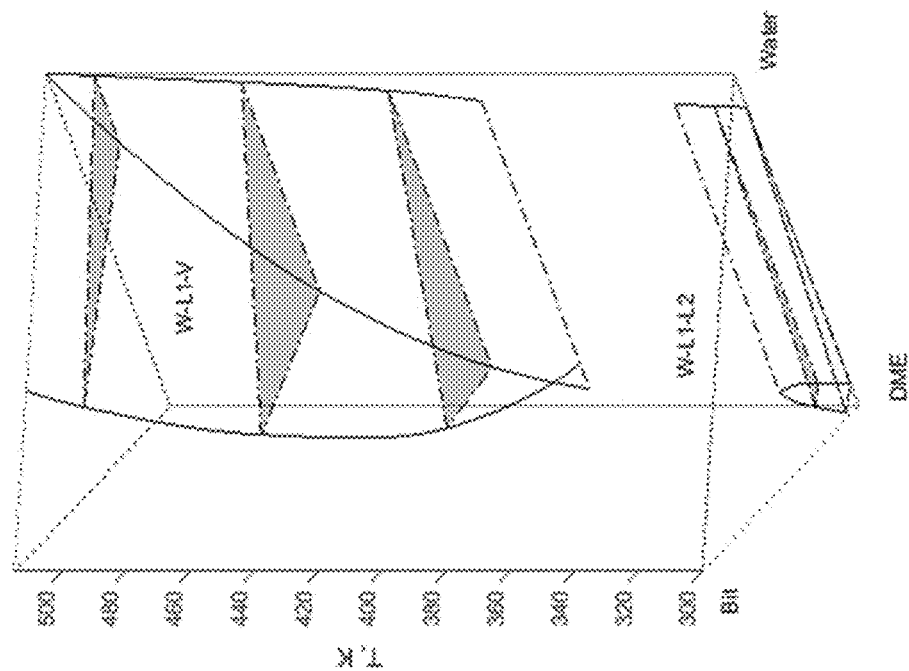
FIG. 8A and FIG. 8B provide temperature-composition diagrams for water/pentane/bitumen (FIG. 8A) and water/DME/bitumen (FIG. 8B) at 35 bars.
Figure 8A:
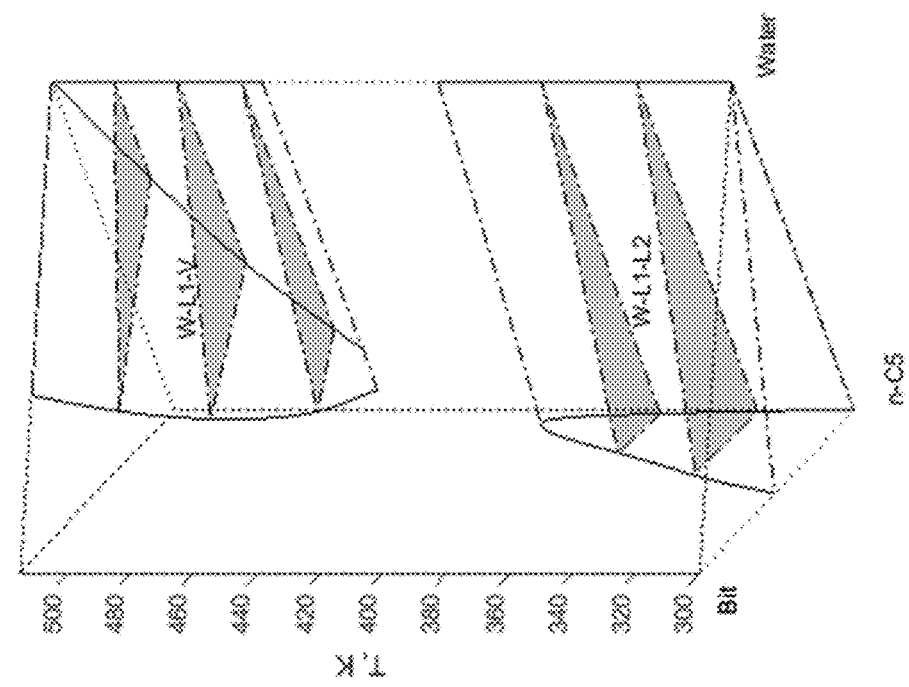

FIG. 8A and FIG. 8B compares the temperature-composition (T-x) diagrams for water/$C_5$/$C_D$ and (FIG. 8A) water/DME/$C_D$ (FIG. 8B) at 35 bars. There are two separate three-phase regions for each diagram: W-$L_1$-V at higher temperature and W-$L_1$-$L_2$ at lower temperature, where $L_1$ is the bitumen-rich liquid phase, and $L_2$ is the solvent-rich liquid phase. Two-phase regions associated with the three-phase regions are not shown for clarity. The ternary diagrams given in FIGS. 6 and 7 correspond to temperature cross-sections inside the W-$L_1$-V region in FIG. 8A and FIG. 8B. FIG. 8A and FIG. 8B clearly show that the lower-temperature limit for W-$L_1$-V is substantially lower in the water/DME/$C_D$ system than in the water/$C_5$/$C_D$ system. This is a direct consequence of the difference between the three-phase temperature for water/DME and that for water/$C_5$ at 35 bars, which are 382.18 K and 448.37 K, respectively, as shown in FIG. 5. However, only one mol % of bitumen ($C_D$) in the overall composition makes the vapor-condensation temperature 60 K higher as discussed with FIG. 7.

FIG. 8A and FIG. 8B show liquid-liquid separation of bitumen/solvent mixtures in the presence of the W phase in the W-$L_1$-$L_2$ region. Such phase behavior was experimentally observed for water/$C_4$/Athabasca-bitumen mixtures. Based on the experimental observation, the liquid-liquid separation may limit the solubility of solvent in bitumen even when a high level of solvent accumulation took place near the edge of a steam chamber in solvent-SAGD with highly volatile solvents. FIG. 8A and FIG. 8B show that the upper-temperature limit for W-$L_1$-$L_2$ is calculated to be lower for the DME case than for the $C_5$ case. This indicates that the detrimental effect of W-$L_1$-$L_2$ phase behavior on bitumen dilution is less likely for DME-SAGD than for solvent-SAGD with solvents that are less volatile than DME, such as $C_5$; however, further investigation into bitumen dilution by DME may be expanded upon with more experimental data.

Simulation case study. This section presents a simulation case study to compare SAGD, DME-SAGD, and $C_4$-SAGD. The comparison between SAGD and DME-SAGD is to see the effect of solvent on SAGD in terms of bitumen-production rate, CSOR, and ultimate oil recovery. The comparison between DME-SAGD and $C_4$-SAGD is to see the effect of the solubility of solvent in water on the above-mentioned metrics and solvent recovery. DME and $C_4$ are compared because of the similarity in terms of volatility (FIG. 5). Although the volatility of DME is closer to that of $C_3$ than $C_4$ (FIG. 5), $C_3$ is not selected in this case study because it does not improve SAGD for the bitumen reservoir considered here. First, the simulation conditions are described, followed by the results.

Simulation model. With the CMG STARS simulator (Computer Modelling Group 2014), one half of a steam chamber is simulated for a homogeneous reservoir of 70 m (x)×37.5 m (y)×20 m (z). The reservoir is discretized into 70×1×20 gridblocks; that is, this is a vertical 2-D model. The temperature and pressure of the initial reservoir are 15 bars and 286.15 K, respectively. The reservoir initially contains 25% water and 75% live bitumen with a gas-oil ratio (GOR) of 0.44 m$^3$/m$^3$. The production well is placed at 3 m above the reservoir bottom, and the injection well is placed 4 m above the production well. The injection and production wells are operated at 35 bars and 15 bars, respectively. Other reservoir and well-pair parameters are summarized in Table 3.

TABLE 3

Input parameters for the simulation case study for SAGD and solvent-SAGD with the STARS simulator.

| | |
|---|---|
| Porosity | 33% |
| Horizontal permeability | 4000 md |
| Vertical permeability | 3000 md |
| Initial reservoir pressure at the depth of 500 m | 15 bars |
| Initial reservoir temperature | 286.15 K |
| Initial oil saturation | 0.75 |
| Initial water saturation | 0.25 |
| Three-phase relative permeability model (CMG 2014) | Stone's model II |
| Formation compressibility | 1.8 × 10$^{-3}$ 1/bar |
| Rock heat capacity (Keshavarz et al. 2014) | 2600 kJ/(m3 K) |
| Rock thermal conductivity (Keshavarz et al. 2014) | 660 kJ/(m day K) |
| Over/underburden heat capacity (Keshavarz et al. 2014) | 2600 kJ/(m3 K) |
| Over/underburden thermal conductivity (Keshavarz et al. 2014) | 660 kJ/(m day K) |
| Bitumen thermal conductivity | 11.5 kJ/(m day K) |
| Gas thermal conductivity | 2.89 kJ/(m day K) |
| Producer bottom-hole pressure (minimum) | 15 bars |
| Steam quality | 0.9 |

All simulations are conducted for 10 years of operation. The reservoir is first preheated for 6 months. Then, 2 mol % of solvent is coinjected with steam at 35 bars until the steam chamber reaches the side boundary of the reservoir model. After the coinjection period, 100% wet steam of 90% quality is injected until the end of the operation. This is because bitumen recovery gradually becomes less efficient, and solvent recovery becomes the focus in the final stage.

The viscosity model for water/n-alkane/bitumen takes into account the effect of water solubility in oil on L-phase viscosity. It also represents the difference between the mixing of water/bitumen and that of solvent/bitumen in terms of L-phase viscosity.

The correlation for viscosity of saturated-liquid DME has been used to create a viscosity-temperature table at DME's subcritical conditions for STARS. The correlation is as follows:

$$\log_{10}\mu = -5.7282 + \frac{631.031}{T} + 0.01453T - 1.8225 \times 10^{-5}T^2, \quad (3)$$

where μ is DME viscosity in cP, and T is temperature in K. This correlation gives 0.5% AARD from experimental data measured from 227 K to 343 K. DME is supercritical above 400.05 K (Table 1). No data appears to be available for viscosity of supercritical DME. Therefore, it is assumed to be the same as the supercritical viscosity of $C_3$ in this Example. Coefficients in the viscosity mixing rule for $C_4$ are used for DME in the absence of experimental viscosity data for bitumen/DME mixtures.

The STARS simulator models the V-phase densities by the ideal-gas law. The liquid phases' densities can be calculated by the following mixing rule (no volume change on mixing):

$$1/\rho_j = \Sigma_{i=1}^{Nc} x_{ij}/\rho_{ij}, \quad (4)$$

where $\rho_j$ the molar density of liquid phase j, $x_{ij}$ the mole fraction of component i in liquid phase j, and $N_C$ is the number of components. $\rho_{ij}$ is the molar density of component i in phase j at T and P, which can be calculated as follows:

$$\rho_{ij} = \rho_{iref}\exp\left[-\alpha_1(T - T_{ref}) - \frac{1}{2}\alpha_2(T^2 - T_{ref}^2) + \alpha_3(P - P_{ref}) + \alpha_4(P - P_{ref})(T - T_{ref})\right], \quad (5)$$

where $P_{ref}$ is the reference pressure in kPa, 101.325 kPa, and $T_{ref}$ is the reference temperature in K, 288.15 K. $\rho_{iref}$ is the molar density of component i at the reference pressure and temperature. α's are coefficients, and can be obtained together with $\rho_{iref}$ by regression to experimental data.

Known densities for water, bitumen, and n-alkanes were used. Modified Rackett equations were used for accurate representation of liquid DME density from 10 bars to 400 bars and 273 K to 523 K. The liquid density prediction from this model gives 0.039% AARD from experimental data. The modified Rackett equation is $$\rho = \frac{\rho_0}{[1 - C_T\ln((B_T + P)/(B_T + P_0))]}, \quad (6)$$

where $\rho_0 = \dfrac{A_R}{B_R^{[1+(1-\frac{T}{C_R})^{D_R}]}}$ and $$B_T = B_{T0} + B_{T1}\frac{T}{E_T} + B_{T2}\left(\frac{T}{E_T}\right)^2.$$

ρ is the liquid molar density of DME in mol/m$^3$

T and P are temperature and pressure in K and MPa, respectively. $C_T$=0.0834042, $B_{T0}$=284.304 MPa, $B_{T1}=-130.021$ MPa, $B_{T2}=14.4194$ MPa, $E_T=100$ K, $A_R=55.6001$ mol/m$^3$, $B_R=0.236704$, $C_R=401.406$ K, and $D_R=0.243368$. The CMG STARS simulator uses the liquid density models described in equations 4 and 5, instead of the Rackett equation. Therefore, equations 4 and 5 were regressed to match predictions by the Rackett model up to 50 bars by adjusting the five parameters, $\rho_{iref}$ and $\alpha$'s. The regression results give AAD and AARD of 14.9 kg/m$^3$ and 2.7%, respectively, and are given in Tables 4 and 5 along with those coefficients for water, alkanes, and bitumen.

TABLE 4

Density coefficients for the simulation case study with the STARS simulator (Computer Modelling Group, 2014). Values for water and n-alkanes were taken from Venkatramani and Okuno (2016). The $\alpha$ values provided are for the use of equation 5 with the units of kPa and ° C. as required by STARS.

| Component | $\rho_{ref}$, mol/m$^3$ | $\alpha_1$, K$^{-1}$ | $\alpha_2$, K$^{-2}$ | $\alpha_3$, kPa$^{-1}$ | $\alpha_4$, kPa$^{-1}$ K$^{-1}$ |
|---|---|---|---|---|---|
| Water | 55425.9 | $-1.67 \times 10^{-3}$ | $6.48 \times 10^{-6}$ | 0.00 | 0.00 |
| C$_1$ | 19959.5 | $1.32 \times 10^{-3}$ | $5.77 \times 10^{-6}$ | $5.13 \times 10^{-6}$ | $4.05 \times 10^{-8}$ |
| n-C$_4$ | 13244.3 | $5.19 \times 10^{-5}$ | $5.05 \times 10^{-6}$ | $2.55 \times 10^{-6}$ | $4.56 \times 10^{-9}$ |
| DME | 15682.7 | $2.95 \times 10^{-4}$ | $9.98 \times 10^{-6}$ | $4.02 \times 10^{-6}$ | $6.14 \times 10^{-7}$ |

TABLE 5

Bitumen density coefficients for CMG STARS (2014) in the simulation case studies (Venkatramani and Okuno, 2016). The $\alpha$ values provided are for the use of equation 5 with the units of kPa and ° C. as required by STARS.

| System | $\rho_{ref}$, mol/m$^3$ | $\alpha_1$, ° C.$^{-1}$ | $\alpha_2$, K$^{-2}$ | $\alpha_3$, kPa$^{-1}$ | $\alpha_4$, kPa$^{-1}$ K$^{-1}$ |
|---|---|---|---|---|---|
| Water/n-C$_4$/CD | 1872.9 | $-2.23 \times 10^{-5}$ | $9.09 \times 10^{-7}$ | $3.88 \times 10^{-7}$ | $4.28 \times 10^{-9}$ |
| Water/DME/CD | 1872.9 | $-1.95 \times 10^{-5}$ | $8.95 \times 10^{-7}$ | $3.85 \times 10^{-7}$ | $4.72 \times 10^{-9}$ |

The EOS models introduced above is used to generate K-value tables for phase equilibrium calculation in the STARS simulator. In the tabulation of K-value tables, a possible solvent-rich liquid phase has been disregarded as required by the format of STARS' K-value tables. That is, the detrimental effect of liquid-liquid separation on bitumen dilution that can occur for C4-SAGD is not simulated in this case study (see above and FIGS. 8A and 8B).

Figure 9:
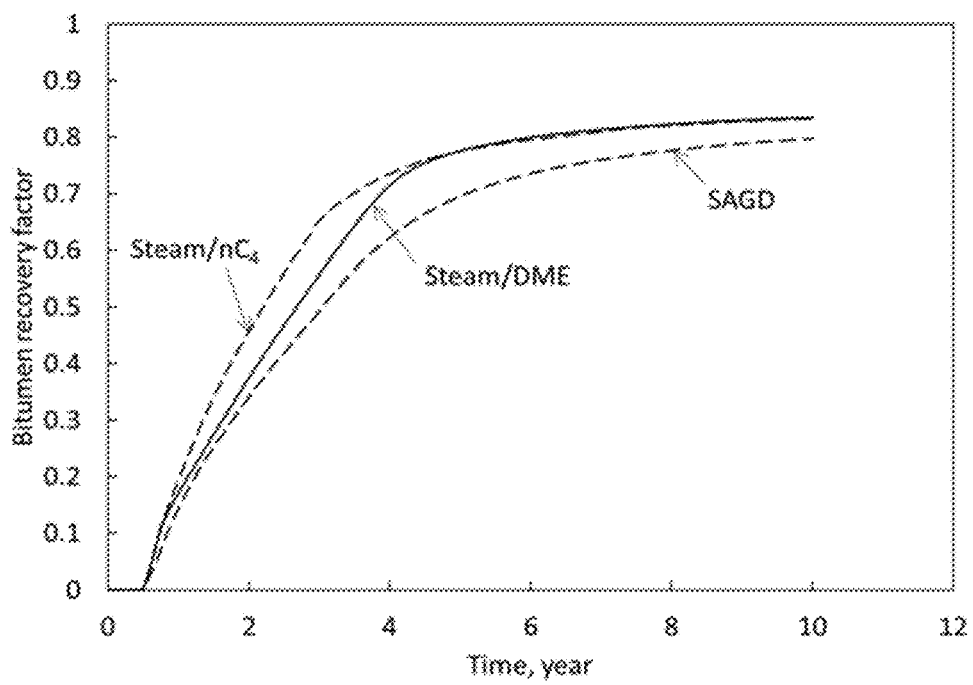
FIG. 9 provides data showing bitumen recovery histories for steam-$nC_4$, steam-DME, and SAGD simulations.
Figure 10:
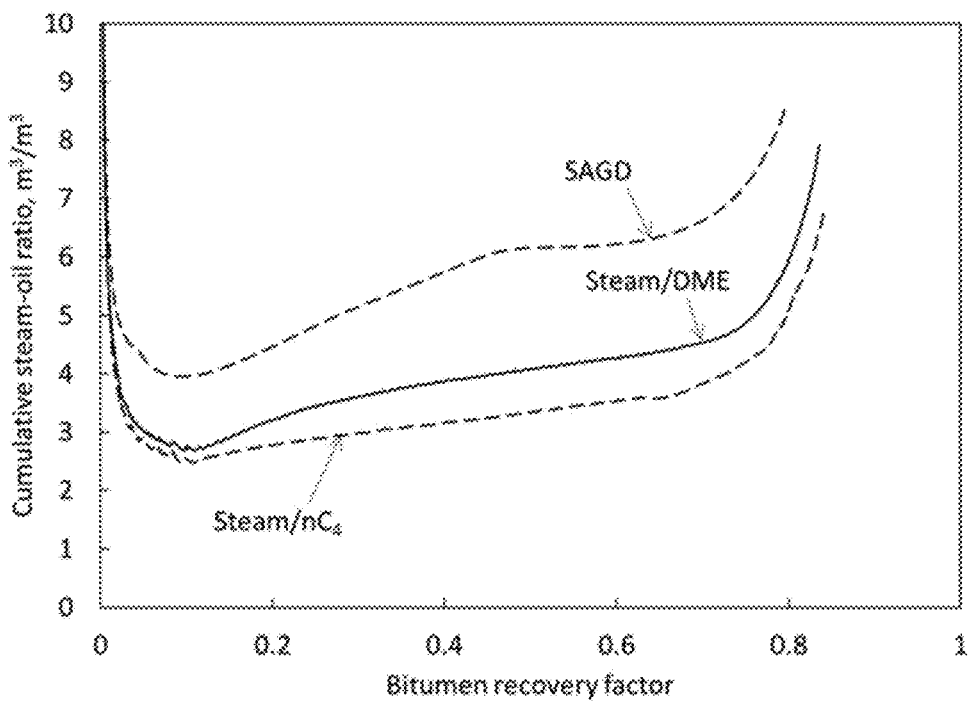
FIG. 10 provides data showing cumulative steam-oil ratio for steam-$nC_4$, steam-DME, and SAGD simulations.
Figure 11:
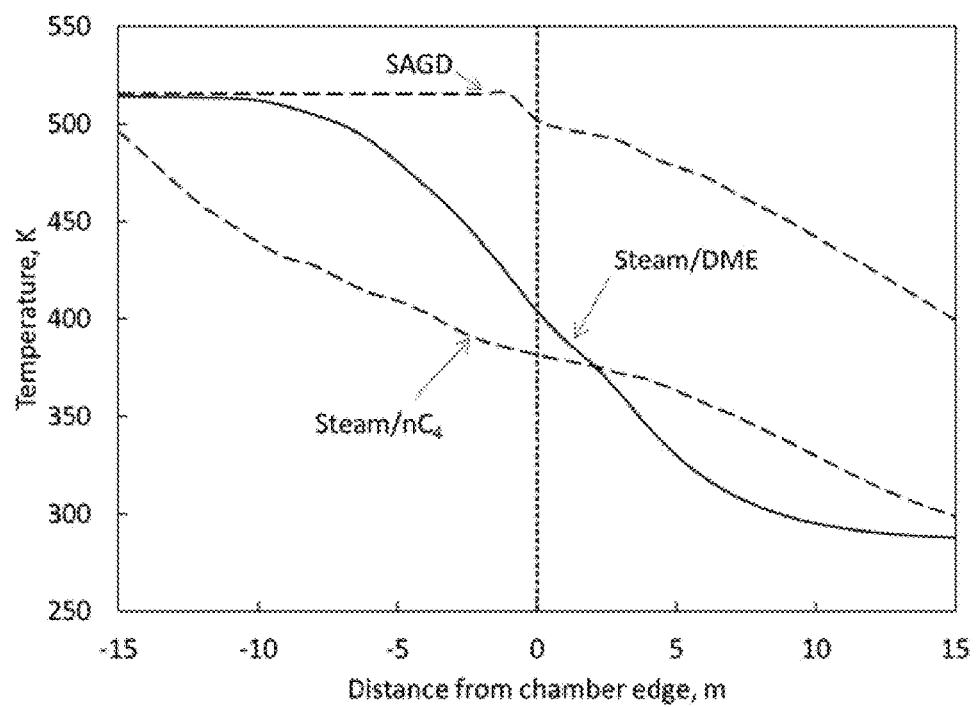
FIG. 11 provides data showing temperature profiles near the steam-chamber edge for the $12^{th}$ row from the reservoir top at 1.8 years for steam-$nC_4$, steam-DME, and SAGD simulations.

Simulation results. FIG. 9 presents the cumulative bitumen production histories simulated for SAGD, DME-SAGD, and C$_4$-SAGD. The bitumen production rates of DME-SAGD is higher than SAGD. Besides, DME-SAGD yields 5% higher ultimate recovery of bitumen than SAGD owing to the distillation mechanism. For the same reason, C$_4$-SAGD is able to achieve a similar ultimate recovery to DME-SAGD. C$_4$-SAGD also shows the highest rate of bitumen production among the three processes studied here. An explanation regarding C$_4$-SAGD's bitumen drainage rate is provided below. The steam chamber reaches the side boundary at 3.8 years in DME-SAGD, 2.7 years in SAGD, and 2.9 years in C$_4$-SAGD. Therefore, steam-solvent coinjection is terminated at 3.8 years in DME-SAGD and 2.9 years in C$_4$-SAGD FIG. 10 shows the CSOR histories simulated for SAGD, DME-SAGD, and C$_4$-SAGD. DME-SAGD reduces CSOR by approximately 2 m$^3$/m$^3$ in comparison with SAGD, and C$_4$-SAGD reduces it even more in this case. The reduction in CSOR is owing to the lower chamber temperature in solvent-SAGD. FIG. 11 shows the temperature profiles near the steam-chamber edge for the 12$^{th}$ row from the reservoir top for SAGD, DME-SAGD, and C$_4$-SAGD at 1.8 years. The chamber-edge temperature is 502 K for SAGD, 404 K for DME-SAGD, and 381 K for C$_4$-SAGD in this figure. As expected from the analysis given in the previous section, the chamber-edge temperature in DME-SAGD is simulated to be 23 K higher than that in C$_4$-SAGD, in spite of the higher volatility of DME in comparison with C$_4$ (FIG. 5).

Figure 12A:
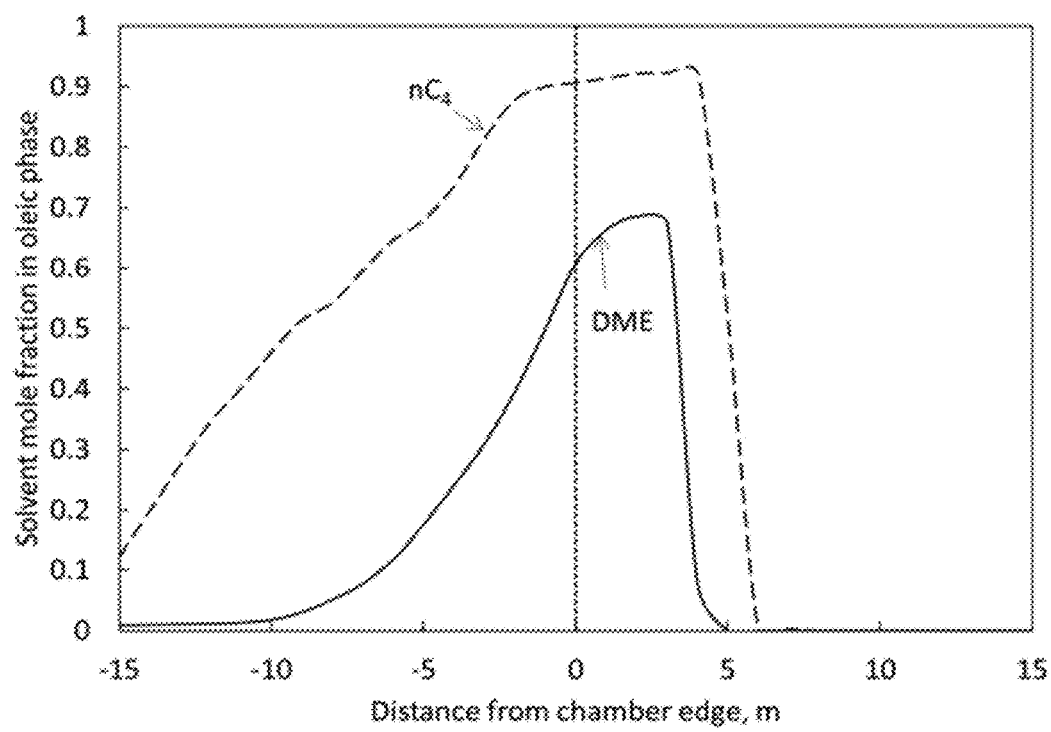
FIG. 12A and FIG. 12B provide data showing solvent mole fractions in the L and W phases for the $12^{th}$ row from the reservoir top for DME-SAGD and $C_4$-SAGD simulations.
Figure 12B:
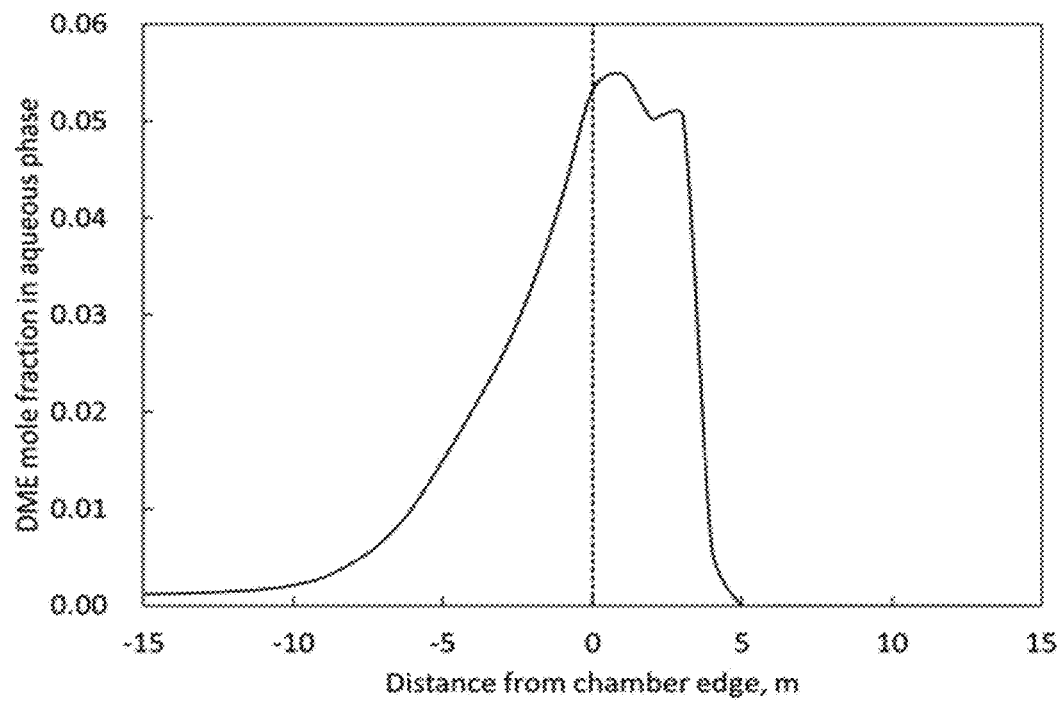

FIG. 12A and FIG. 12B show the solvent mole fractions in the L and W phases for the 12$^{th}$ row from the reservoir top for DME-SAGD and C$_4$-SAGD. The DME concentration in the W phase is approximately 5 mol % within a few meters outside the chamber edge, which is consistent with FIGS. 17A-17B. The L phase near the chamber edge contains approximately 90 mol % C$_4$ in C$_4$-SAGD, and a smaller amount of DME in DME-SAGD, as shown in FIG. 12A. This is qualitatively consistent with FIGS. 6 and 7, in which the L phase contains less than 40 mol % DME in FIG. 7, but more than 75 mol % C$_4$ in FIG. 6 (vapor-condensation conditions for a fixed overall composition at 35 bars). In DME-SAGD, the dilution of bitumen by DME shown in FIG. 12A results in a SAGD-like bitumen production rate (FIG. 9) while reducing SOR by 2 m$^3$/m$^3$ as shown in FIG. 10.

Figure 13A:
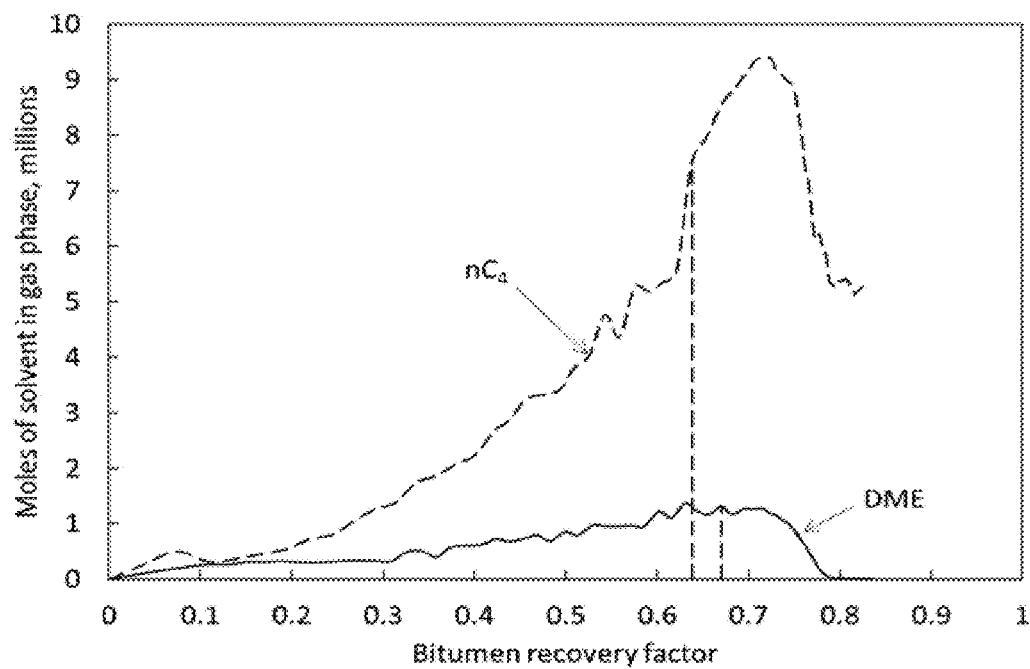
FIG. 13A, FIG. 13B, and FIG. 13C provide data showing histories of solvent mole numbers in the V, L, and W phases for DME- and $C_4$-SAGD simulations.
Figure 13B:
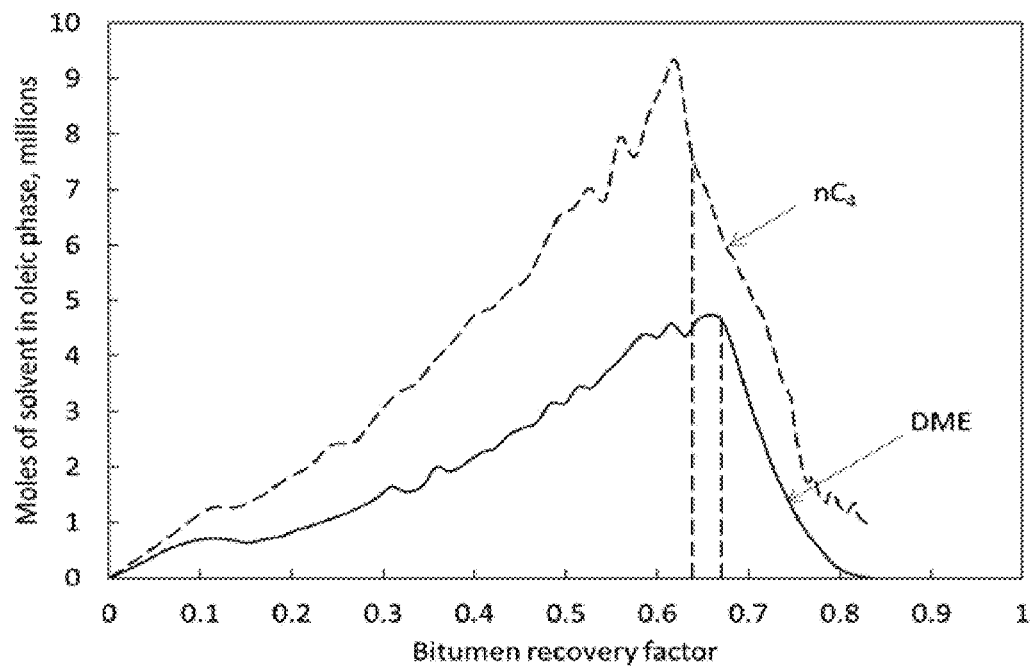
Figure 13C:
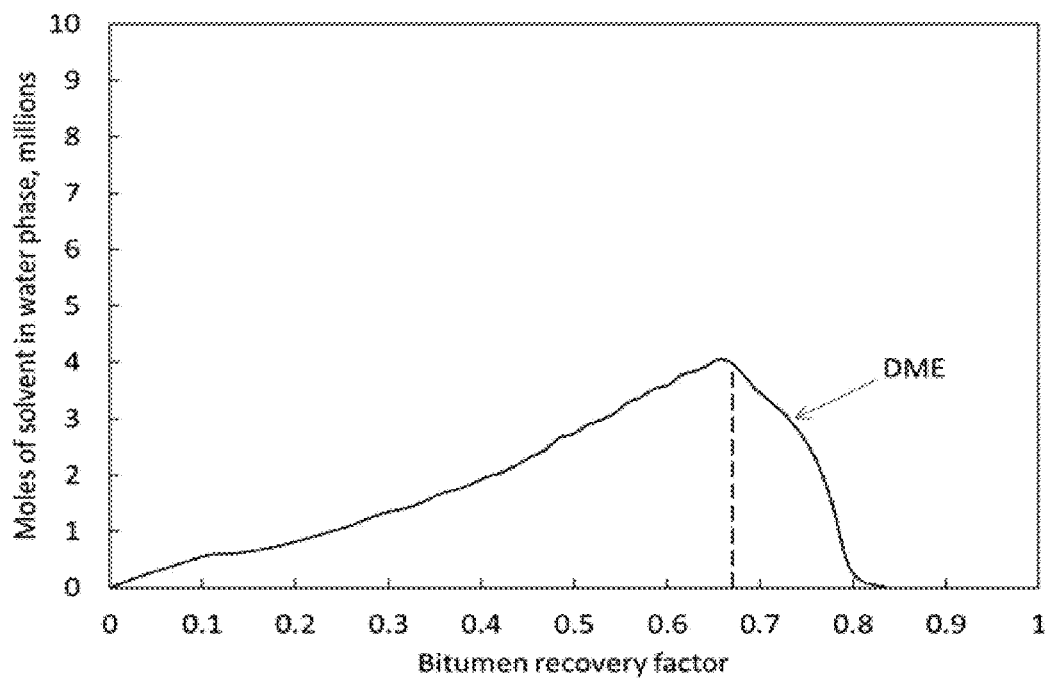

The solubility of DME in water results in the distribution of DME among phases in DME-SAGD that is substantially different from that of C$_4$ in C$_4$-SAGD. FIG. 13A, FIG. 13B, and FIG. 14C presents the histories of solvent molar amounts in the V, L, and W phases for DME- and C$_4$-SAGD. In C$_4$-SAGD, a substantial amount of C$_4$ is present in the V phase, as is the case with solvent-SAGD by use of highly volatile solvents. At the moment the C$_4$ injection is terminated, approximately 50 mol % is in the L phase and 50 mol % is in the V phase. The solvent in the V phase decreases the in-situ temperature, which reduces heat losses to the overlying formation rocks and also facilitates the condensation of that solvent. However, the vapor solvent does not directly contribute to the dilution of bitumen. In DME-SAGD, the injected DME partitions into the W, L, and V phases inside the chamber and the W and L phases ahead of the chamber edge. FIGS. 13A-13C shows that approximately 47 mol % of the in-situ DME is in the L phase, 41 mol % in the W phase, and 12 mol % in the V phase upon the termination of solvent injection. That is, a substantial amount of DME resides in the W phase; i.e., DME dilutes not only bitumen, but also water in DME-SAGD.

Figure 14A:
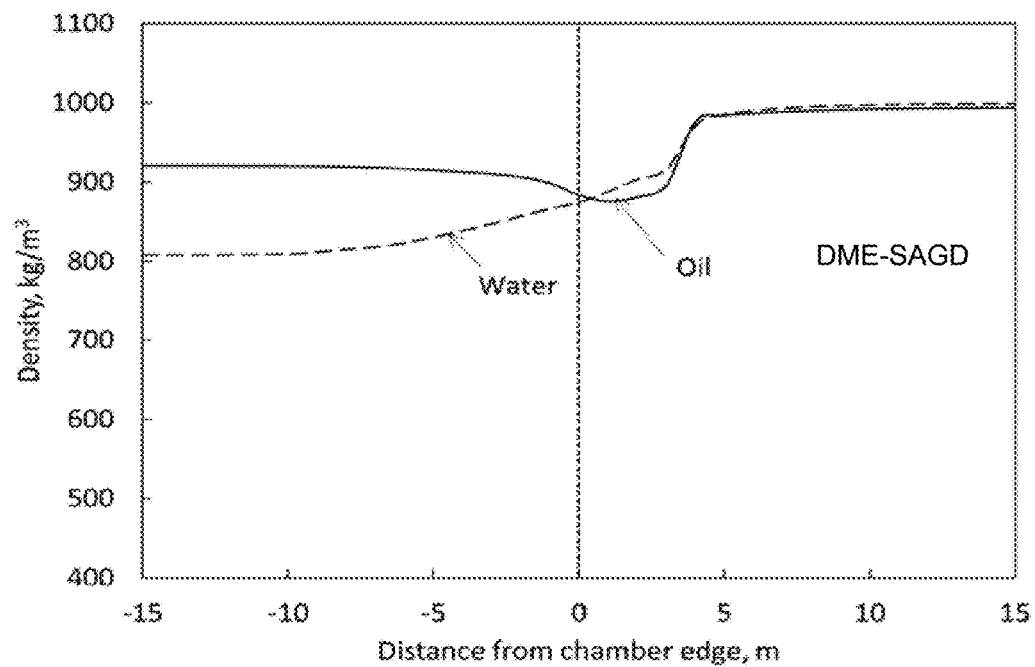
FIG. 14A, FIG. 14B, and FIG. 14C provide data showing density distributions simulated for the W and L phases for DME-SAGD, $C_4$-SAGD, and SAGD for the $12^{th}$ row from the reservoir top at 1.8 years.
Figure 14B:
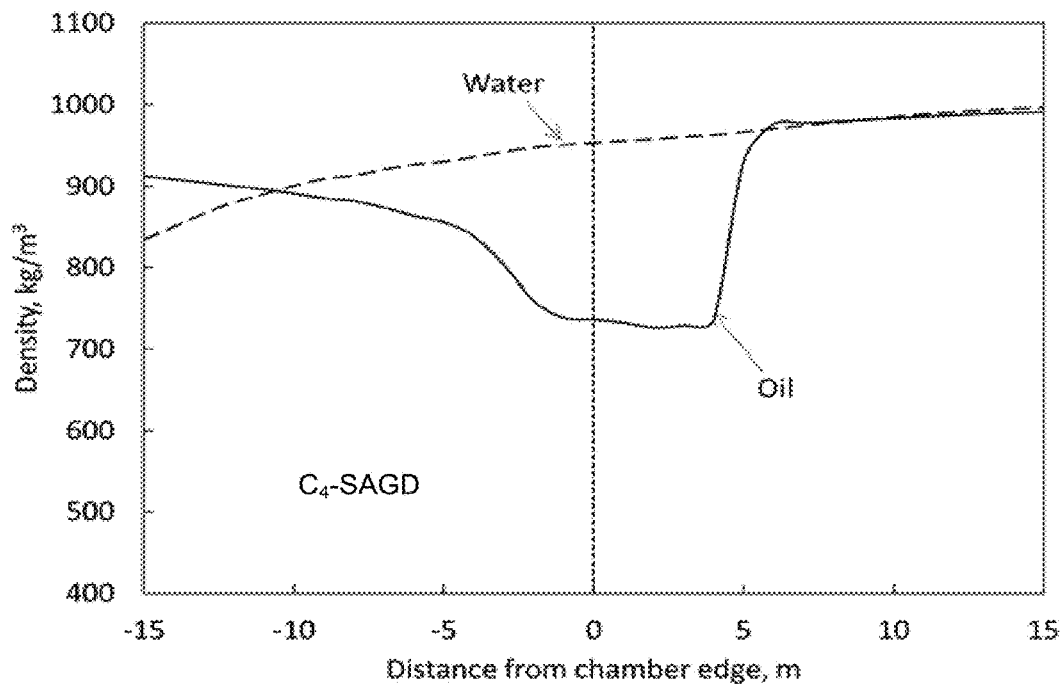
Figure 14C:
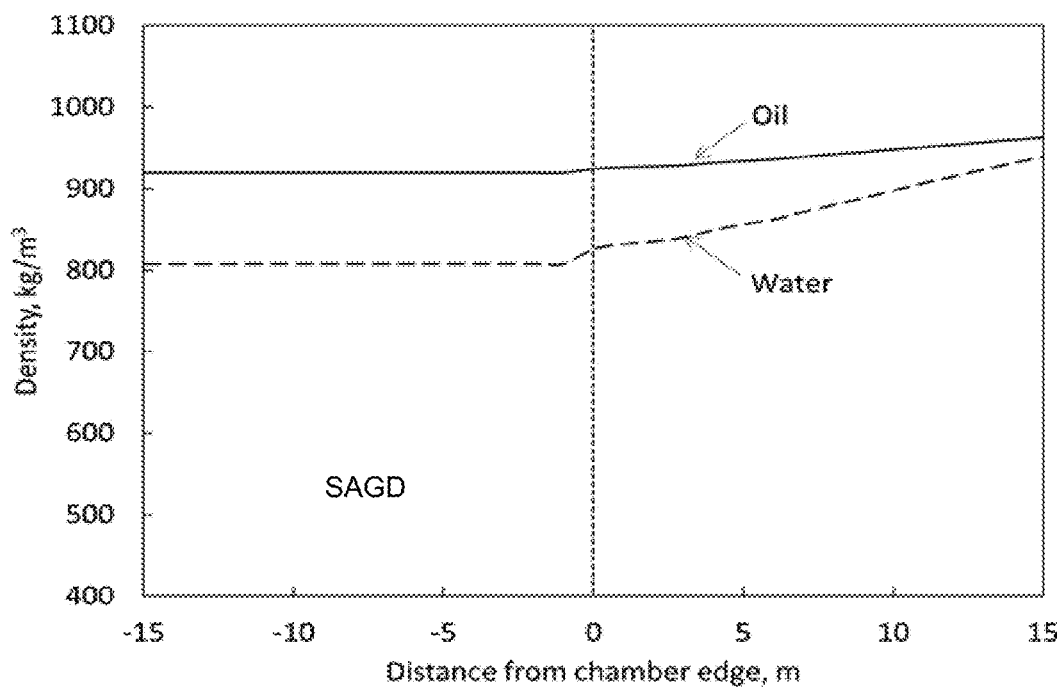

FIG. 14A, FIG. 14B, and FIG. 14C shows the density distributions simulated for the W and L phases for DME-SAGD, $C_4$-SAGD, and SAGD for the 12$^{th}$ row from the reservoir top at 1.8 years. For DME-SAGD, the difference in mass density, $\Delta\rho_m$ (mass density of the W phase less mass density of the L phase), is nearly zero in the gravity-drainage zone outside the steam chamber and negative inside the steam chamber, because of the partitioning of DME into the W and L phases. However, $\Delta\rho_m$ is simulated to be systematically negative in SAGD and positive in $C_4$-SAGD near the chamber edge. $\Delta\rho_m$ in the L-W two-phase flow along the chamber edge affects the compositional-flow regime, especially in solvent-SAGD.

Figure 15A:
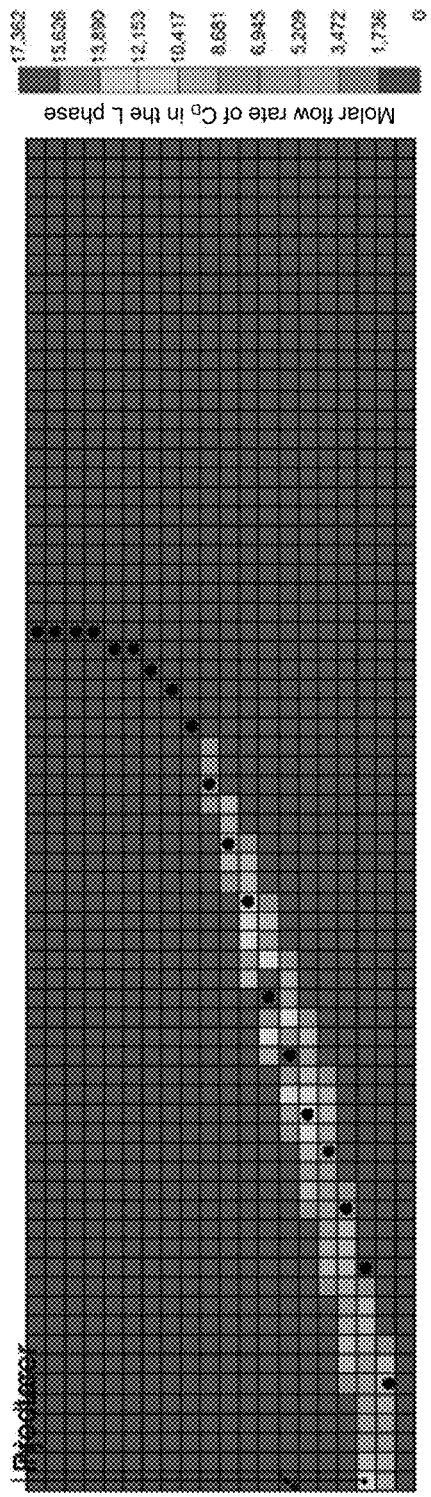
FIG. 15A and FIG. 15B provide 2-D maps for (FIG. 15A) molar flow rate of the bitumen component ($C_D$) in the L phase (moles/day), and (FIG. 15B) molar flow rate of water in the W phase (moles/day) in $C_4$-SAGD at 1.8 years.
Figure 15B:
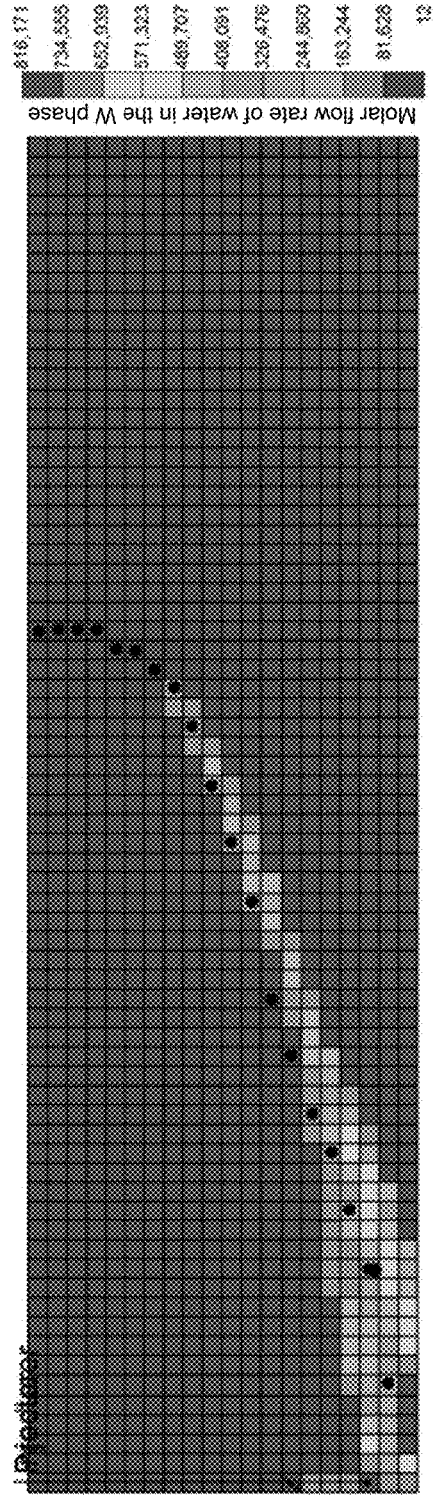

FIG. 15A and FIG. 15B show the molar flow rate of $C_D$ in the L phase and that of water in the W phase in $C_4$-SAGD at 1.8 years. The chamber edge is indicated by black dots in this figure. The transport of bitumen ($C_D$) clearly occurs above that of water because the L phase is less dense than the W phase in $C_4$-SAGD as shown in FIGS. 14A-C for the 12$^{th}$ row. FIG. 16A and FIG. 16B show the molar flow rate of $C_D$ in the L phase and that of water in the W phase for DME-SAGD at 1.8 years. In DME-SAGD, the transport of $C_D$ occurs more slowly, but in the thicker zone outside the chamber edge in comparison with $C_4$-SAGD (FIGS. 15A and 16A). DME appears to have penetrated deeper outside the chamber edge because of the lower level of gravity segregation between the L and W phases in DME-SAGD. This can be clearly seen in FIG. 17A and FIG. 17B, which show the maps for the overall mole fraction of $C_4$ in $C_4$-SAGD and that of DME in DME-SAGD at 1.8 years. FIG. 18A, FIG. 18B, and FIG. 18C present the profiles of overall composition for DME-SAGD, $C_4$-SAGD, and SAGD at the 12$^{th}$ row from the reservoir top at 1.8 years. The overall concentration of DME is higher outside the chamber than inside the chamber in DME-SAGD. This is in contrast to the $C_4$ concentration profile shown in FIG. 18B for $C_4$-SAGD. In $C_4$-SAGD, a substantial amount of $C_4$ is used to transport a small amount of bitumen ($C_D$) (approximately 1 mol % in FIG. 18A), which makes a $C_4$ bank flowing with the W phase with a large positive $\Delta\rho_m$. In DME-SAGD, a larger amount of $C_D$ is diluted by a smaller amount of solvent, and the segregation of the L and W phases is less clear (FIG. 18C).

Figure 19:
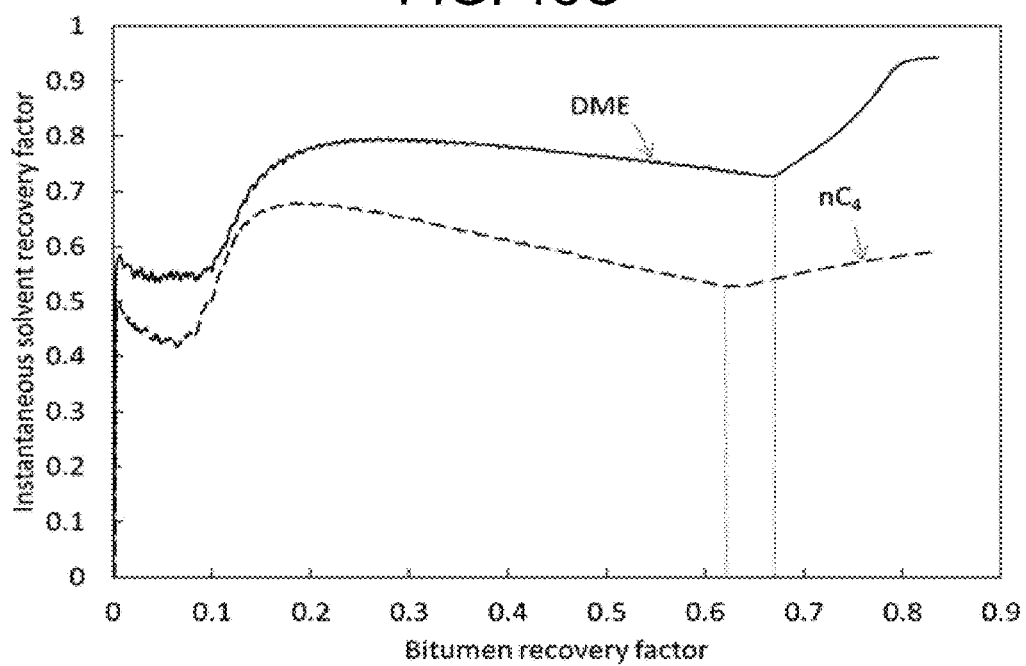
FIG. 19 provides data showing solvent-recovery factor for DME-SAGD and $C_4$-SAGD.

The DME distribution among phases given in FIGS. 13A-C also improves solvent recovery in DME-SAGD in comparison with $C_4$-SAGD. FIG. 19 shows that the solvent recovery factor in DME-SAGD is systematically higher than that of $C_4$-SAGD (approximately by 15%). The solvent recovery factor is defined here as the cumulative volume of solvent produced divided by the cumulative volume of solvent injected at a given time. In DME-SAGD, 92% of DME is recovered by the produced W phase, and 10% from the produced L phase measured at the reservoir conditions. In $C_4$-SAGD, 100% of $C_4$ is from the produced L phases since $C_4$ is insoluble in water.

One of the main uncertainties in the model is the L-phase viscosity for DME-SAGD. Sections below present a sensitivity analysis regarding the effects of the viscosity model and the number of gridblocks on simulation results.

Conclusions. This Example relates to the potential of water-soluble solvent as an additive to steam for improving the efficiency of SAGD. Another objective of this Example is to investigate how the solubility of solvent in water affects solvent-SAGD. DME and Athabasca bitumen were considered respectively as the water-soluble solvent and bitumen in this Example. However, it is beyond the scope of this Example to single out a particular compound as a promising water-soluble additive to steam for a given bitumen/heavy oil. Conclusions are as follows:

Although DME is more volatile than $C_4$, the solubility of DME in water in DME-SAGD results in chamber-edge temperatures that are higher than those in $C_4$-SAGD. This can be explained by ternary phase behavior of water/solvent/bitumen mixtures; that is, the transition from WLV to WL for such a system tends to occur at a higher temperature for a given overall composition and pressure when the solvent partitions into the W phase.

The solubility of DME in bitumen is nearly a half of that of $C_4$ at their corresponding chamber-edge conditions (FIGS. 6, 7, and 12A-12B). In DME-SAGD simulations, however, approximately 47 mol % of the in-situ DME was used for dilution of bitumen, which was equivalent to the fraction of the in-situ $C_4$ used for bitumen dilution in $C_4$-SAGD. This occurs likely because the partitioning of DME into bitumen and water reduces the gravity segregation of the two-liquid-phase flow along the edge of a steam chamber in DME-SAGD. The reduced gravity segregation in DME-SAGD is expected to facilitate the mixing of condensed DME with bitumen. This is in contrast to $C_4$-SAGD, in which the L phase diluted by a substantial amount of $C_4$ is much less dense than the W phase, impeding the contact between the $C_4$ bank and bitumen along the edge of a steam chamber.

Simulation results showed that the vapor fraction of the in-situ solvent was much smaller in DME-SAGD than in $C_4$-SAGD. Also, the injected DME can be recovered not only by the L phase, but also by the W phase in DME-SAGD. Therefore, the recovery factor of solvent was simulated to be systematically higher (by approximately 15%) in DME-SAGD than in $C_4$-SAGD.

Simulation results showed that DME-SAGD yielded 35% reduction in SOR in comparison with SAGD while being able to keep SAGD-like rates of bitumen production. DME-SAGD also resulted in 5% higher ultimate recovery of bitumen than SAGD. However, $C_4$-SAGD was simulated to be superior to DME-SAGD in terms of bitumen-production rate and SOR in the case studied.

Explanation of $C_4$-SAGD performance given above. In the above description in this example, the $C_4$-SAGD case resulted in higher bitumen-drainage rates than the DME-SAGD case before the steam chamber reached the reservoir boundary (FIG. 9). It was also simulated that the solvent's distribution ahead of the steam-chamber edge was substantially different between the $C_4$-SAGD and DME-SAGD cases (FIGS. 12A-12B, 17A-17B, and 18A-18B) because these cases resulted in different levels of gravity segregation between the W and L phases. This appendix provides a more detailed explanation of how the solvent distribution affects bitumen molar flow ahead of the edge of a steam chamber (FIGS. 15A-15B and 16A-16B).

Following a derivation, Darcy's flow velocity for the L phase is integrated for a cross-section perpendicular to the edge of a steam chamber to give the following expression for molar flow rate of bitumen $Q_{bit}$ at elevation z:

$$Q_{bit}(z) = \int_0^{\xi_L} u_L \rho_L x_{bitL} \Delta y d\xi = -kg\sin\theta \Delta y \int_0^{\xi_L} \frac{k_{rL}}{v_L} \rho_L x_{bitL} d\xi, \quad (A1)$$

where $u_L$ is Darcy's flow velocity for the L phase, $\rho_L$ is molar density of the L phase, $x_{bitL}$ is bitumen mole fraction in the L phase, $\xi_L$ is the thickness of mobilized oil perpendicular to the steam chamber edge, $\Delta y$ is the horizontal-section length, k is the absolute permeability, g is the gravitational acceleration, θ is the angle between the chamber edge and horizontal line at elevation z, $k_{rL}$ is the L phase relative permeability, and $υ_L$ is kinematic viscosity of the L phase. Equation A1 indicates that molar flow rate of bitumen is affected by the profiles of L-phase saturation, kinematic viscosity, molar density, and bitumen concentration.

Figures 20A, 20B:
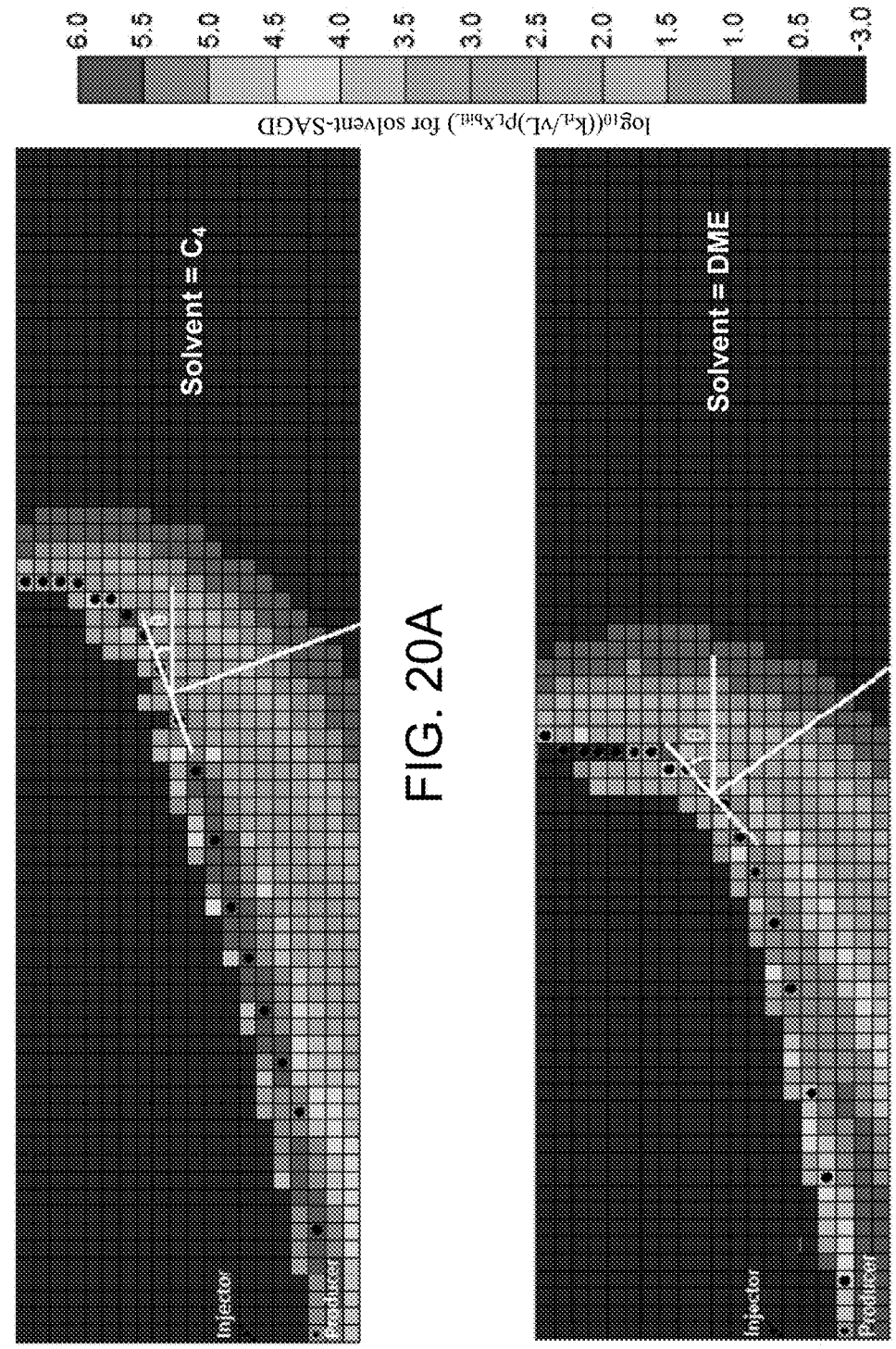
FIG. 20A and FIG. 20B provide 2-D maps of $\log_{10}$ $$\left(\frac{k_{rL}}{v_L}\rho_L x_{bitL}\right)$$

To confirm the simulation results given above, Equation A1 was applied to the $C_4$-SAGD and DME-SAGD cases. FIG. 20A and FIG. 20B compare the profiles of the integrand in Equation A1 in log scale [i.e., $\log_{10}$ $$\left(\frac{k_{rL}}{v_L}\rho_L x_{bitL}\right)]$$

for $C_4$-SAGD and DME-SAGD at 1.8 years. Then, a discretized form of Equation A1 was applied to compare the bitumen molar flow rates evaluated for the perpendicular line originated at elevation 10 m on the corresponding chamber edge. It was confirmed that the molar flow rate of bitumen for $C_4$-SAGD was calculated to be approximately 1.2 times that of DME-SAGD based on Equation A1 for the mid-elevation, z=10 m.

Analysis of FIGS. 20A-20B on the basis of Equation A1 indicate that the greater molar flow of bitumen in $C_4$-SAGD occurs mainly because L-phase kinematic viscosity is substantially low, but L-phase molar volume is high where L-phase relative permeability is high in the vicinity of the chamber edge. Although the L-phase bitumen concentration is low near the chamber edge, the bitumen molar flow in $C_4$-SAGD is simulated to be greater than that in DME-SAGD because the effect of substantially-low kinematic viscosity is amplified by the high molar density and relative permeability near the chamber edge $$\left(\text{i.e., } \frac{k_{rL}}{v_L}\rho_L\right).$$

Sensitivity analysis. This section shows sensitivity analysis of simulation results in terms of the viscosity model used for the L phase and the number of gridblocks.

Viscosity model. As mentioned above, the viscosity model for the L phase containing DME is currently not well known. Above, the same coefficients for the non-linear log mixing rule were used for both $C_4$-SAGD and DME-SAGD, considering the similarity of DME and $C_4$ in terms of volatility.

The mixing rule for L-phase viscosity in STARS is $$\ln \mu_L = \sum_{i=1}^{Nc} q_i x_{iL} \ln \mu_{iL} = \sum_{i=1}^{Nc} f_i \ln \mu_{iL}, \quad (B1)$$

subject to $\sum_{i=1}^{Nc} q_i x_{iL} = \sum_{i=1}^{Nc} f_i = 1.0$. Bitumen is set as the key component, and its weighting factor can be calculated as follows:

$$q_{CD} = 1 + \alpha\left\{\frac{(1-x_{CDL})[1-(1-x_{CDL})^8]}{x_{CDL}}\right\}, \quad (B2)$$

where α is a constant specific to the solvent used. Weighting factors for the other components are set to be identical subject to Equation B1. Above, the α value used for $C_4$-SAGD and DME-SAGD is 0.43.

FIGS. 21A-21C and 22A-22B show simulation results when α is set to 0.20 for DME-SAGD. In comparison with 0.43, the α value of 0.20 results in better agreement with the data recently measured for Athabasca-bitumen/DME mixtures at different temperatures at 35 bars. By using this viscosity model, the drainage rate of DME-SAGD with α of 0.20 is simulated to be approximately 10% greater than that with α of 0.43. Accordingly, the cumulative SOR of DME-SAGD to recover the same amount of bitumen is lowered by approximately 0.5 m³/m³. The instantaneous recovery of DME is simulated to be approximately 5% higher. The density difference between the L and W phases near the chamber edge in DME-SAGD at 1.8 years remains small compared to that of $C_4$-SAGD.

Number of gridblocks. Simulations of $C_4$-SAGD, DME-SAGD and SAGD were repeated by using 4 times more gridblocks (140×1×40) under the same conditions as described above. However, non-convergence was observed for these fine-scale simulations. FIG. 22A and FIG. 22B show bitumen recovery curves before the simulation was terminated due to non-convergence. Bitumen drainage rates for $C_4$-SAGD, DME-SAGD and SAGD were simulated to be higher than the original cases described above. However, relative positions of bitumen recovery curves in those three fine-grid cases are similar to those for the coarse-grid cases described above. It is unlikely that the number of gridblocks used affects the conclusions of the current Example.

Descriptions of the Figures Referenced in this Example.

FIG. 3A and FIG. 3B provide thermodynamic conditions at the edge of a steam chamber corresponding to vapor-condensation conditions, including a ternary diagram and a chamber schematic. The ternary diagram shows an overall composition on the edge of a tie triangle of W, L, and V at 35 bars for the water/pentane/bitumen system as an example. "$C_D$" stands for the dead-oil pseudo component, which is bitumen in this example. The chamber schematic shows a point on the edge of a steam chamber, of which the thermodynamic conditions correspond to the red dot in the ternary diagram.

FIG. 4 provides pressure-composition (P-x) diagrams for water/DME mixtures at 5 different temperatures. The data were taken from Pozo and Streett (1984). The predictions are based on the PR EOS with the HV mixing rule. The horizontal line for each temperature represents the three-phase conditions for the W, V, and L phases.

FIG. 5 provides vapor pressure curves of pure components and three-phase curves for water/solvent binaries. UCEP stands for upper critical endpoint, at which three-phase behavior culminates.

FIG. 6 provides vapor-condensation temperatures at 35 bars for water/solvent/bitumen mixtures for a fixed overall composition 95 mol % water, 4 mol % solvent, and 1 mol % bitumen ($C_D$). Four different alkane solvents are compared, propane, butane, pentane, and hexane. The overall composition is shown as the black dot located on the W-L edge of the tie triangle for the aqueous (W), oleic (L), and vapor (V) phases. The Peng-Robinson equation of state was used for the calculations (Tables 1 and 2). Two-phase regions associated with the tie triangle are omitted for clarity.

FIG. 7. Vapor-condensation temperature at 35 bars for the overall composition 95 mol % water, 4 mol % DME, and 1 mol % bitumen ($C_D$). This overall composition is shown as the black dot located on the W-L edge of the tie triangle for the aqueous (W), oleic (L), and vapor (V) phases. The Peng-Robinson equation of state was used for the calculations. Two-phase regions associated with the tie triangle are omitted for clarity.

FIG. 8A and FIG. 8B provide temperature-composition diagrams for water/pentane/bitumen (FIG. 8A) and water/DME/bitumen (FIG. 8B) at 35 bars by use of the PR-EOS model (Tables 1 and 2). Only three-phase regions are shown for clarity.

FIG. 9 provides data showing bitumen recovery histories for steam-n$C_4$, steam-DME, and SAGD simulations.

FIG. 10 provides data showing cumulative steam-oil ratio for steam-n$C_4$, steam-DME, and SAGD simulations.

FIG. 11 provides data showing temperature profiles near the steam-chamber edge for the $12^{th}$ row from the reservoir top at 1.8 years for steam-n$C_4$, steam-DME, and SAGD simulations. The dashed line indicates the edge of a steam chamber, the left side of which is the steam chamber.

FIG. 12A and FIG. 12B provide data showing solvent mole fractions in the L and W phases for the $12^{th}$ row from the reservoir top for DME-SAGD and C4-SAGD simulations; FIG. 12A, L phase; and FIG. 12B, W phase. The dashed line indicates the edge of a steam chamber, the left side of which is the steam chamber.

FIG. 13A, FIG. 13B, and FIG. 13C provide data showing histories of solvent mole numbers in the V, L, and W phases for DME- and $C_4$-SAGD simulations. The dashed line indicates when the solvent injection is terminated.

FIG. 14A, FIG. 14B, and FIG. 14C provide data showing density distributions simulated for the W and L phases for DME-SAGD, $C_4$-SAGD, and SAGD for the $12^{th}$ row from the reservoir top at 1.8 years. The dashed line indicates the edge of a steam chamber, the left side of which is the steam chamber.

FIG. 15A and FIG. 15B provide 2-D maps for (FIG. 15A) molar flow rate of the bitumen component ($C_D$) in the L phase (moles/day), and (FIG. 15B) molar flow rate of water in the W phase (moles/day) in $C_4$-SAGD at 1.8 years. The chamber edge is indicated by black dots.

FIG. 16A and FIG. 16B provide 2-D maps for (FIG. 16A) molar flow rate of the bitumen component ($C_D$) in the L phase (moles/day), and (FIG. 16B) molar flow rate of water in the W phase (moles/day) in DME-SAGD at 1.8 years. The chamber edge is indicated by black dots.

Figure 17A:
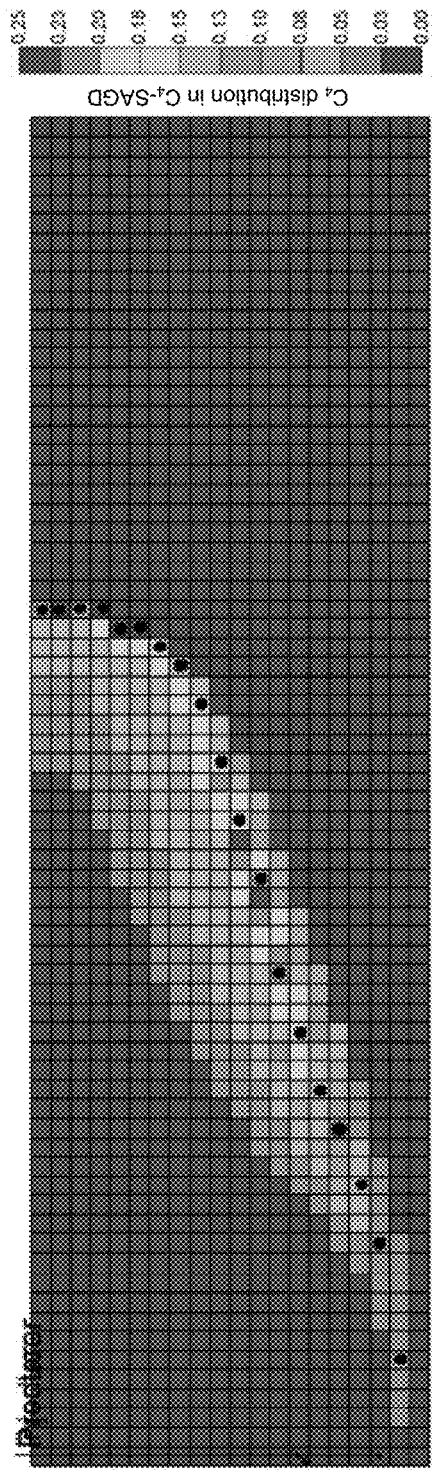
FIG. 17A and FIG. 17B provide overall concentration of $C_4$ in $C_4$-SAGD and that of DME in DME-SAGD at 1.8 years.
Figure 17B:
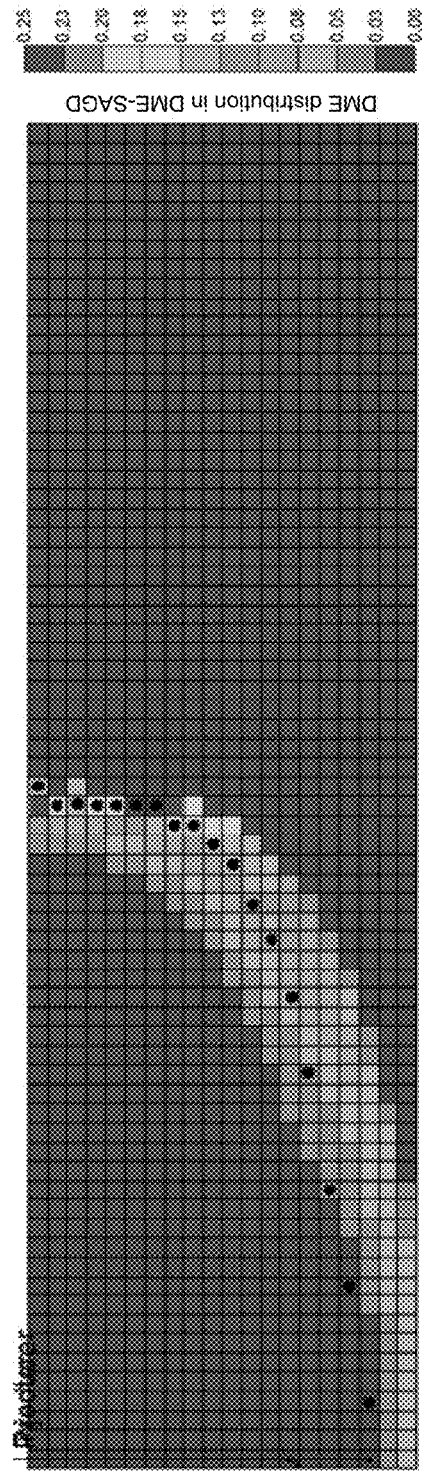
Figure 18A:
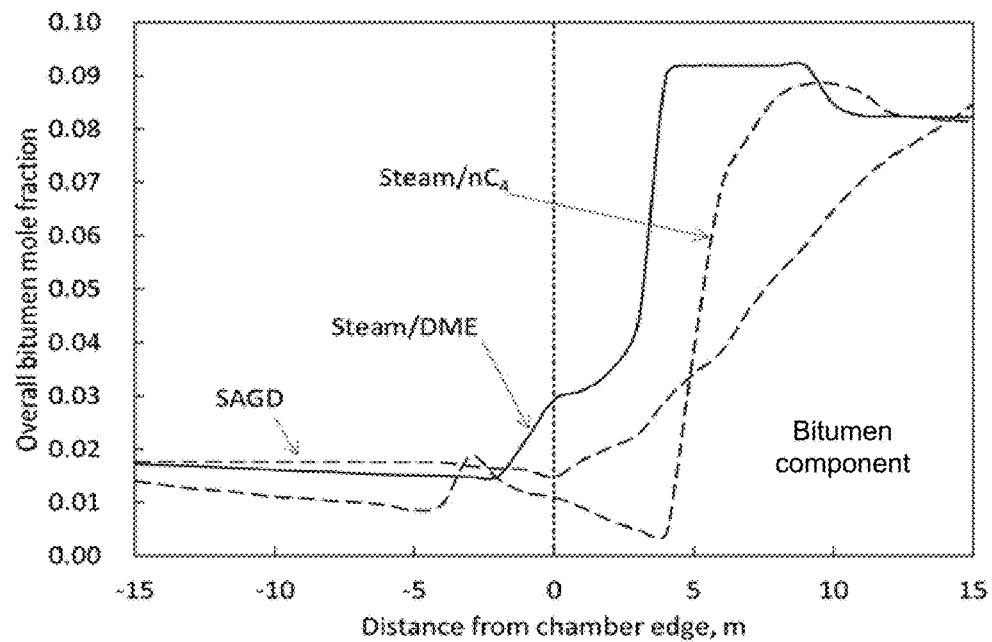
FIG. 18A, FIG. 18B, and FIG. 18C provide data showing profiles of overall composition for DME-SAGD, $C_4$-SAGD, and SAGD at the $12^{th}$ row from the reservoir top at 1.8 years.
Figure 18B:
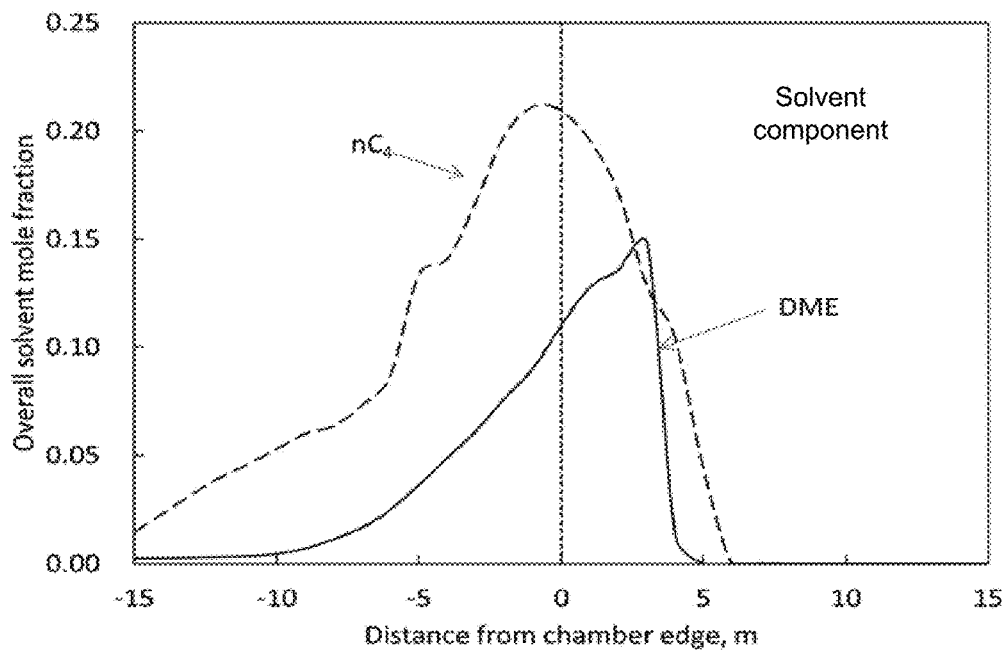
Figure 18C:
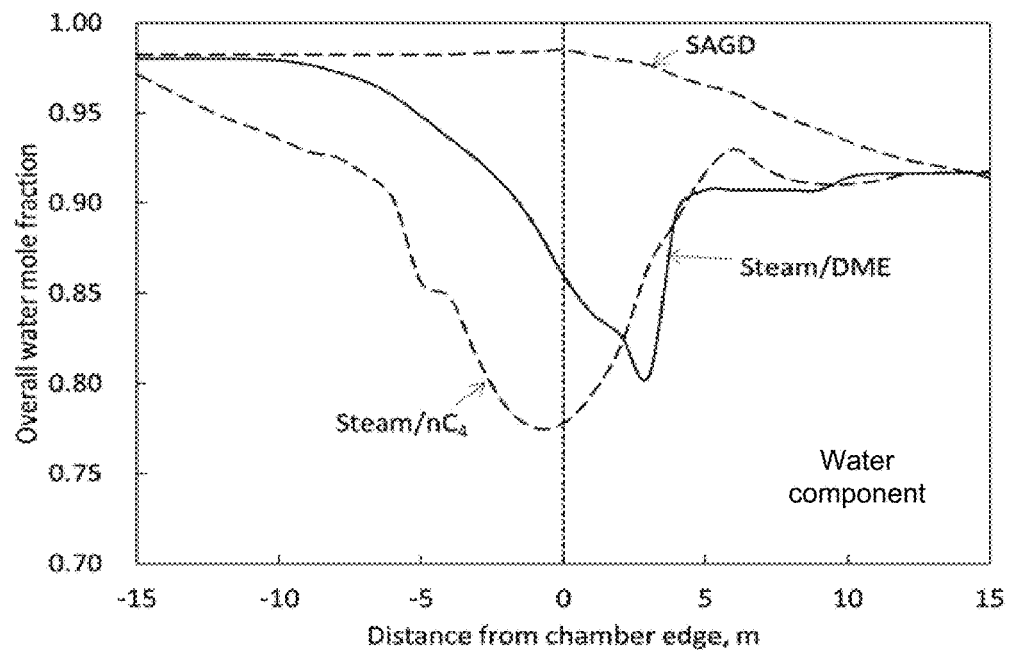

FIG. 17A and FIG. 17B provide overall concentration of $C_4$ in $C_4$-SAGD and that of DME in DME-SAGD at 1.8 years. The chamber edge is indicated by black dots.

FIG. 18A, FIG. 18B, and FIG. 18C provide data showing profiles of overall composition for DME-SAGD, $C_4$-SAGD, and SAGD at the $12^{th}$ row from the reservoir top at 1.8 years. The dashed line indicates the edge of a steam chamber, the left side of which is the steam chamber.

FIG. 19 provides data showing solvent-recovery factor for DME-SAGD and $C_4$-SAGD. The recovery factor is defined here as the cumulative volume of solvent produced divided by the cumulative volume of solvent injected at a given time. The dashed line indicates when the solvent injection is terminated.

FIG. 20A and FIG. 20B provide 2-D maps of $\log_{10}$ $$\left(\frac{k_{rL}}{v_L}\rho_L x_{bitL}\right)$$

at 1.8 years. The unit for $$\left(\frac{k_{rL}}{v_L}\rho_L x_{bitL}\right)$$

is (kg mol cp$^{-1}$ m$^{-6}$). Black dots indicate the edge of a steam chamber. White solid lines indicates tangent and normal lines at 10 m from the top of the reservoir. θ is the angle between the tangent line and horizontal line.

FIG. 21A, FIG. 21B, and FIG. 21C provide data showing comparisons of bitumen recovery, SOR and solvent recovery among $C_4$-SAGD, SAGD and DME-SAGD with the viscosity parameter α of 0.20. This value of α is based on the data recently measured for mixtures of Athabasca bitumen with DME.

FIG. 22A and FIG. 22B provide data showing profiles of temperature and phase densities for $C_4$-SAGD, DME-SAGD and SAGD at the $12^{th}$ row from the reservoir top at 1.8 years. DME-SAGD in this figure used the viscosity parameter, α=0.20.

FIG. 23 provides bitumen recovery curves for SAGD, $C_4$-SAGD and DME-SAGD when four times more gridblocks are used. All cases show greater bitumen drainage rates during the first several years in comparison with the coarse-grid cases presented above. Relative positions of their bitumen recovery curves remains the same (see FIG. 9).

Nomenclature for Example 1

Roman symbols
A, B, C, D and E=coefficients in the Rackett equation
g=gravitational constant, 9.8 m/s$^2$
k=permeability
L=oleic phase
P=pressure
Q=molar flow rate, mol/s
S=saturation
T=temperature, K
V=vapor phase
V=volume, m$^3$
W=aqueous phase
x=mole fraction
y=length of reservoir parallel to well pair, m
Greek Symbols
α=density coefficient
θ=angle between tangent to chamber edge and horizontal line
μ=dynamic viscosity, mPa·s
υ=kinematic viscosity, cp·m$^3$/kg
ξ=distance from perpendicular to chamber edge, m
ρ=molar density, mole/m$^3$
ω=acentric factor
Subscripts
bit=bitumen
c=critical condition
$C_D$=dead bitumen
HC=hydrocarbon
L=oleic phase
ref=reference condition
sol=solvent
V=vapor phase
w=water
Abbreviations
AAD=average absolute deviation
AARD=average absolute relative deviation
API=American petroleum institute
BIP=binary interaction parameter
CSOR=cumulative steam-to-oil ratio
CPA=cubic-plus-association
DME=dimethyl ether
EOS=equation of state
ES-SAGD=expanding-solvent-SAGD
GOR=gas-oil ratio
HV=Huron-Vidal
LASER=liquid-addition-to-steam-for-enhanced-recovery MW=molecular weight, g/mol
PR=Peng and Robinson
SAGD=steam-assisted gravity drainage
SAP=solvent-aided-process
SOR=steam-oil ratio
UCEP=upper critical end point
vdW=van der Waals Example 2

Comparative Study of Oil Dilution Capability of Dimethyl Ether (DME) and Hexane as Steam Additives for SAGD As described above, dimethyl ether (DME) was investigated as a potential additive to steam to improve SAGD. An objective is to compare DME with n-hexane in terms of the capability of viscosity reduction for Athabasca bitumen. In addition, new experimental data are presented for bubble point pressures, densities, and viscosities of Athabasca bitumen and its mixtures with DME and n-hexane.

Results show that DME results in slightly higher viscosity than n-hexane when they are mixed with the same Athabasca bitumen at a given pressure, temperature, and molar concentration. For example, the equimolar mixture of DME with Athabasca bitumen is 79 cp, and that of n-hexane with the same bitumen is 49 cp at 328 K and 60 bars. However, the two solvents are equivalent as diluent at temperatures above 380 K.

The new experimental data and previous data indicate that the viscosity of n-alkanes/bitumen mixtures does not follow the trend given by the classical Arrhenius mixing rule. That is, heavier solvent can give lower viscosity than lighter solvent when they are mixed with the same bitumen at a given pressure, temperature, and molar concentration. Viscosities for DME/bitumen mixtures deviate from the Arrhenius equation more than those for n-hexane/bitumen mixtures. The Arrhenius equation can be modified to correlate the measured data more accurately.

Liquid-liquid separation for solvent/bitumen mixtures, which occurred for n-butane/Athabasca-bitumen, was not observed for any of the DME/bitumen and n-hexane/bitumen mixtures in this Example. The highest solvent concentration in this study was 80 mol % DME for the DME/bitumen system and 92 mol % n-hexane for the n-hexane/bitumen system.

Steam-assisted gravity drainage (SAGD) has been widely used for in-situ recovery of bitumen, which is usually immobile at reservoir conditions. SAGD uses two horizontal wells that are approximately five meters apart vertically. The upper horizontal well is for injection of high-quality steam (e.g., 90%), and the lower well for production of heated bitumen and water. The injected steam forms a steam-saturated zone, "steam chamber". Bitumen is effectively made mobile by latent heat of the injected steam upon its condensation near the edge of a steam chamber since viscosity of bitumen is sensitive to temperature. The main drawback of SAGD is the significant usage of energy and water to generate steam.

The energy efficiency of steam injection processes is quantified by cumulative steam-to-oil ratio (CSOR), defined as the ratio of the cumulative volume of steam injected (cold water equivalent) to the cumulative volume of bitumen produced. In SAGD, temperatures inside the steam chamber and in its vicinity can be high (e.g., 450-520 K). CSOR may generally in the range from 2 to 4 m$^3$/m$^3$ for SAGD to be economically feasible. It is desirable to lower CSOR by operating at low chamber temperatures while maintaining economically sustainable rates of oil production. SAGD is expected to be even less energy-efficient for highly heterogeneous reservoirs. Therefore, it is useful to reduce SAGD's CSOR, which has motivated the search for alternative processes.

Coinjection of steam and solvent for SAGD (solvent-steam-assisted gravity drainage, or solvent-SAGD) has been studied and tested as a potential method to improve the drawbacks of SAGD. Solvent-SAGD processes, such as expanding-solvent-SAGD (ES-SAGD), solvent-aided-process (SAP) and liquid-addition-to-steam-for-enhanced-recovery (LASER), use a small amount of solvents (e.g., a few to 20 percent by liquid volume equivalent). They aim to enhance the oleic-phase mobility by the dilution of oil by solvent, in addition to the thermal energy released from the injected steam. It has been shown that solvent-SAGD has the potential of increasing bitumen-drainage rate and displacement efficiency, while reducing CSOR; e.g., EnCana's SAP pilot and Imperial Oil's LASER.

Other investigations into solvent-SAGD are mainly concerned with hydrocarbon solvents, such as propane ($C_3$), butane ($C_4$), and diluents, which usually consist of pentane ($C_5$) and heavier hydrocarbons at different concentrations. The suitability of hydrocarbon solvents for SAGD in terms of phase behavior has been reported to increase with increasing carbon number (or decreasing volatility), and tend to level off at a certain carbon number; e.g., approximately n-hexane for Athabasca bitumen reservoirs. However, heavy hydrocarbon solvents, as such n-hexane and diluents, are relatively expensive in general. In-situ retention of the coinjected solvent, which inevitably happens under heterogeneity, can substantially affect the project's economics. That is, the geological uncertainties associated with reservoir heterogeneity increase the uncertainty of the project's economics, if the solvent to be coinjected is expensive.

This Example relates to the question as to how the water component and/or the aqueous (W) phase can be used to improve the efficiency of steam-based oil recovery, such as SAGD and cyclic steam stimulation. This is because water is by far the most dominant component in steam-based oil recovery for heavy-oil and bitumen recovery. The volume of produced water is at least a few times greater than the volume of produced oil in SAGD and cyclic steam stimulation.

A water-soluble solvent, dimethyl ether (DME), and its phase behavior analysis and mechanistic simulations of DME-steam-assisted gravity drainage (DME-SAGD) have been investigated. Results show that DME-SAGD resulted in 35% lower SOR than SAGD while being able to maintain bitumen-production rates close to SAGD. $C_4$-SAGD was compared with DME-SAGD, because DME is between $C_3$ and $C_4$ in terms of vapor pressure and because $C_3$-SAGD did not show any improvement over SAGD due to substantially low chamber-edge temperatures. A hypothesis that can be derived from mechanistic simulation results is that the solvent's solubility in water makes DME-SAGD substantially different from solvent-SAGD with conventional hydrocarbon solvents through its impact on chamber-edge temperature and compositional distribution in the reservoir. Detailed investigation of how and why they are different might lead to new findings toward an efficient alternative method of bitumen recovery.

Firstly, the condensation temperature for a bitumen/solvent/water mixture at a given operating pressure was shown to increase for a water-soluble solvent. It was confirmed in thermodynamic modeling and reservoir simulations that DME-SAGD results in higher chamber-edge temperatures than $C_4$-SAGD, although DME is more volatile than $C_4$. The difference in chamber-edge temperature was approximately 30 K at the operating pressure of 35 bars.

Secondly, the in-situ distribution of DME in DME-SAGD was observed to be substantially different from that of $C_4$ in $C_4$-SAGD. The solubility of DME in bitumen was nearly a half of that of $C_4$ at their corresponding chamber-edge conditions at the operating pressure of 35 bars. In DME-SAGD simulations, however, approximately 50 mol % of the in-situ DME was used for dilution of bitumen, which was equivalent to the fraction of the in-situ $C_4$ used for bitumen dilution in $C_4$-SAGD. This occurred likely because the partitioning of DME into bitumen and water reduced the gravity segregation of the two-liquid-phase flow along the edge of a steam chamber in DME-SAGD. The reduced gravity segregation in DME-SAGD was simulated to facilitate the mixing of condensed DME with bitumen beyond the edge of a steam chamber. This was in contrast to $C_4$-SAGD, in which the L phase diluted by a substantial amount of $C_4$ was much less dense than the W phase, impeding the contact between the $C_4$ bank and bitumen along the edge of a steam chamber.

Thirdly, simulation results showed that the vapor fraction of the in-situ solvent was much smaller in DME-SAGD than in $C_4$-SAGD. Also, the injected DME was recovered not only by the L phase, but also by the W phase in DME-SAGD because DME's solubility in the W phase was properly modeled. Therefore, the recovery factor of solvent was simulated to be higher (by approximately 15%) in DME-SAGD than in $C_4$-SAGD.

In the absence of relevant data, however, the viscosity model used for the oleic (L) phase containing DME was uncertain in the previously described mechanistic simulation study. Thus, another objective of this Example is to quantify the dilution capability of DME in comparison with that of n-hexane ($C_6$) on the basis of experimental data for the same Athabasca bitumen sample. n-hexane or $C_6$ is used for the comparison because it has been reported to be one of the most effective solvents for solvent-SAGD for Athabasca bitumen reservoirs.

Sections below present the materials and experimental procedure for phase behavior of DME/bitumen and n-hexane/bitumen mixtures. Following this, new data for bubble-point pressures, densities, and viscosities for DME/bitumen and n-hexane/bitumen mixtures are described. A modified Arrhenius equation is used to match the new viscosity data. Then, the viscosities measured for Athabasca bitumen and n-hexane/bitumen mixtures in this research are compared with relevant data published in the literature. Then, the dilution capabilities of DME and n-hexane are compared in terms of reduction of bitumen viscosity. The inventors believe that this is the first set of data reported for properties of Athabasca-bitumen/DME mixtures.

Materials. Athabasca bitumen sample was provided by a SAGD operator. To reduce the amount of water in the bitumen sample provided, the bitumen sample was dehydrated at 393 K under atmospheric pressure. Then, basic properties of Athabasca bitumen were measured by Exova laboratory (Edmonton, Alberta, Canada). The molecular weight (MW) of the bitumen sample was measured to be 532 g/mol by freezing point depression. Simulated distillation analysis was performed up to 993 K (FIG. 24). The density of bitumen at 335 K and atmospheric pressure was measured to be 0.985 g/ml. SARA analysis gave the following composition: 24.5 wt % saturates, 39.6 wt % aromatics, 19.6 wt % resin I, 1.6 wt % resin II, and 17.8 wt % asphaltenes. Resins I was eluted from the column with methyl ethyl ketone and resins II was then eluted from the column with tetrahydrofuran.

The purity of DME supplied by Praxair was 99.5%. n-hexane ($C_6$) was supplied by Sigma-Aldrich at a purity higher than 99%.

Apparatus and experiment procedure. This section presents the main pieces of equipment and the procedure employed for measurement of bubble points, densities, and viscosities.

Bubble-point measurements. A PVT apparatus was set up to measure bubble points of solvent/bitumen mixtures at temperatures between 354 and 394 K. FIG. 25 presents a schematic diagram for the PVT apparatus. A DBR PVT cell (model: DBR-0150-100-200-200-286-155) was installed in an oven (Blue M, model: DC-1406F). The confining pressure for the PVT cell was controlled by Teledyne ISCO pump (model: 100DX). The PVT cell temperature was measured in ° C. by a calibrated T-type thermocouple. The accuracy of this thermocouple is ±1 K, or ±1° C. The confining pressure was measured in psi by an Ashcroft digital pressure gauge. The accuracy of this pressure gauge is ±2.5 psi, or ±0.17 bar.

Before each measurement, the system was cleaned with hexane and toluene. After cleaning, all lines, valves, and feed accumulators were flushed with dry air. The PVT cell was then vacuumed for six hours at 353 K. Feed accumulators were prepared to store the solvent and bitumen to be injected into the PVT cell. The amount of feed injection was controlled by the ISCO pump. The injection flow rate was set below 8 ml/hr to measure an accurate injection volume. The mass and mole fractions of components were calculated by use of MW and density data from National Institute of Standards and Technology (NIST) for n-hexane, and the literature for DME.

For each mixture, the solvent was injected first into the PVT cell. To measure a precise volume, solvent was injected in the liquid-phase state at room temperature. Because of its high viscosity, bitumen was heated for one day and injected into the PVT cell at 333 K. After the injection of solvent and bitumen, the oven was set to a target temperature (354-394 K), and the magnetic mixer equipped inside the PVT cell was operated to enhance the mixing of components. The PVT-cell pressure was set sufficiently higher than the vapor pressure of the solvent at the temperature, in order to have the mixture as a single liquid phase. The system was left for at least one day while using the magnetic mixer. An equilibrium state of the mixture was confirmed by constant temperature and pressure in the PVT cell and also constant volume in the pump.

Bubble points were measured by the constant mass expansion method, in which the total fluid volumes were recorded at different pressures. The pressure of the mixture was initialized at a high pressure so that it was a single-phase liquid, and then it was decreased by 1.4 bars per hour. While decreasing the pressure, the mixture was stirred by the magnetic mixer to accelerate the equilibration process at a new pressure. After the PVT-cell pressure reached the next target pressure, the magnetic mixer was turned off. The mixture was then kept in static for at least two hours. This period of time was sufficient for a mixture to reach a single-phase equilibrium state. While the system reached an equilibrium state, the pressure was kept constant. Equilibrium was confirmed when the PVT-cell pressure was stable with no volume change. When a mixture formed two equilibrium phases, it took a longer period of time for equilibration. After a vapor phase appeared, pressure was decreased by 0.34-0.69 bars for every 5 hours while the magnetic mixer was on. After the PVT-cell pressure reached a target pressure, the magnetic mixer was turned off, and the mixture was kept in static for at least 10 hours. Equilibrium was confirmed by a stable pressure in the PVT cell and a constant fluid volume.

After one constant mass expansion was completed at a given temperature, the PVT cell was pressurized above the vapor pressure of the solvent. Then, a new temperature was set and left for at least one day to reach a new equilibrium state. The magnetic mixer was kept on during this time. After reaching a new equilibrium state, the same procedure of constant mass expansion was repeated to measure a new bubble point.

The volume changes and the pressure of the PVT cell were recorded at each expansion step. The volume change was also detected through the visual window with the cathetometer. Three bubble point measurements for DME/bitumen mixtures and two bubble point measurements for n-hexane/bitumen mixtures were carried out.

Density and viscosity measurements. A schematic of the system for density and viscosity measurements is shown in FIG. 26. It comprises automated pumps, a mixing accumulator, an in-line density meter, an in-line viscometer, an oven, a back pressure regulator (BPR), and an accumulator for the effluent. The pump (Teledyne ISCO 100DX) pressurizes and maintains the pressure of the system automatically by de-ionized water. A mixing accumulator was used as an equilibrium cell, where the fluid sample is prepared homogeneously. The capacity of the mixing accumulator is 1,290 mL.

In the density measuring cell (Anton Paar), the density of fluid is measured in a U-shaped tube, in the range from 0 to 3,000 kg/m$^3$. The accuracy of the density meter is ±1 kg/m$^3$. The pressure and temperature ranges of the density meter are 0 to 100 bars and 263 to 473 K, respectively. For this research, it was calibrated with water and nitrogen for temperatures in the range from 293 to 473 K and pressures from 1.01 to 100 bars. Density values for calibration were taken from NIST. The in-line viscometer (Hydramotion's XL7 series) measures the viscosity of fluid in the range from 0.1 to 10,000 cp. The viscosity accuracy is ±1% of the reading, and the repeatability is ±0.3% of the reading.

Both the viscometer and the density meter were installed inside a Despatch oven (LAC2-18-8). LED screens that display measured data from density meter and viscometer were connected outside the oven. The absolute pressure of the system was measured in bar with a pressure gauge (Omega, PX459-2.5KGI-EH) located between the density meter and viscometer. The pressure of the system was maintained with the BPR installed outside of the oven. The temperature for the density meter was measured in ° C. with an accuracy ±0.1° C.

Before each measurement, the system was cleaned thoroughly with toluene, and dried with air. Cleaning was complete when the density meter and viscometer read the NIST density and viscosity values for toluene at the specific temperature and pressure conditions. Then, the system was vacuumed for at least six hours, and then it was filled with helium at 68.6 bars. The pressure was monitored for one day to ensure that no leakages occurred for the setup. The total fluid volume of the system is 30 ml.

At 296 K and 20.7 bars, mixtures containing bitumen and solvent were prepared at two mixing ratios (in volume): 11.6 vol % of solvent and 88.4 vol % of bitumen, and 19.8 vol % of solvent and 80.2 vol % of bitumen. Mixtures were completely stirred for at least one day. To start an experiment, the mixture was first injected from the mixing accumulator at 5 ml/hr and 68.6 bars to remove the helium of the system. Helium was used to prevent the flash vaporization of the mixture inside the system. Once 30 ml of the sample was injected, the flow rate was change to 50 ml/hr for a total volume of 60 ml. This injection procedure is to remove trapped helium inside the system. Density and viscosity of 100% bitumen, DME /bitumen mixtures, and n-hexane/bitumen mixtures were measured from 323 to 443 K and 15 to 70 bars. Measurements were performed at a fixed temperature by increasing pressure within the closed system inside the oven.

Experimental results and correlations. Bubble points, densities, and viscosities were measured for the bitumen and its mixtures with solvents at a wide range of temperatures and pressures. As summarized in Table 6, nine mixtures were studied for the experiments: five DME/bitumen mixtures (DB-1, -2, -3, -4, and -5) and four n-hexane/bitumen mixtures (FIB-1, -2, -3, and -4). Bubble points were measured for DB-1, DB-2, DB-3, HB-1, and HB-2. Densities and viscosities were measured for DB-4, DB-5, HB-3, and HB-4.

Bubble point data. Table 7 presents the bubble points measured for the three DB mixtures and the two FIB mixtures. One of the observation points was whether liquid-liquid separation occurs for these mixtures, especially for HB-2 because of the high solvent concentration. A mixture of 97.24 mol % n-butane ($C_4$) and 2.76 mol % Athabasca-bitumen was previously observed to exhibit liquid-liquid separation of hydrocarbons for a wide range of temperatures from 323 to 433 K at pressures relevant to solvent-SAGD for Athabasca bitumen reservoirs. Since such liquid-liquid separation is expected to affect bitumen transport beyond the edge of a steam chamber, a later phase behavior study was conducted for n-hexane/Athabasca-bitumen and n-octane ($C_8$)/Athabasca-bitumen mixtures. Liquid-liquid separation was not observed for these mixtures even at high solvent concentrations, such as 97.53 mol % n-hexane and 93.71 mol % n-octane in their mixtures with Athabasca bitumen. Here, liquid-liquid separation was also not observed. Note that the bitumen sample in the current Example is different from that used in previous investigations. For example, the MW of the Athabasca-bitumen sample in previous investigations, 635 g/mol, is approximately 19% higher than the Athabasca-bitumen sample used here.

Results indicate that bubble point pressures of HB-1 at 384 K and HB-2 at 379 K were measured above the vapor pressures of 100% n-hexane at the corresponding temperatures taken from NIST. This is likely because the bitumen contained a small amount of water even after the dehydration by heating. By use of the Peng-Robinson equation of state, it was determined that the bitumen had contained 0.07 wt % (2.0 mol %) water. Previous investigations also observed that bubble-point pressures for n-hexane/bitumen mixtures were higher than 100% n-hexane for their Athabasca bitumen sample, for which the water content was measured to be 0.245 wt % by Exova Lab (Edmonton, Alberta, Canada). Table 8 shows the detailed concentrations of components for all samples studied in this Example, on the basis of the calculated water content in the bitumen.

Density and viscosity data. Densities of the Athabasca bitumen were measured at temperatures from 316 to 451 K and pressures from 1.6 to 100 bars (Table 9 and FIG. 27). FIG. 27 shows that bitumen density decreases with increasing temperature and with decreasing pressure. For example, the density of bitumen at 28 bars was approximately 997 kg/m$^3$ at 316 K, but decreased to approximately 913 kg/m$^3$ at 451 K. Viscosities of the same bitumen were measured at temperatures from 328 to 443 K and pressures from 1.7 to 100 bars (Table 10 and FIG. 28). As expected, the bitumen viscosity is sensitive to temperature. The bitumen viscosity at 28 bars was measured to decrease from approximately 2,479 cp at 328 K to 3.5 cp at 443 K.

For bitumen mixtures with DME and n-hexane, density and viscosity measurements were conducted for DB-4, DB-5, HB-3, and HB-4 (Table 6). The solvent/bitumen mixing ratio was set to be 19.8 vol % solvent and 80.2 vol % bitumen for DB-4 and HB-3, and 11.6 vol % solvent/88.4 vol % bitumen for DB-5 and HB-4. With these four mixtures, comparison of measured viscosities for DME and n-hexane can be made at the same mixing ratios in mole and volume; i.e., DB-5 and HB-3 at 50 mol % dilution, DB-4 and HB-3 at 19.8 vol % dilution, and DB-5 and HB-4 at 11.6 vol % dilution. The measured densities and viscosities are tabulated as follows: Table 11 for DB-4, Table 12 for DB-5, Table 13 for HB-3, and Table 14 for HB-4.

At the equimolar condition (50 mol % solvent and 50 mol % bitumen), the viscosity of n-hexane/bitumen was lower than that of DME/bitumen at the same pressure and temperature. However, the viscosity of the two mixtures became closer at higher temperatures. For example, comparison of DB-5 and HB-3 at 60 bar (Tables 12 and 13) indicates that the viscosity of DME/bitumen was 30 cp higher at 328 K, but only 1.2 cp higher at 382 K (FIG. 29). Detailed analysis of the viscosities measured for the bitumen and solvent/bitumen mixtures is presented below after introducing correlations for densities and viscosities.

Correlations for density and viscosity of solvent/bitumen mixtures. The density data measured for the bitumen in this research have been correlated with the following equation:

$$\rho_{bit} = \rho_{bit}^0 \exp(\alpha P) \quad (1)$$

$$\rho_0 = a_1 + a_2 T + a_3 T^2 \quad (2)$$

$$\alpha = a_4 \exp(a_5 T) \quad (3)$$

where $\rho_{bit}$ is bitumen density in kg/m³ and P is pressure in MPa, and T is temperature in ° C. Five parameters $a_1$ to $a_5$ are adjusted to match the experimental data in this Example. The resulting AAD and AARD are 0.75 kg/m³ and 0.08%, respectively, with $a_1=1022.11$, $a_2=-0.61$, $a_3=0$, $a_4=3.53\times10^{-4}$ and $a_5=3.30\times10^{-4}$.

The viscosity data measured for the bitumen in this Example are correlated by use of the following correlation:

$$\ln(\mu_{bit}) = \exp(b_1 + b_2 \ln(T+273.15)) + b_3 P_g \quad (4)$$

where T is temperature in ° C. and $P_g$ is gauge pressure in MPa. The resulting AAD and AARD are 32.7 cp and 18.3%, respectively, with $b_1=33.33463$, $b_2=-5.40032$ and $b_3=0.023782$.

The viscosity data for the two mixtures, bitumen/DME and bitumen/n-hexane, are correlated with two equations: Arrhenius (Arrhenius, 1887) and the modified Arrhenius equation used in a commercial reservoir simulator, CMG STARS (Computer Modelling Group 2014). To do so requires viscosity correlations for DME and n-hexane.

The following correlation for saturated-liquid DME is useful:

$$\log_{10}\mu_{DME} = -5.7282 + \frac{631.031}{T} + 0.01453T - 1.8225\times10^{-5}T^2 \quad (5)$$

where μ is DME's viscosity in cp, and T is temperature in K. This correlation gave 0.5% AARD from experimental data measured from 227 K to 343 K. Viscosities of n-hexane are taken from NIST, in which n-hexane's viscosities are calculated by use of a correlation.

The original Arrhenius equation (Arrhenius, 1887) based on kinetic theory is $$\ln \mu_{mix} = \sum_{i=1}^{Nc} x_i \ln \mu_i \quad (6)$$

where $\mu_{mix}$ is the viscosity of a mixture, $\mu_i$ is the viscosity of component i, and $x_i$ is the mole fraction of component i. The modified Arrhenius model used in this Example is:

$$\ln \mu_L = \sum_{i=1}^{Nc} q_i x_{iL} \ln \mu_{iL} \quad (7)$$

subject to $$\sum_{i=1}^{Nc} q_i x_{iL} = 1.0 \quad (8)$$

where $\mu_{iL}$ and $x_{iL}$ are the viscosity and mole fraction of component i in the oleic (L) phase, respectively. $q_i$ is weighting factor for component i. Weighting factors for components except for bitumen are set to be equal, subject to equation 8.

For mixtures of bitumen/solvent/water, the following equation has been used for the weighting factor $q_{CD}$ for the dead bitumen component ($C_D$):

$$q_{CD} = 1 + \alpha \left\{ \frac{(1-x_{CDL})[1-(1-x_{CDL})^8]}{x_{CDL}} \right\} \quad (9)$$

where α is a constant specific to the solvent in the mixture of interest. This equation was used to account for the difference between the two binaries, bitumen/water and bitumen/solvent, in terms of the viscosity mixing rules. In this Example, the α parameters for DME and n-hexane have been determined by matching the viscosity data as follows: 0.291019 for DME and 0.038110 for n-hexane.

The α parameter tends to increase from zero as the solvent mixed with bitumen becomes lighter according to optimized α values on the basis of published data for bitumen/solvent mixtures. The modified Arrhenius equation (equation 7) reduces to the original Arrhenius (equation 6), which is the log-linear mixing rule, when α is set to zero ($q_i=1.0$ for all i).

FIG. 30A and FIG. 30B compare the viscosities calculated for DB-5 and HB-3 at 60 bars by use of the two equations with the corresponding experimental data. The original Arrhenius equation reasonably correlates the data for HB-3 (FIG. 30A). With the small value of α, 0.038110, optimized for n-hexane/bitumen mixtures, the modified Arrhenius equation is only slightly more accurate. However, FIG. 30B clearly shows that accurate representation of the DB-5 data requires the modified Arrhenius equation.

The original Arrhenius equation gives an AAD of 12.2 cp and an AARD of 27.5% for all data measured for HB-3 and HB-4. For the same set of data, the modified Arrhenius equation gives an AAD of 11.9 cp and an AARD of 25.4%, which is only slightly more accurate than the original equation. For the DB-4 and DB-5 data, the original Arrhenius equation gives an AAD of 10.5 cp and an AARD of 71.5%, but the modified Arrhenius equation shows more accurate results with an AAD of 4.2 cp and an AARD of 22.5%.

Discussion. This section consists of two subsections. In the first subsection, the viscosity data measured for the bitumen and HB-3 and HB-4 are analyzed and compared with the data reported for another Athabasca bitumen sample and its mixtures with n-hexane. In the second subsection, n-hexane and DME are compared in terms of viscosity reduction of the oleic (L) phase by dilution.

Bitumen and n-hexane/bitumen viscosity data. Viscosities of n-hexane/Athabasca-bitumen mixtures have been measured previously using an Athabasca bitumen sample provided by ConocoPhillips. The molecular weight (MW) was 539.2 g/mol, which is close to the MW, 532 g/mol, measured for the Athabasca bitumen sample used in this Example. However, the SARA composition of ConocoPhillips bitumen sample is markedly different from that of the bitumen used in this Example as shown in Table 15. The Athabasca bitumen sample in this Example is richer in saturates and asphaltenes than that used previously. Table 15 also shows the coefficients for equation 4 for the two Athabasca bitumen samples.

FIG. 31 clearly shows that the bitumen studied in this Example is less viscous at all temperatures than the bitumen studied previously. This viscosity difference can be explained by the difference in the SARA composition (Table 15). The effect of saturates, aromatics, resins, and asphaltenes on the viscosity of nearly 200 crude oil samples has been analyzed. Saturates tend to decrease the oil viscosity, but asphaltenes, resins, and aromatics tend to increase it. Furthermore, the influence of asphaltenes on increasing oil viscosity is more significant than that of resins and aromatics, and that the oil viscosity rapidly decreases with increasing concentration of saturates. Although the bitumen used in this Example contains a higher concentration of asphaltenes (17.8 wt % in comparison with 11.13 wt %), the concentration of saturated is twice higher in the bitumen in this research than in the bitumen used in previous investigations (24.5 wt % in comparison with 12.26 wt %). This clear difference in SARA is likely the main reason for the observed difference in FIG. 31.

To validate the experimental viscosity data for the HB-3 and HB-4 mixtures, the power-law model on the mole fraction basis is applied. The model is $$\mu_{mix} = [x_s \mu_s^n + (1-x_s) \mu_{bit}^n]^{1/n} \quad (10)$$

where $\mu_s$ and $\mu_{bit}$ are the viscosity of solvent and bitumen, respectively. $x_s$ is the mole fraction of the solvent in the mixture. Then parameter was determined to be 0.0186 for the mixtures of n-hexane with Athabasca-bitumen of previous investigations. Equation 10 is used with this n value, 0.0186, and the $\mu_B$ from the current Example, and is compared with the new data obtained in this research. FIG. 32A shows that the viscosities for HB-3 are correlated with the power-law correlation, although the bitumens studied previously and in this Example are different from each other (Table 15).

In addition, the modified Arrhenius model with $\alpha$=0.038110 is applied to the experimental data from previous investigations. FIG. 32B shows that the modified Arrhenius model (equation 7) correlates well the viscosity values for the mixtures of n-hexane/Athabasca-bitumen measured previously. This indicates that the mixing behavior of the current bitumen sample with n-hexane is similar to that of the previous bitumen sample with n-hexane.

It is difficult to compare viscosity data from the two investigations directly since the experimental conditions for n-hexane/bitumen mixtures were different. Therefore, the viscosity correlations for n-hexane/bitumen mixtures are compared at the same concentration of solvent and pressure (50 mol % hexane at 35 bars) from 323 through 473 K in FIG. 33. As a consequence of the lower viscosity of the bitumen studied in this Example, the n-hexane/bitumen mixture for this Example is calculated to be systematically lower than that of previous investigations. The trends of viscosity reduction with increasing temperature at this dilution level are quite similar to each other.

Dilution capability of DME and n-hexane. The dilution capabilities of DME and n-hexane are compared in terms of oleic (L)-phase viscosity, by use of the modified Arrhenius equation calibrated with the new data. The comparison is made for the temperature range from 323 K to 473 K, which are deemed relevant to in-situ conditions for the L-phase flow in SAGD and solvent-SAGD.

FIG. 34 shows the L-phase viscosities calculated for the bitumen, and the equimolar mixtures of n-hexane/bitumen and DME/bitumen at 35 bars. Overall, DME/bitumen and n-hexane/bitumen exhibit similar viscosities. The viscosity of the DME/bitumen mixture is approximately 66 cp higher than that of the n-hexane/bitumen mixture at 323 K. However, the difference is calculated to be less than 1 cp at temperatures above 383 K. This trend is calculated also at different pressures.

FIG. 35 shows the L-phase viscosities calculated at 35 bars for 100% bitumen, and n-hexane/bitumen and DME/bitumen mixtures with two different solvent concentrations, 30 mol % and 70 mol %. Again, the overall effect of DME on bitumen dilution is close to that of n-hexane.

The experimental results and viscosity correlations indicate that DME/bitumen and n-hexane/bitumen give similar L-phase viscosities even though DME is less viscous than n-hexane. This does not exactly follow the original Arrhenius equation, with which the viscosity of a bitumen/solvent mixture with a less viscous solvent be lower than that of a mixture with a more viscous solvent at the same concentration. However, previous data and the new data in this Example indicate that the solvent/bitumen viscosity does not necessarily follow the trend indicated by the original Arrhenius equation.

For mixtures of bitumen with n-alkane solvents, the classical mixing rule of Arrhenius seems to be not entirely consistent. The viscosity of a bitumen sample from Western Canada was measured when mixed with a series of n-alkanes: ethane, propane, butane, pentane, and heptane. The experimental data were given by use of mass fractions, and the concentrations of solvent were converted into the mole fractions with the assumed MW of 500 g/mol for the bitumen sample. It was found that, under the same mole fraction of solvent, the heptane ($C_7$)/bitumen mixture was less viscous than the mixtures of the bitumen with ethane ($C_2$) and propane ($C_3$), as presented in FIG. 36A. Furthermore, a similar observation can be made by use of the power-law models. That is, the viscosity of n-tetradecane ($C_{14}$)/bitumen is calculated to be slightly lower than that of n-decane($C_{10}$)/bitumen, as presented in FIG. 36B.

To further investigate the dilution capability of DME in comparison with n-alkane solvents, the modified Arrhenius equation has been calibrated with the viscosity data measured previously for mixtures of Athabasca bitumen with propane ($C_3$) and n-butane ($C_4$). The bitumen sample used for these measurements is the same as that in the previously described investigation for n-hexane. Liquid viscosities of propane and butane were estimated from saturated liquid viscosity reported in NIST. For supercritical temperatures, Arrhenius' model for a single component was used in the following form to perform the extrapolation:

$$\mu_{solvent} = A \exp\left(\frac{B}{T}\right) \quad (11)$$

where A and B are two fitting parameters obtained from regression on NIST saturated-liquid viscosities. Viscosity and temperature are in cp and ° C. A and B for $C_3$ are 0.131742 and 0.012416, and those for $C_4$ are 0.214695 and 0.010956. Then, the a value for the modified Arrhenius equation is 0.360 for $C_3$ and 0.376 for $C_4$. The resulting modified Arrhenius correlation gives AARD of 54.4% and 17.4% for $C_3$/bitumen and $C_4$/bitumen, respectively.

Now, the viscosities of mixtures of the bitumen studied in this Example with $C_3$, $C_4$, $C_6$ and DME are calculated by use of equation 7 along with the obtained a values. FIG. 37 presents the viscosity trends calculated at the solvent concentration of 50 mol % at 35 bars. The results show that the dilution of the bitumen is most significant with $C_6$. The other solvents are similar in terms of the capability of viscosity reduction at the 50 mol % dilution level.

As described above, a less-viscous solvent does not necessarily yield a lower viscosity when it is mixed with bitumen at a given molar concentration. Another point of discussion regarding DME is that the hydrogen bonding that can occur between DME and various components in the bitumen sample may cause the viscosity of the DME/bitumen mixture to increase.

Hansen (1967) considered that the total energy holding liquid mixture together consists of the energy associated with dispersion, polarity, and hydrogen bonding, $$\delta^2 = \delta_d^2 + \delta_p^2 + \delta_h^2 \quad (12)$$

where $\delta$ is the energy density with a unit of 1/MPa. Subscripts d, p and h represent the contributions of dispersion, polarity and hydrogen bonding, respectively. Hansen's theory has been used to show the tendency of solvent interaction with polymers. A study was conducted of how intermolecular forces affect solvent's capability of diluting heavy oil based on Hansen's dimensional solubility parameters. The conclusion reached was that a good solvent should have a high polarity parameter and a low hydrogen-bonding parameter. In addition, $\delta_p$ and $\delta_h$ values for commonly seen solvents were identified. Alkanes have $\delta_p$ and $\delta_h$ of zero. Ether generally has a $\delta_p$ value from 3 to 5, and $\delta_h$ from 7 to 8. Methanol, which was reported to increase the viscosity of bitumen, has $\delta_p$=12 and $\delta_h$=22. In comparison, water has a $\delta_p$=16 and $\delta_h$=42.

Results in this Example show that the DME/bitumen mixture is slightly more viscous than the n-hexane/bitumen mixture at the same concentration and temperatures below 380 K. This may be attributed to stronger intermolecular forces between DME and polar components in bitumen than those between n-hexane and bitumen. Complex compounds typically contained in bitumen include asphaltenes, which may form hydrogen bonds with DME molecules. At higher temperatures, the effect of hydrogen bonding on viscosity can be reduced, which might improve the capability of DME for viscosity reduction. This is in line with the observation that DME gives a similar level of viscosity reduction to n-hexane at higher temperatures (above 380 K). In contrast, no hydrogen bonding occurs between bitumen components and alkane solvents. Therefore, alkanes may perform well even at low temperatures based on the theory of Hansen (1967).

A good example for the effect of hydrogen bonding for mixtures of methanol and a heavy oil is shown in FIG. 38. Viscosities of methanol/heavy-oil mixtures were measured to be clearly higher than the viscosity of 100% heavy oil. This viscosity increase was attributed to methanol's self-association and the cross-association between methanol and asphaltene molecules. The viscosities for their n-heptane- and methanol-heavy oil mixtures were calculated from reported kinematic viscosities and densities for this FIGURE.

Conclusions. In this Example, the capability of DME as diluent for Athabasca bitumen is compared with that of n-hexane by use of measured viscosities and correlations. New experimental data is presented for phase behavior of Athabasca bitumen, five mixtures of Athabasca bitumen with DME, and four mixtures of Athabasca bitumen with n-hexane. Conclusions are as follows.

Liquid-liquid separation of solvent/bitumen mixtures, which occurred for n-butane/Athabasca-bitumen, was not observed for any of the DME/bitumen and n-hexane/bitumen mixtures in this Example. The highest solvent concentration in this study was 80 mol % DME (DB-1) for the DME/bitumen system and 92 mol % n-hexane (HB-2) for the n-hexane/bitumen system.

The Athabasca bitumen studied in this Example was measured to be less viscous than the Athabasca bitumen studied previously. Although the two bitumens are similar in terms of molecular weight, the concentration of saturates in the bitumen studied in this Example is twice higher than that of the other bitumen. This likely explains the lower viscosity of the bitumen studied in this Example.

The original Arrhenius equation gives underestimated viscosities for the DME/bitumen mixtures. The modified Arrhenius equation with a weighting factor, $q_i$, as a function of a is able to capture the deviation of solvent/bitumen from the original Arrhenius (log-linear mixing) rule. The modified Arrhenius equation correlated well the viscosity data for the Athabasca bitumen diluted by n-hexane and DME. The relatively large $\alpha$ value, 0.291019, for DME/bitumen mixtures in comparison with a of 0.038110 for n-hexane/bitumen mixtures indicates that the viscosity of DME/bitumen mixtures deviates more from the log-linear mixing rule.

The new experimental data and previous data indicate that the viscosity of n-alkanes/bitumen mixtures does not follow the trend given by the classical Arrhenius mixing rule. That is, heavier solvent can give lower viscosity than lighter solvent when they are mixed with the same bitumen at a given pressure, temperature, and molar concentration. The modified Arrhenius equation can capture this trend using the weighting factor, $q_i$, as a function of $\alpha$. However, this is merely one of many other possible modifications to the mixing rule.

The new experimental results show that the equimolar mixture of DME with Athabasca bitumen was 79 cp, and that of n-hexane with the same bitumen was 49 cp at 328 K and 60 bars. However, the two solvents were equivalent as diluent at temperatures above 380 K for the bitumen studied. The new experimental data and viscosity correlations indicate that the dilution capability of DME becomes similar to n-hexane at higher temperature and higher solvent concentration conditions.

Nomenclature for Example 2

Roman Symbols
A=coefficient in equation 11
$a_1$=coefficient in equation 2
$a_2$=coefficient in equation 2
$a_3$=coefficient in equation 2
$a_4$=coefficient in equation 3
$a_5$=coefficient in equation 3
B=coefficient in equation 11
$b_1$=coefficient in equation 4
$b_2$=coefficient in equation 4
$b_3$=coefficient in equation 4
L=oleic phase
P=pressure
q=weighting factor for L-phase viscosity
T=temperature
W=aqueous phase
x=mole fraction
Greek Symbols
$\alpha$=coefficient in equation 9
$\mu$=viscosity, cp (=mPa·s)
$\rho$=density, kg/m$^3$
$\delta$=energy density, 1/MPa Subscripts
bit=bitumen
CD=dead bitumen
d=dispersion
h=hydrogen bonding
L=oleic phase
p=polarity
s=solvent
Abbreviations
AAD=average absolute deviation
AARD=average absolute relative deviation
API=American petroleum institute
CSOR=cumulative steam-to-oil ratio
DME=dimethyl ether
EOS=equation of state
ES-SAGD=expanding-solvent-SAGD
LASER=liquid-addition-to-steam-for-enhanced-recovery
MW=molecular weight, g/mol
SAGD=steam-assisted gravity drainage
SAP=solvent-aided-process
SARA=saturates, asphaltenes, resins and aromatics
SOR=steam-oil ratio

TABLE 6

Compositions of the DME/bitumen and n-hexane/bitumen mixtures studied in this research. DB stands for DME/bitumen mixtures and HB stands for n-hexane/bitumen mixtures.

| Mixture | DME [mol %] | Bitumen [mol %] | Mixture | n-Hexane [mol %] | Bitumen [mol %] |
|---|---|---|---|---|---|
| DB-1 | 80.0 | 20.0 | HB-1 | 80.0 | 20.0 |
| DB-2 | 47.0 | 53.0 | HB-2 | 92.0 | 8.0 |
| DB-3 | 20.0 | 80.0 | HB-3 | 50.0 | 50.0 |
| DB-4 | 65.4 | 34.6 | HB-4 | 34.6 | 65.4 |
| DB-5 | 50.0 | 50.0 | | | |

TABLE 7

Bubble point pressures. For DME/bitumen mixtures, bubble points were measured at 354, 366 and 394 K. For n-hexane/bitumen mixtures, bubble points were measured at 379, 384 and 394 K.

| Mixture | Temperature [K] | Bubble-Point Pressure [bara] | Mixture | Temperature [K] | Bubble-Point Pressure [bara] |
|---|---|---|---|---|---|
| DB-1 | 354.05 | 19.58 | HB-1 | 383.85 | 3.52 |
|  | 365.75 | 27.17 |  | 394.45 | 3.79 |
|  | 394.45 | 41.99 | HB-2 | 378.55 | 3.59 |
| DB-2 | 354.15 | 10.96 |  | 393.95 | 4.07 |
|  | 365.05 | 13.79 | | | |
|  | 392.65 | 19.24 | | | |
| DB-3 | 354.05 | 4.96 | | | |
|  | 365.75 | 6.62 | | | |
|  | 394.35 | 8.55 | | | |

TABLE 8

The compositions corrected for the water content in the bitumen sample. The Peng-Robinson EOS indicated that 2 mol % of water was present in the bitumen on basis of bubble points for n-hexane/bitumen mixtures.

| | Bitumen [mol %] | DB-1 [mol %] | DB-2 [mol %] | DB-3 [mol %] | DB-4 [mol %] | DB-5 [mol %] | HB-1 [mol %] | HB-2 [mol %] | HB-3 [mol %] | HB-4 [mol %] |
|---|---|---|---|---|---|---|---|---|---|---|
| DME | — | 80.0 | 47.0 | 20.0 | 65.4 | 50.0 | — | — | — | — |
| n-C6 | — | — | — | — | — | — | 80.0 | 92.0 | 50.0 | 34.6 |
| Water | 2.0 | 0.4 | 1.06 | 1.6 | 0.7 | 1.0 | 0.4 | 0.16 | 1.0 | 1.3 |
| Bitumen | 98.0 | 19.6 | 51.94 | 78.4 | 33.9 | 49.0 | 19.6 | 7.84 | 49.0 | 64.1 |

TABLE 9

Experimental results for the bitumen density. Densities were measured at the temperature range from 316 to 451 K and the pressure range from 1.6 to 100 bars.

| Temperature: 316.25 K | | Temperature: 328.75 K | | Temperature: 353.45 K | |
|---|---|---|---|---|---|
| Pressure [bar] | Density [kg/m$^3$] | Pressure [bar] | Density [kg/m$^3$] | Pressure [bar] | Density [kg/m$^3$] |
| 1.61 | 995.37 | 1.85 | 987.16 | 1.81 | 971.73 |
| 3.50 | 995.56 | 2.04 | 987.20 | 13.80 | 972.48 |
| 6.89 | 995.69 | 3.57 | 987.27 | 27.68 | 973.29 |
| 10.35 | 995.90 | 6.86 | 987.53 | 41.34 | 974.18 |
| 13.78 | 996.08 | 10.31 | 987.71 | 55.16 | 974.99 |
| 17.26 | 996.28 | 13.74 | 987.84 | 68.97 | 975.84 |
| 20.68 | 996.45 | 17.23 | 987.99 | 82.87 | 976.72 |
| 24.10 | 996.65 | 20.74 | 988.22 | 100.06 | 977.65 |
| 27.59 | 996.79 | 24.15 | 988.45 | | |
| 27.60 | 996.82 | 27.61 | 988.62 | | |
| 31.05 | 996.99 | 31.07 | 988.78 | | |
| 34.44 | 997.20 | 34.46 | 988.97 | | |
| 37.97 | 997.34 | 41.34 | 989.37 | | |
| 41.32 | 997.51 | 48.29 | 989.76 | | |
| 44.88 | 997.68 | 55.25 | 990.16 | | |
| 48.27 | 997.82 | 62.16 | 990.55 | | |
| 51.69 | 998.05 | 69.01 | 990.90 | | |
| 55.15 | 998.19 | 75.88 | 991.25 | | |
| 58.58 | 998.37 | 82.77 | 991.67 | | |
| 62.11 | 998.61 | 89.65 | 991.99 | | |
| 65.48 | 998.72 | 96.55 | 992.41 | | |
| 69.01 | 998.86 | 100.00 | 992.45 | | |
| 72.43 | 999.08 | | | | |
| 75.88 | 999.28 | | | | |
| 79.34 | 999.39 | | | | |
| 82.70 | 999.59 | | | | |
| 86.23 | 999.77 | | | | |
| 89.63 | 999.97 | | | | |
| 93.11 | 1000.13 | | | | |
| 96.59 | 1000.32 | | | | |
| 99.97 | 1000.42 | | | | |

| Temperature: 383.65 K | | Temperature: 418.89 K | | Temperature: 450.90 K | |
|---|---|---|---|---|---|
| Pressure [bar] | Density [kg/m$^3$] | Pressure [bar] | Density [kg/m$^3$] | Pressure [bar] | Density [kg/m$^3$] |
| 1.81 | 952.86 | 1.66 | 930.65 | 1.73 | 910.46 |
| 13.80 | 953.73 | 13.77 | 931.73 | 13.81 | 911.62 |
| 27.68 | 954.75 | 27.72 | 932.92 | 27.63 | 913.01 |
| 41.40 | 955.74 | 41.38 | 933.96 | 41.41 | 914.28 |
| 55.19 | 956.64 | 55.26 | 935.11 | 55.16 | 915.51 |
| 69.01 | 957.54 | 69.05 | 936.23 | 68.99 | 916.71 |
| 82.84 | 958.51 | 83.14 | 937.22 | 82.81 | 917.97 |
| 100.05 | 959.68 | 100.00 | 938.49 | 100.05 | 919.41 |

TABLE 10

Experimental results for the bitumen viscosity. Viscosities were measured at the temperature range from 328 to 443 K and the pressure range from 1.6 to 100 bars.

| Temperature: 327.85 K | | Temperature: 351.55 K | | Temperature: 379.85 K | |
|---|---|---|---|---|---|
| Pressure [bar] | Viscosity [cp] | Pressure [bar] | Viscosity [cp] | Pressure [bar] | Viscosity [cp] |
| 1.72 | 2294.59 | 1.81 | 271.32 | 1.72 | 44.37 |
| 13.80 | 2381.93 | 13.80 | 285.95 | 13.85 | 45.87 |
| 27.65 | 2479.11 | 27.68 | 293.14 | 27.65 | 47.65 |
| 41.37 | 2581.10 | 41.34 | 305.18 | 41.40 | 49.49 |
| 55.15 | 2694.62 | 55.16 | 317.44 | 55.90 | 51.27 |
| 69.99 | 2813.43 | 68.97 | 330.34 | 69.01 | 53.20 |
| 82.87 | 2940.12 | 82.87 | 344.42 | 82.84 | 55.24 |
| 100.00 | 3117.00 | 100.06 | 361.64 | 100.05 | 57.69 |

| Temperature: 413.25 K | | Temperature: 443.15 K | |
|---|---|---|---|
| Pressure [bar] | Viscosity [cp] | Pressure [bar] | Viscosity [cp] |
| 1.66 | 9.26 | 1.73 | 3.34 |
| 13.77 | 9.63 | 13.81 | 3.40 |
| 27.72 | 9.89 | 27.63 | 3.46 |
| 41.38 | 10.21 | 41.41 | 3.55 |
| 55.26 | 10.63 | 55.16 | 3.71 |
| 69.05 | 11.02 | 68.99 | 3.79 |
| 82.93 | 11.32 | 82.81 | 3.90 |
| 100.00 | 11.76 | 100.05 | 4.03 |

TABLE 11

Experimental results for the density and viscosity of DB-4. DB-4 consists of 65.4 mol % DME and 34.6 mol % bitumen, or 19.8 vol % DME and 80.2 vol % bitumen. The density of bitumen and DME at 296 K and 20.68 bars were used to calculate volume fractions.

| Density | | | Viscosity | | |
|---|---|---|---|---|---|
| Temperature [K] | Pressure [bar] | Density [kg/m$^3$] | Temperature [K] | Pressure [bar] | Viscosity [cp] |
| 328.04 | 30.02 | 926.98 | 327.35 | 30.02 | 17.25 |
| | 35.01 | 927.34 | | 35.01 | 19.69 |
| | 40.02 | 927.68 | | 40.02 | 21.06 |
| | 50.00 | 928.43 | | 50.00 | 22.42 |
| | 60.01 | 929.17 | | 60.01 | 23.59 |
| | 70.02 | 929.88 | | 70.02 | 24.64 |
| 354.96 | 30.03 | 906.43 | 353.55 | 30.03 | 4.65 |
| | 34.99 | 906.89 | | 34.99 | 5.34 |
| | 40.01 | 907.31 | | 40.01 | 5.77 |
| | 50.04 | 908.18 | | 50.04 | 6.34 |
| | 60.05 | 908.99 | | 60.05 | 6.67 |
| | 69.99 | 909.86 | | 69.99 | 7.04 |
| 384.10 | 35.01 | 884.49 | 381.75 | 35.01 | 1.88 |
| | 40.03 | 885.00 | | 40.03 | 2.07 |
| | 50.01 | 886.03 | | 50.01 | 2.32 |
| | 59.99 | 887.06 | | 59.99 | 2.46 |
| | 70.02 | 888.02 | | 70.02 | 2.64 |
| 417.68 | 50.03 | 859.81 | 414.25 | 50.03 | 1.00 |
| | 60.04 | 861.00 | | 60.04 | 1.11 |
| | 70.00 | 862.21 | | 70.00 | 1.18 |

TABLE 12

Experimental results for the density and Viscosity of DB-5. DB-5 consists of 50 mol % DME and 50 mol % bitumen, or 11.6 vol % DME and 88.4 vol % bitumen. The density of bitumen and DME at 296 K and 20.68 bars were used to calculate volume fractions.

| Density | | | Viscosity | | |
|---|---|---|---|---|---|
| Temperature [K] | Pressure [bar] | Density [kg/m$^3$] | Temperature [K] | Pressure [bar] | Viscosity [cp] |
| 325.00 | 20.05 | 947.53 | 328.05 | 20.05 | 38.17 |
| | 25.03 | 948.11 | | 25.03 | 36.69 |
| | 35.07 | 948.82 | | 35.07 | 36.69 |
| | 40.02 | 949.13 | | 40.02 | 48.09 |
| | 50.00 | 949.76 | | 60.01 | 78.99 |
| | 60.02 | 950.45 | | 70.10 | 87.52 |
| | 70.10 | 951.11 | 354.75 | 30.00 | 10.94 |
| 354.75 | 30.00 | 929.82 | | 34.99 | 10.41 |
| | 34.99 | 930.14 | | 40.00 | 11.16 |
| | 40.01 | 930.50 | | 50.00 | 14.20 |
| | 50.00 | 931.31 | | 60.00 | 17.81 |
| | 60.00 | 932.07 | | 70.12 | 21.21 |
| | 70.12 | 932.89 | 382.05 | 30.06 | 3.84 |
| 383.98 | 30.06 | 908.82 | | 35.04 | 3.68 |
| | 35.04 | 909.29 | | 40.02 | 3.50 |
| | 40.02 | 909.72 | | 50.02 | 5.45 |
| | 50.02 | 910.58 | | 60.01 | 4.68 |
| | 60.01 | 911.48 | | 70.10 | 5.64 |
| | 70.01 | 912.36 | 414.35 | 40.02 | 1.93 |
| 417.09 | 40.02 | 885.93 | | 50.03 | 1.86 |
| | 50.03 | 887.03 | | 60.05 | 1.62 |
| | 60.05 | 888.07 | | 70.02 | 1.85 |
| | 70.02 | 889.06 | 442.95 | 50.03 | 1.59 |
| 446.04 | 50.11 | 865.43 | | 70.05 | 0.87 |
| | 60.00 | 866.71 | | | |
| | 70.05 | 867.96 | | | |

TABLE 13

Experimental results for the density and viscosity of
HB-3. HB-3 consists of 50 mol % n-hexane and 50 mol %
bitumen, or 19.8 vol % n-hexane and 80.2 vol % bitumen.
The density of bitumen and n-hexane at 296 K and 20.68
bars were used to calculate volume fractions.

| Density | | | Viscosity | | |
|---|---|---|---|---|---|
| Temperature [K] | Pressure [bar] | Density [kg/m³] | Temperature [K] | Pressure [bar] | Viscosity [cp] |
| 328.00 | 15.01 | 919.45 | 327.35 | 15.01 | 22.37 |
|  | 34.99 | 920.81 |  | 34.99 | 30.58 |
|  | 60.00 | 922.44 |  | 60.00 | 49.02 |
| 354.15 | 15.00 | 901.58 | 352.85 | 15.01 | 5.99 |
|  | 35.00 | 903.11 |  | 34.99 | 7.40 |
|  | 59.97 | 904.94 |  | 60.00 | 11.75 |
| 383.32 | 15.03 | 881.58 | 381.45 | 15.01 | 2.36 |
|  | 34.99 | 883.28 |  | 34.99 | 2.49 |
|  | 54.99 | 885.47 |  | 60.00 | 3.53 |
| 416.80 | 15.01 | 858.15 | 414.05 | 15.01 | 1.20 |
|  | 35.01 | 860.32 |  | 35.01 | 1.22 |
|  | 59.99 | 862.86 |  | 59.99 | 1.26 |
| 445.83 | 15.05 | 837.53 | 442.65 | 15.00 | 0.96 |
|  | 35.02 | 840.03 |  | 34.99 | 0.98 |
|  | 59.99 | 842.99 |  | 59.99 | 0.69 |

TABLE 14

Experimental results for the density and viscosity of HB-4. HB-4
consists of 34.6 mol % n-hexane and 65.4 mol % bitumen, or 11.6 vol %
n-hexane and 88.4 vol % bitumen. The density of bitumen and n-hexane
at 296 K and 20.68 bars were used to calculate volume fractions.

| Density | | | Viscosity | | |
|---|---|---|---|---|---|
| Temperature [K] | Pressure [bar] | Density [kg/m³] | Temperature [K] | Pressure [bar] | Viscosity [cp] |
| 328.38 | 14.72 | 947.93 | 327.35 | 15.01 | 80.48 |
|  | 34.96 | 949.21 |  | 34.99 | 223.40 |
|  | 59.98 | 950.70 |  | 60.00 | 245.60 |
| 355.23 | 15.00 | 929.75 | 353.95 | 15.01 | 14.01 |
|  | 35.00 | 931.17 |  | 34.99 | 31.09 |
|  | 60.08 | 933.02 |  | 60.00 | 45.23 |
| 383.93 | 15.00 | 910.85 | 381.65 | 15.01 | 3.98 |
|  | 35.04 | 912.52 |  | 34.99 | 6.99 |
|  | 60.11 | 914.45 |  | 60.00 | 11.11 |
| 417.69 | 15.00 | 888.33 | 414.45 | 15.00 | 1.57 |
|  | 34.99 | 890.23 |  | 35.04 | 1.91 |
|  | 60.01 | 892.54 |  | 60.01 | 3.17 |
| 446.56 | 15.02 | 868.38 | 442.95 | 15.02 | 1.07 |
|  | 34.96 | 870.61 |  | 60.16 | 1.40 |
|  | 60.16 | 873.28 |  |  |  |

TABLE 15

Properties of bitumen in this research and bitumen used in
Nourozieh et al. (2015). The two bitumen samples are similar
in terms of molecular weight, but markedly different in terms
of SARA composition. The viscosity model developed by Mehrotra
and Svrcek (1986) shows good agreement with both bitumens with
different values for parameters, b1, b2 and b3.

|  |  | Bitumen (this Example) | Bitumen (Nourozieh et al., 2015) |
|---|---|---|---|
| MW [g/mol] |  | 532 | 539.2 |
| SARA [wt %] | Saturates | 24.5 | 12.26 |
|  | Aromatics | 36.6 | 40.08 |
|  | Resins | 21.2 | 36.53 |
|  | Asphaltenes | 17.8 | 11.13 |

TABLE 15-continued

Properties of bitumen in this research and bitumen used in
Nourozieh et al. (2015). The two bitumen samples are similar
in terms of molecular weight, but markedly different in terms
of SARA composition. The viscosity model developed by Mehrotra
and Svrcek (1986) shows good agreement with both bitumens with
different values for parameters, b1, b2 and b3.

|  |  | Bitumen (this Example) | Bitumen (Nourozieh et al., 2015) |
|---|---|---|---|
| Bitumen viscosity model (Mehrotra and Svrcek, 1986) | b1 | 33.33463 | 26.65193 |
|  | b2 | −5.40032 | −4.04208 |
|  | b3 | 0.023782 | 0.031101 |

Description of Figures Referenced in this Example.

FIG. 24 provides a plot showing simulated distillation results for the Athabasca bitumen sample studied in this research. The initial boiling point is defined as the temperature corresponding to 0.5% of the total mass recovered. The maximum boiling point reported with this method is 993 K.

FIG. 25 provides a schematic illustration of an experimental set up for bubble point measurements.

FIG. 26 provides a schematic illustration of an experimental set up for density and viscosity measurements.

FIG. 27 provides experimental results for bitumen density. Densities were measured at the temperature range from 316 to 451 K and the pressure range from 1.6 to 100 bars.

FIG. 28 provides experimental results for bitumen viscosity. Viscosities were measured at the temperature range from 328 to 443 K and the pressure range from 1.6 to 100 bars.

FIG. 29 provides experimental results for equimolar mixture of solvent and bitumen, DB-5 and HB-3, at 60 bars. The viscosity of the DME/bitumen and n-hexane ($C_6$)/bitumen mixtures becomes similar with increasing temperature. See Tables 12 and 13 for the viscosity data.

FIG. 30A and FIG. 30B provide plots showing correlations by use of the original and modified Arrhenius equations are compared with the experimental data (50 mol % solvent/50 mol % bitumen) at 60 bars. FIG. 30A: n-hexane ($C_6$) 50 mol %/bitumen 50 mol % (HB-3) at 60 bar. FIG. 30B: DME 50 mol %/bitumen 50 mol % (DB-5) at 60 bar. The original Arrhenius equation shows good agreement with the n-hexane ($C_6$)/bitumen mixture, but it is inaccurate for the DME/bitumen mixture. The modified Arrhenius equation is in good agreement with both mixtures.

FIG. 31 provides data showing viscosity for bitumen in this Example and bitumen from Nourozieh et al. (2015). Δ: Experimental data for the bitumen viscosity taken from Nourozieh et al. at 40 bars; x: Experimental data for the bitumen viscosity in this Example;—: Mehrotra and Svrcek (1986) correlation (equation 4) for the bitumen of Nourozieh et al.;—: Mehrotra and Svrcek (1986) correlation (equation 4) for the bitumen studied in this Example. Parameters of Mehrotra and Svrcek (1986) correlation for two bitumens are tabulated in Table 15.

FIG. 32A and FIG. 32B provide plots showing a cross-check of power law model and modified Arrhenius model to correlate experimental data. FIG. 32A Bitumen (in this research): 50 mol % n-hexane ($C_6$)/50 mol % bitumen (HB-3) at 35 bars. FIG. 32B Bitumen (Nourozieh et al. 2015): 24.8 mol % n-hexane ($C_6$)/75.2 mol % bitumen at 41 bars. The parameter (n) of power law is 0.0186 from Nourozieh et al. and the parameter (a) of modified Arrhenius is 0.038110 from this research. It is found that the power law model from Nourozieh et al. fits well the experimental data in this Example. The modified Arrhenius model developed in this Example is in good agreement with other experimental data of Nourozieh et al. with no change of parameter values.

FIG. 33 provides a plot showing viscosity of 50 mol % n-hexane ($C_6$)/50 mol % bitumen at 35 bars. The viscosity was calculated by correlation.—: Power law model from Nourozieh et al.,—: Modified Arrhenius model in this Example.

FIG. 34 provides a plot showing a viscosity comparison for bitumen, the equimolar mixtures of bitumen with DME and bitumen with n-hexane ($C_6$) at 35 bars. The viscosities were calculated by the modified Arrhenius model developed in this Example.

FIG. 35A and FIG. 35B provide plots showing a viscosity comparison for DME/bitumen, n-hexane ($C_6$)/bitumen and bitumen at 35 bars with different concentrations of solvent: 30 mol % and 70 mol %. FIG. 35A: 30 mol % Solvent/70 mol % Bitumen at 35 bars. FIG. 35B: 70 mol % Solvent/30 mol % Bitumen at 35 bars. The viscosities were calculated by the modified Arrhenius model developed in this Example.

FIG. 36A and FIG. 36B provide plots of experimental data and viscosity correlations show that bitumen mixed with heavier solvent results in lower viscosity than that with lighter solvent. FIG. 36A: Experimental data for the viscosity of bitumen with different solvents at 373.15 K. At the same concentration of solvent, n-heptane ($C_7$) gives lower viscosity than ethane ($C_2$) or propane ($C_3$) when it is mixed with the same bitumen (western Canada). FIG. 36B: The viscosities calculated for n-decane ($C_{10}$) and n-tetradecane ($C_{14}$) with Athabasca bitumen at 343.15 K and 40 bars by the power law model. n-tetradecane ($C_{14}$) gives lower viscosity than n-decane ($C_{10}$) when mixed with Athabasca bitumen.

FIG. 37 provides a plot showing comparison between n-alkanes and DME in terms of bitumen dilution at 50 mol % solvent concentration at 35 bars. The viscosities were calculated by the modified Arrhenius model developed in this Example.

FIG. 38. Comparison of viscosities measured for n-heptane ($C_7$)/heavy oil and methanol/heavy oil mixtures at 293.15 K and atmospheric conditions. The heavy oil has an API gravity of 20°. The viscosity is calculated from reported kinematic viscosity assuming the heavy oil's molecular weight is 500 g/mol.

REFERENCES

Alkindi, A., Al-Azri, N., Said, D., AlShuaili, K., to Riele, P. 2016. Persistence in EOR-Design of a Field Trial in a Carbonate Reservoir Using Solvent-based Water-Flood Process. Presented at the SPE EOR Conference at Oil and Gas West Asia, Muscat, Oman, 21-23 Mar. 2016.

Amani, M. J., Gray, M. R. and Shaw, J. M., 2013. Phase behavior of Athabasca bitumen+water mixtures at high temperature and pressure. The Journal of Supercritical Fluids, 77, pp. 142-152.

Amani, M. J., Gray, M. R. and Shaw, J. M., 2013. Volume of mixing and solubility of water in Athabasca bitumen at high temperature and pressure. Fluid Phase Equilibria, 358, pp. 203-211.

American Petroleum Institute, 1983. *API Technical Data Book—Petroleum Refining*, 4$^{th}$ Edition, American Petroleum Institute, New York, USA.

Argillier, J., Henaut, I., Gateau, P., Heraud, J. P. and Glenat, P., 2005. Heavy oil dilution. SPE paper presented at the 2005 SPE International Thermal Operations and Heavy Oil Symposium, Calgary, Alberta, Canada, 1-3 November. SPE/PS-CIM/CHOA 97763.

Arrhenius, S. 1887. Uber die Dissociation der in Wasser Gelosten Stoffe (On the Dissociation of Substances Dissolved in Water). Z. Phys. Chem. 1, 631-648.

Barton, A. F., 1991. CRC handbook of solubility parameters and other cohesion parameters. CRC press.

Blevins, T. R., Aseltine, R. J. and Kirk, R. S., 1969. Analysis of a steam drive project, Inglewood Field, Calif. Journal of Petroleum Technology, 21(09), pp. 1-141.

Blevins, T. R. and Billingsley, R. H., 1975. The Ten-Pattern Steamflood, Kern River Field, Calif. Journal of Petroleum Technology, 27(12), pp. 1-505.

Boshkov, L. Z., 1987. On the description of closed-loop phase-diagrams of 2-component solutions, based on the one-fluid equation of state. DOKLADY AKADEMII NAUK SSSR, 294(4), pp. 901-905.

Brunner, E., 1988. Fluid mixtures at high pressures VI. Phase separation and critical phenomena in 18 (n-alkane+ammonia) and 4 (n-alkane+methanol) mixtures. The Journal of Chemical Thermodynamics, 20(3), pp. 273-297.

Brunner, E., 1990. Fluid mixtures at high pressures IX. Phase separation and critical phenomena in 23 (n-alkane+water) mixtures. The Journal of Chemical Thermodynamics, 22(4), pp. 335-353.

Brunner, E., Thies, M. C. and Schneider, G. M., 2006. Fluid mixtures at high pressures: Phase behavior and critical phenomena for binary mixtures of water with aromatic hydrocarbons. The Journal of supercritical fluids, 39(2), pp. 160-173.

Butler, R. M., 1997. Thermal recovery of oil and bitumen, publ. GravDrain Inc.(2nd printing), Calgary, Alberta, 528 pp.

Chahardowli, M., Farajzadeh, R., Bruining, H. 2016. Experimental Investigation of Dimethyl Ether/Polymer Hybrid as an Enhanced Oil Recovery Method. Presented at the SPE EOR Conference at Oil and Gas West Asia, Muscat, Oman, 21-23 Mar. 2016.

Chapman, W. G., Gubbins, K. E., Joslin, C. G., Gray, C. G. 1986. Theory and Simulation of Associating Liquid Mixtures. *Fluid Phase Equilibria* 29: 337-46.

Chernetsky, A., Masalmeh, S., Eikmans, D., Boerrigter, P. M., Fadili, A., Parsons, C. A., Parker, A., Boersma, D. M., Cui, J., Dindoruk, B. and to Riele, P. M., 2015, November. A Novel Enhanced Oil Recovery Technique: Experimental Results and Modelling Workflow of the DME Enhanced Waterflood Technology. In Abu Dhabi International Petroleum Exhibition and Conference. Society of Petroleum Engineers.

Computer Modelling Group, 2013. STARS version 2013 user's guide. Computer Modelling Group, Calgary, Alberta, Canada.

Computer Modelling Group, 2014. STARS version 2014 user's guide. Computer Modelling Group, Calgary, Alberta, Canada.

Computer Modelling Group, 2013. WINPROP version 2013 user's guide. Computer Modelling Group, Calgary, Alberta, Canada.

Connolly, J. F., 1966. Solubility of Hydrocarbons in Water Near the Critical Solution Temperatures. Journal of Chemical and Engineering data, 11(1), pp. 13-16.

Constantinou, L. and Gani, R., 1994. New group contribution method for estimating properties of pure compounds. AIChE Journal, 40(10), pp. 1697-1710.

Constantinou, L., Gani, R. and O'Connell, J. P., 1995. Estimation of the acentric factor and the liquid molar volume at 298 K using a new group contribution method. Fluid Phase Equilibria, 103(1), pp. 11-22.

Dehaghani, A. H. S. and Badizad, M. H., 2016. Experimental study of Iranian heavy crude oil viscosity reduction by diluting with heptane, methanol, toluene, gas condensate and naphtha. *Petroleum* 2(4), pp. 415-424.

Deiters, U. K. and Kraska, T., 2012. High-Pressure Fluid Phase Equilibria: Phenomenology and Computation (Vol. 2). Elsevier.

Dong, L., 2012. Effect of vapour—liquid phase behaviour of steam-light hydrocarbon systems on steam assisted gravity drainage process for bitumen recovery. Fuel, 95, pp. 159-168.

Folas, G. K., Kontogeorgis, G. M., Michelsen, M. L., Stenby, E. H. 2006. Application of the Cubic-Plus Association Equation of State to Mixtures with Polar Chemicals and High Pressures. *Industrial & Engineering Chemistry Research* 45: 1516-1526.

Folas, G. K., Kontogeorgis, G. M., Michelsen, M. L., Stenby, E. H. 2006. Application of the Cubic-Plus Association (CPA) Equation of State to Complex Mixtures with Aromatic Hydrocarbons. *Industrial & Engineering Chemistry Research* 45: 1527-1538.

Ganjdanesh, R., Rezaveisi, M., Pope, G. A. and Sepehrnoori, K., 2015, September. Treatment of Condensate and Water Blocks in Hydraulic Fractured Shale Gas-Condensate Reservoirs. In SPE Annual Technical Conference and Exhibition. Society of Petroleum Engineers.

Gao, J., Okuno, R. and Li, H. A., 2016, June. An Experimental Study of Multiphase Behavior for n-Butane/Bitumen/Water Mixtures. In SPE Canada Heavy Oil Technical Conference. Society of Petroleum Engineers.

Gao, J., Okuno, R. and Li, H. A. 2017. An Experimental Study of Multiphase Behavior for n-Butane/Bitumen/Water Mixtures. SPE Journal. 22(3): 783-798. SPE-180736-PA.

Gao, J., Okuno, R. and Li, H. A. 2017. A Phase-Behavior Study for n-Hexane/Bitumen and n-Octane/Bitumen Mixtures. *SPE Journal.* Accepted for publication on Mar. 6, 2017. SPE-186097-PA.

Gates, I. D., 2007. Oil phase viscosity behaviour in expanding-solvent steam-assisted gravity drainage. Journal of Petroleum Science and Engineering, 59(1), pp. 123-134.

Gates, I. D., 2007. Oil Phase Viscosity Behavior in Expanding-Solvent Steam-Assisted Gravity Drainage. *Journal of Petroleum Science and Engineering* 59 (1-2): 123-134.

Glandt, C. A. and Chapman, W. G. 1995. The Effect of Water Dissolution on Oil Viscosity. *SPE Reservoir Engineering* 10 (1): 59-64, SPE-24631-PA.

Govind, P. A., Das, S. K., Srinivasan, S. and Wheeler, T. J., 2008, January. Expanding solvent SAGD in heavy oil reservoirs. In International Thermal Operations and Heavy Oil Symposium. Society of Petroleum Engineers.

Groot, J. A. W. M., Eikmans, D., Fadili, A., Romate, J. E. 2016. Field-Scale Modeling and Sensitivity Analysis of DME Enhanced Waterflooding. Presented at SPE EOR Conference at Oil and Gas West Asia, Muscat, Oman, 21-23, Mar. 2016.

Groot, J. A. W. M., Chernetsky, A., to Riele, P. M., Dindoruk, B., Cui, J., Wilson, L. C., Ratnakar, R. 2016. Representation of Phase Behavior and PVT Workflow for DME Enhanced Water-Flooding. Presented at the SPE EOR Conference at Oil and Gas West Asia, Muscat, Oman, 21-23, Mar. 2016.

Gupta, S., Gittins, S., Picherack, P. 2005. Field Implementation of Solvent Aided Process. *Journal of Canadian Petroleum Technology* 44 (11): 8-13.

Gupta, S. C. and Gittins, S. D., 2006. Christina Lake Solvent Aided Process Pilot. Journal of Canadian Petroleum Technology, 45(9), 15-18.

Hansen, C. M., 1967. The three dimensional solubility parameter. Danish Technical: Copenhagen, p. 14.

Harding, T. G., et al. In-situ reflux: an improved in-situ recovery method for oil sands." *SPE Canada Heavy Oil Technical Conference.* Society of Petroleum Engineers, 2016, SPE-180752-MS.

Holldorff, H. and Knapp, H. 1988. Binary Vapor-Liquid-Liquid Equilibrium of Dimethyl Ether—Water and Mutual Solubilities of Methyl Chloride and Water. *Fluid Phase Equilibria* 44: 195-209.

Huron, M. J. and Vidal, J. 1979. New Mixing Rules in Simple Equations of State for Representing Vapour-Liquid Equilibria of Strongly Non-ideal Mixtures, *Fluid Phase Equilibria* 3: 255-271

Ignasiak, B. L., Yamaoka, K., 2010. In-situ recovery of bitumen or heavy oil by injection of di-methyl ether. Canadian Patent Publication CA2652930A1.

Ihmels, E. C. and Lemmon, E. W., 2007. Experimental densities, vapor pressures, and critical point, and a fundamental equation of state for dimethyl ether. Fluid Phase Equilibria, 260(1), pp. 36-48.

Ivory, J., T. Frauenfeld, and C. Jossy. "Thermal solvent reflux and thermal solvent hybrid experiments." *Journal of Canadian Petroleum Technology,* 49.02 (2010): 23-31. SPE-133202-PA Ivory, J. J., Zheng, R., Nasr, T. N., Deng, X., Beaulieu, G., Heck, G. 2008. Investigation of Low Pressure ES-SAGD. Presented at 2008 SPE International Thermal Operations and Heavy Oil Symposium, Calgary, Alberta, Canada, Oct. 20-23, 2008.

Jha, R. K., Kumar, M., Benson, I. and Hanzlik, E., 2013. New insights into steam/solvent-coinjection-process mechanism. SPE Journal, 18(05), pp. 867-877.

Kariznovi, M., Nourozieh. H., Guan. J. and Abedi J. 2013. Measurement and modeling of density and viscosity for mixtures of Athabasca bitumen and heavy n-alkane. *Fuel* 112: 83-95.

Keshavarz, M. and Chen, Z., 2014, October. Modeling Displacement Efficiency Improvement During Solvent Aided-SAGD. In SPE Annual Technical Conference and Exhibition. Society of Petroleum Engineers.

Keshavarz, M., Okuno, R. and Babadagli, T., 2014. Efficient oil displacement near the chamber edge in ES-SAGD. Journal of Petroleum Science and Engineering, 118, pp. 99-113.

Keshavarz, M., Okuno, R. and Babadagli, T., 2015 (a). A semi-analytical solution to optimize single-component solvent coinjection with steam during SAGD. Fuel, 144, pp. 400-414.

Keshavarz, M., Okuno, R. and Babadagli, T., 2015 (b). Optimal Application Conditions for Steam/Solvent Coinjection. SPE Reservoir Evaluation & Engineering, 18(1), pp. 20-38.

Kontogeorgis, G. M., Voutsas, E. C., Yakoumis, I. V., Tassios, D. P. 1996. An Equation of State for Associating Fluids. *Industrial & Engineering Chemistry Research* 35: 4310-4318.

Kumar, A., 2016. Characterization of Reservoir Fluids based on Perturbation from n-Alkanes. ERA thesis of University of Alberta.

Kumar, A. and Okuno, R., 2015, September. A New Algorithm for Multiphase Fluid Characterization for Solvent Injection. In SPE Annual Technical Conference and Exhibition. Society of Petroleum Engineers.

Kumar, A. and Okuno, R., 2016. Reliable characterization of bitumen based on perturbation from n-alkanes for steam-solvent coinjection simulation. Fuel, 182, pp. 141-153.

Leaute, R. P., 2002, January. Liquid addition to steam for enhancing recovery (LASER) of bitumen with CSS: Evolution of technology from research concept to a field pilot at Cold Lake. In SPE International Thermal Operations and Heavy Oil Symposium and International Horizontal Well Technology Conference. Society of Petroleum Engineers.

Leaute, R. P. and Carey, B. S., 2007. Liquid addition to steam for enhancing recovery (LASER) of bitumen with CSS: Results from the first pilot cycle. Journal of Canadian Petroleum Technology, 46(09).

Leaute, R. P., 2002. Liquid Addition to Steam for Enhancing Recovery of Bitumen with CSS: Evolution of Technology from Research Concept to a Field Pilot at Cold Lake. Presented at the SPE/Petroleum Society of CIM/CHOA Paper Number 79011, Calgary, Alberta, Canada, Nov. 4-7, 2002.

Leaute, R. P. and Carey, B. S. 2007. Liquid Addition to Steam for Enhancing Recovery (LASER) of Bitumen with CSS: Results from the First Pilot Cycle. *Journal of Canadian Petroleum Technology* 46 (9): 22-30.

Li, W., Mamora, D. D. and Li, Y., 2011 Solvent-type and-ratio impacts on solvent-aided SAGD process. SPE Reservoir Evaluation & Engineering, 14(3), pp. 320-331.

Li, W., Mamora, D. and Li, Y., 2011. Light-and heavy-solvent impacts on solvent-aided-SAGD process: a low-pressure experimental study. Journal of Canadian Petroleum Technology, 50(04), pp. 19-30.

Malkin, A. Ya., Rodionova, G., Simon, S., Ilyin, S. O., Arinina, M. P., Kulichikhin, V. G. and Sjöblom, J. 2016. Some Compositional Viscosity Correlations for Crude Oils from Russia and Norway. *Energy Fuels* 30: 9322-9328.

Mehrotra, A. K. and Svrcek. W. Y. 1986. Viscosity of compressed Athabasca bitumen. *The Canadian Journal of Chemical Engineering* 64 (5): 844-847.

Michailidou, E. K., Assael, M. J., Huber. M. L. and Perkins. R. A. 2013. Reference Correlation of the Viscosity of n-Hexane from the Triple Point to 600 K and up to 100 MPa, *Journal of Physical and Chemical Reference Data* Vol. 42. No. 3.

Michelsen, M. L. A Modified Huron-Vidal Mixing Rule for Cubic Equations of State. *Fluid Phase Equilibria* 60: 213-219.

Mohebati, M. H., Maini, B. B., and Harding, T. G. 2012. Numerical-Simulation Investigation of the Effect of Heavy-oil Viscosity on the Performance of Hydrocarbon Additives in SAGD. *SPE Reservoir Evaluation & Engineering* 15 (02): 165-181.

Mukhametshina A., et al., "Electromagnetic Heating of Heavy Oil and Bitumen: A Review of Experimental Studies and Field Applications," Journal of Petroleum Engineering, vol. 2013, Article ID 476519, 7 pages, 2013. doi:10.1155/2013/476519

Nasr, T. N. and Ayodele, O. R., 2006, January. New hybrid steam-solvent processes for the recovery of heavy oil and bitumen. In Abu Dhabi International Petroleum Exhibition and Conference. Society of Petroleum Engineers.

Nasr, T. N., Beaulieu, G., Golbeck, H. and Heck, G. 2003. Novel expanding solvent-SAGD process "ES-SAGD". *Journal of Canadian Petroleum Technology* 42 (1): 13-16.

Nghiem, L. X. and Li, Y. K., 1984. Computation of multiphase equilibrium phenomena with an equation of state. Fluid Phase Equilibria, 17(1), pp. 77-95.

Nourozieh, H., Kariznovi, M., Guan, J. and Abedi, J. 2013. Measurement of thermophysical properties and modeling for pseudo-binary mixtures of n-decane and Athabasca bitumen. *Fluid Phase Equilibria* 347: 62-75.

Nourozieh, H., Kariznovi, M. and Abedi, J. 2015. Density and Viscosity of Athabasca Bitumen Samples at Temperatures Up to 200C and Pressures Up to 10 MPa. *SPE Journal*, 18: 375-386. SPE-176026-PA Nourozieh, H., Kariznovi, M. and Abedi, J. 2015. Viscosity measurement and modeling for mixtures of Athabasca bitumen/hexane. *Journal of Petroleum Science and Engineering* 129: 159-167.

Nourozieh, H., Kariznovi, M. and Abedi, J. 2015. Viscosity Measurement and Modeling for Mixtures of Athabasca Bitumen/n-Pentane at Temperatures up to 200° C. *SPE Journal*, 129: 159-167. SPE-170252-PA Nourozieh, H., Kariznovi, M. and Abedi, J. 2015. Experimental and modeling studies of phase behavior for propane/Athabasca bitumen mixtures. *Fluid Phase Equilibria* 397: 37-43.

Nourozieh, H., Kariznovi, M. and Abedi, J. 2017. Solubility of n-butane in Athabasca Bitumen and Saturated Densities and Viscosities at Temperatures Up to 200° C. *SPE Journal* 22: 94-102. SPE -180927-PA.

Ohno, Y., Inoue, N., Okuyama, K. and Yajima, T., 2005, January. New clean fuel DME. In International Petroleum Technology Conference. International Petroleum Technology Conference.

Oliveira, M. B., Coutinho, J. A. P., Queimada, A. J. 2007. Mutual Solubilities of Hydrocarbons and Water with the CPA EoS, *Fluid Phase Equilibria* 258: 58-66.

Okuno, R., Johns, R. and Sepehrnoori, K., 2010. A new algorithm for Rachford-Rice for multiphase compositional simulation. SPE Journal, 15(02), pp. 313-325.

Orr, B., 2009, January. ES-SAGD; Past, Present and Future. In SPE Annual Technical Conference and Exhibition. Society of Petroleum Engineers.

Park, S. J., Han, K. J. and Gmehling, J., 2007. Isothermal phase equilibria and excess molar enthalpies for binary systems with dimethyl ether at 323.15 K. Journal of Chemical & Engineering Data, 52(5), pp. 1814-1818.

Park, K. J., Seo, T. and Jung, D., 2007. Performance of alternative refrigerants for residential air-conditioning applications. Applied energy, 84(10), pp. 985-991.

Parsons, C. Chernetsky, A. Eikmans, D., to Riele, P. Boersma, D., Sersic, I., Broos, R. 2016. Introducing a Novel Enhanced Oil Recovery Technology. Presented at the SPE Improved Oil Recovery Conference, Tulsa, Oklahoma, USA, April 11-13.

Pedersen, K. S., Christensen, P. L., Shaikh, J. A. 2014. *Phase Behavior of Petroleum Reservoir Fluids*, CRC Press.

Pozo, M. E. and Streett, W. B., 1984. Fluid phase equilibria for the system dimethyl ether/water from 50 to 220. degree. C and pressures to 50.9 MPa. Journal of Chemical and Engineering Data, 29(3), pp. 324-329.

Prats, M., 1982. Thermal recovery. Society of Petroleum Engineers.

Qian, J. W., Privat, R. and Jaubert, J. N., 2013. Predicting the Phase Equilibria, Critical Phenomena, and Mixing Enthalpies of Binary Aqueous Systems Containing Alkanes, Cycloalkanes, Aromatics, Alkenes, and Gases (N2, CO2, H2S, H2) with the PPR78 Equation of State. Industrial & Engineering Chemistry Research, 52(46), pp. 16457-16490.

Rackett, H. G. 1970. Equation of State for Saturated Liquids. *Journal of Chemical and Engineering Data* 15(4): 514-517.

Ramos-Pallares, F., Schoeggl, F. F., Taylor, S. D., Satyro, M. A. and Yarranton, H. W. 2015. Predicting the Viscosity of Hydrocarbon Mixtures and Diluted Heavy Oils Using the Expanded Fluid Model. *Energy & Fuels* 30: 3575-3595.

Ratnakar, R. R., Dindoruk, B., Wilson, L. 2016. Experimental Investigation of DME-Water-Crude Oil Phase Behavior and PVT Modeling for the Application of DME-Enhanced Waterflooding. *Fuel* 182 (2016): 188-197.

Ratnakar, R. R., Dindoruk, B., Wilson, L. 2016. Phase Behavior Experiments and PVT Modeling of DME-Brine-Crude Oil Mixtures Based on Huron-Vidal Mixing Rules for EOR Applications. *Fluid Phase Equilibria.*

Reamer, H. H., Sage, B. H. and Lacey, W. N., 1952. Phase Equilibria in Hydrocarbon Systems. n-Butane-Water System in the Two-Phase Region. *Industrial & Engineering Chemistry* 44(3): 609-615.

Rebert, C. J. and Kay, W. B., 1959. The phase behavior and solubility relations of the benzene-water system. AIChE Journal, 5(3), pp. 285-289.

Riazi, M. R. and Daubert, T. E., 1987. Characterization parameters for petroleum fractions. Industrial & engineering chemistry research, 26(4), pp. 755-759.

Robinson, D. B., Peng, D. Y. 1978. Gas Processors Association. Research Report RR-28.

Scharlin, P., Battino, R., Silla, E., Tunon, I. and Pascual-Ahuir, J. L. 1998. Solubility of Gases in Water: Correlation Between Solubility and the Number of Water Molecules in the First Solvation Shell. *Pure and applied chemistry,* 70: 1895-1904.

Schneider, G. M., 2002. Aqueous solutions at pressures up to 2 GPa: gas-gas equilibria, closed loops, high-pressure immiscibility, salt effects and related phenomena. Physical Chemistry Chemical Physics, 4(6), pp. 845-852.

Shen, C. 2013. *Enhanced Oil Recovery Field Case studies.* 1st Edition. Chapter 13, pp. 413-455, Elsevier.

Sheng, K., Okuno, R. and Wang, M. 2017. Water-Soluble Solvent as an Additive to Steam for Improved SAGD. Presented at the SPE Canada Heavy Oil Technical Conference, 15-16 Feb. 2017, Calgary, Alberta, Canada. SPE-184983-MS.

Shi, X. 2016. *Analytical Solution for SAGD with Consideration of Temperature Variation along the Edge of a Steam Chamber,* MSc thesis, University of Alberta, Canada, December 2016.

Soave G. 1972. Equilibrium Constants from a Modified Redlich-Kwong Equation of State. *Chemical. Engineering Science* 27: 1197-1203.

Spencer, C. F. and Danner, R. P. 1972. Improved Equation for Prediction of Saturated Liquid Density. *Journal of Chemical and Engineering Data* 17(2):236-241.

Scott, R. L. and van Konynenburg, P. H., 1970. Static properties of solutions. Van der Waals and related models for hydrocarbon mixtures. Discussions of the Faraday society, 49, pp. 87-97.

Tallon, S. and Fenton, K., 2010. The solubility of water in mixtures of dimethyl ether and carbon dioxide. Fluid Phase Equilibria, 298(1), pp. 60-66.

Te Riele, P., Parsons, C., Boerrigter, P., Plantenberg, J., Suijkerbuijk, B. Burggraaf, J., Chernetsky, A., Boersma, D., Broos. R. 2016. Implementing a Water Soluble Solvent Based Enhanced Oil Recovery Technology-Aspects of Field Development Planning. Presented at the SPE EOR Conference at Oil and Gas West Asia, Muscat, Oman, 21-23, Mar. 2016.

van Konynenburg, P. H. and Scott, R. L. 1980. Critical lines and phase equilibria in binary van der Waals mixtures. Philosophical Transactions of the Royal Society of London A: Mathematical, Physical and Engineering Sciences 298 (1442): 495-540.

Venkatramani, A. V. and Okuno, R., 2014, June. Modeling of Multiphase Behavior for Water/n-Alkane Mixtures by Use of the Peng-Robinson EOS. In SPE Heavy Oil Conference-Canada. Society of Petroleum Engineers.

Venkatramani, A. V. and Okuno, R., 2015. Characterization of water-containing reservoir oil using an EOS for steam injection processes. Journal of Natural Gas Science and Engineering, 26, pp. 1091-1106.

Venkatramani, A. V. and Okuno, R., 2016, June. Compositional Mechanisms in SAGD and ES-SAGD With Consideration of Water Solubility in Oil. In SPE Canada Heavy Oil Technical Conference. Society of Petroleum Engineers. SPE-180737-PA Venkatramani, A. and Okuno, R. 2017. Steam-Solvent Coinjection under Reservoir Heterogeneity: Should ES-SAGD be Implemented for Highly Heterogeneous Reservoirs? Presented at the SPE Canada Heavy Oil Conference, Calgary, Alberta, Canada. 15-16 Feb. 2017. SPE-185001-MS Volek, C. W. and Pryor, J. A., 1972. Steam distillation drive-Brea field, Calif. Journal of Petroleum Technology, 24(08), pp. 899-906.

Willman, B. T., Valleroy, V. V., Runberg, G. W., Cornelius, A. J. and Powers, L. W., 1961. Laboratory studies of oil recovery by steam injection. Journal of Petroleum Technology, 13(07), pp. 681-690.

Venkatramani, A. and Okuno, R. 2017. Steam-Solvent Coinjection under Reservoir Heterogeneity: Should ES-SAGD be Implemented for Highly Heterogeneous Reservoirs? Presented at the SPE Canada Heavy Oil Conference, Calgary, Alberta, Canada. 15-16 Feb. 2017. SPE-185001-MS Wong, D. S. H. and Sandler, S. I., 1992. A theoretically correct mixing rule for cubic equations of state. AIChE Journal, 38(5), pp. 671-680.

Wu, J., Liu, Z., Bi, S. and Meng, X., 2003. Viscosity of saturated liquid dimethyl ether from (227 to 343) K. Journal of Chemical & Engineering Data,48(2), pp. 426-429.

Wu. J., Liu, Z., Wang, B., Pan, J. 2004. Measurement of the Critical Parameters and the Saturation Densities of Dimethyl Ether. *Journal of Chemical & Engineering Data* 49: 704-708.

Wu, J. and Yin, J. 2008. Vapor Pressure Measurements of Dimethyl Ether From (213 to 393) K. *Journal of Chemical & Engineering Data* 53: 2247-2249.

Zhu, D. and Okuno, R. 2016. Multiphase Isenthalpic Flash Integrated with Stability Analysis. *Fluid Phase Equilibria* 423: 203-219

Statements Regarding Incorporation by Reference and Variations

All references throughout this application and Example, for example patent documents including issued or granted patents or equivalents; patent application publications; and non-patent literature documents or other source material; are hereby incorporated by reference herein in their entireties, as though individually incorporated by reference.

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising," particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method for recovering heavy oil or bitumen from a reservoir, the method comprising:
    generating a vapor mixture including vapor phase water and vapor phase dimethyl ether (DME);
    injecting the vapor mixture into a horizontal injection well in a reservoir containing heavy oil or bitumen, wherein injecting the vapor mixture into the reservoir forms a chamber in the reservoir, and wherein injecting the vapor mixture includes using a variable vapor mixture composition as a function of time;
    accumulating injected DME at a chamber-edge corresponding to an outer edge of the chamber;
    extracting a liquid oil phase mixture including DME and heavy oil or bitumen and a liquid aqueous phase mixture including DME and water from a horizontal production well in the reservoir, wherein the horizontal production well is positioned vertically beneath the horizontal injection well, wherein the injecting and extracting correspond to a steam assisted gravity drainage oil recovery technique;
    separating the DME and the heavy oil or bitumen from the extracted liquid oil phase mixture to recover the DME from the liquid oil mixture;
    separating the DME and the water from the extracted liquid aqueous phase mixture to recover the DME from the liquid aqueous mixture;
    determining a time period for injection of the vapor mixture by developing a model for the chamber and the reservoir, wherein the model uses partitioning of liquid DME into a liquid oil phase including DME and the heavy oil or bitumen and a liquid aqueous phase including DME and water, and wherein time period corresponds to a duration of injecting DME in the vapor mixture for the chamber in the model to reach a target size; and
    reducing an amount of DME in the variable vapor mixture composition after expiration of the time period by decreasing the percentage of DME in the vapor mixture monotonically over time.

2. The method of claim 1, wherein the chamber-edge has a chamber-edge temperature equal to a condensation temperature of the vapor mixture.

3. The method of claim 2, wherein the chamber-edge has a temperature that is less than a comparable chamber-edge temperature when vapor phase water, but not vapor phase DME, is injected into the reservoir.

4. The method of claim 2, wherein the chamber-edge has a temperature that is greater than a comparable chamber-edge temperature when vapor phase DME, but not vapor phase water, is injected into the reservoir.

5. The method of claim 1, wherein a temperature within the chamber is greater than a condensation temperature of the vapor mixture.

6. The method of claim 1, wherein a viscosity of the heavy oil or bitumen is reduced due to dilution of the heavy oil or bitumen by DME.

7. The method of claim 1, wherein a heated region in the reservoir surrounding the chamber has a temperature less than a condensation temperature of the vapor mixture and greater than an ambient temperature of the reservoir surrounding the heated region.

8. The method of claim 1, wherein the chamber contains a vapor phase including water and DME, a first liquid oil phase including DME and heavy oil or bitumen, and a first liquid aqueous phase including water and DME.

9. The method of claim 1, wherein the time period further corresponds to a duration of injecting DME in the vapor mixture for an amount of injected DME to reach a target amount.

10. The method of claim 1, further comprising reducing the variable vapor mixture composition to a zero fraction of DME in the vapor mixture after a target amount of DME is injected into the reservoir.

11. The method of claim 1, wherein the extracting corresponds to extracting a quantity of heavy oil or bitumen from the reservoir at a particular rate, and, wherein an amount of energy used for generating the vapor mixture needed for extracting the quantity of heavy oil or bitumen from the reservoir at the particular rate is less than a reference amount of energy required for generating vapor phase water, but not vapor phase DME, or for generating vapor phase DME, but not vapor phase water, needed for extracting the quantity of heavy oil or bitumen from the reservoir at the particular rate.

12. The method of claim 1, wherein the extracting and separating provide a 70%-100% recovery factor for injected DME.

13. The method of claim 1, wherein the extracting corresponds to extracting a quantity of heavy oil or bitumen from the reservoir at a particular rate, and wherein an amount of water used for generating the vapor mixture needed for extracting the quantity of heavy oil or bitumen from the reservoir at the particular rate is less than a reference amount of water required for generating vapor phase water needed for extracting the quantity of heavy oil or bitumen from the reservoir at the particular rate by injecting vapor phase water, but not vapor phase DME, into the reservoir.

14. The method of claim 1, wherein the vapor mixture has a composition of 90-99 mol % water and 1-10 mol % DME.

15. The method of claim 1, wherein injecting the vapor mixture includes injecting the vapor mixture at a temperature selected from the range of 320-550 K or injecting the vapor mixture at a pressure selected from the range of 10-100 bar.

16. The method of claim 1, wherein the variable vapor mixture composition as a function of time corresponds to the vapor mixture having a first non-zero percentage of DME for a first time duration, the vapor mixture having a second non-zero percentage of DME for a second time duration after the first time duration, and the vapor mixture having a third non-zero percentage of DME for a third time duration after the second time duration, wherein the second non-zero percentage of DME is less than the first non-zero percentage of DME, and wherein the third non-zero percentage of DME is less than the second non-zero percentage of DME.

17. The method of claim 1, wherein the variable vapor mixture composition as a function of time corresponds to the vapor mixture having a percentage of DME that decreases monotonically in a step-wise fashion over time after expiration of the time period.

18. The method of claim 1, wherein injecting the vapor mixture further includes using a variable injection pressure as a function of time or a variable injection temperature as a function of time.

19. The method of claim 1, wherein the vapor mixture further includes one or more hydrocarbon solvents.

20. The method of claim 1, further comprising injecting one or more non-condensable gases into the reservoir containing heavy oil or bitumen.

* * * * *